United States Patent
Ji et al.

(10) Patent No.: US 12,058,718 B2
(45) Date of Patent: Aug. 6, 2024

(54) METHOD AND APPARATUS FOR REPORTING CHANNEL STATE INFORMATION FOR NETWORK COOPERATIVE COMMUNICATION

(71) Applicant: Samsung Electronics Co., Ltd., Suwon-si (KR)

(72) Inventors: Hyoungju Ji, Suwon-si (KR); Jinhyun Park, Suwon-si (KR); Taehyoung Kim, Suwon-si (KR); Jinyoung Oh, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 17/502,678

(22) Filed: Oct. 15, 2021

(65) Prior Publication Data

US 2022/0124740 A1    Apr. 21, 2022

(30) Foreign Application Priority Data

Oct. 16, 2020   (KR) ........................ 10-2020-0134451

(51) Int. Cl.
*H04W 72/542*   (2023.01)
*H04B 17/336*   (2015.01)
(Continued)

(52) U.S. Cl.
CPC ........ *H04W 72/542* (2023.01); *H04B 17/336* (2015.01); *H04L 1/1614* (2013.01); *H04W 72/1273* (2013.01); *H04W 72/23* (2023.01)

(58) Field of Classification Search
CPC .......... H04W 72/542; H04W 72/1273; H04W 72/23; H04B 17/336
See application file for complete search history.

(56) References Cited

U.S. PATENT DOCUMENTS

2019/0281487 A1   9/2019  Liu et al.
2020/0119797 A1   4/2020  Wang et al.
(Continued)

FOREIGN PATENT DOCUMENTS

KR   10-2021-0011303 A   2/2021
WO       2020/166976 A1   8/2020

OTHER PUBLICATIONS

International Search Report and Written Opinion dated Jan. 24, 2022, issued in International Patent Application No. PCT/KR2021/014358.

*Primary Examiner* — Jackie Zuniga Abad
(74) *Attorney, Agent, or Firm* — Jefferson IP Law, LLP

(57) ABSTRACT

A communication scheme and a system thereof for converging internet of things (IoT) technology and a 5$^{th}$ generation (5G) communication system for supporting a higher data transmission rate beyond that of a 4$^{th}$ generation (4G) system are provided. The disclosure can be applied to intelligent services (for example, services related to smart homes, smart buildings, smart cities, smart cars, connected cars, health care, digital education, retail business, security, and safety) based on the 5G communication technology and the IoT-related technology. The disclosure proposes a method and an apparatus for transmitting and receiving a reference signal to efficiently use resources in a wireless communication system.

16 Claims, 31 Drawing Sheets

(51) Int. Cl.
_H04L 1/1607_ (2023.01)
_H04W 72/1273_ (2023.01)
_H04W 72/23_ (2023.01)

(56) References Cited

U.S. PATENT DOCUMENTS

| | | |
|---|---|---|
| 2020/0187175 A1 | 6/2020 | Muruganathan et al. |
| 2020/0220631 A1 | 7/2020 | Onggosanusi et al. |
| 2020/0322022 A1* | 10/2020 | Gao ................... H04L 5/0035 |
| 2021/0028823 A1 | 1/2021 | Park et al. |
| 2023/0044148 A1* | 2/2023 | Kang .................. H04W 72/044 |

* cited by examiner

| R | Serving Cell ID | BWP ID | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

...

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

24-50

| Serving Cell ID | CORESET ID | Oct 1 |
| CORESET ID | TCI state ID | Oct 2 |

FIG. 27

|  | CSI measurement for TRP 1 with NC-JT interference (27-00) | CSI measurement for TRP 2 with NC-JT interference (27-50) |
|---|---|---|
| CMR | CSI-RS from TRP 1 (C1) | CSI-RS from TRP 2 (C2) |
| ZP-IMR | CSI-IM (I1) | CSI-IM (I1') |
| NZP-IMR | CSI-RS from TRP 2 (C2') | CSI-RS from TRP 1 (C1') |

METHOD AND APPARATUS FOR REPORTING CHANNEL STATE INFORMATION FOR NETWORK COOPERATIVE COMMUNICATION

CROSS-REFERENCE TO RELATED APPLICATION(S)

This application is based on and claims priority under 35 U.S.C. § 119(a) of a Korean patent application number 10-2020-0134451, filed on Oct. 16, 2020, in the Korean Intellectual Property Office, the disclosure of which is incorporated by reference herein in its entirety.

BACKGROUND

1. Field

The disclosure relates to a method and an apparatus for transmitting and receiving a signal for network cooperative communication in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a "Beyond 4G Network" communication system or a "Post long-term evolution (LTE)" system. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for acquisition and report of channel state information for efficient uplink or downlink operation for various services in a mobile communication system.

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a base station, information configuring a first resource as a channel measurement resource (CMR) for a first channel state information (CSI) and a second resource as a non-zero power based interference measurement resource (NZP-IMR) for the first CSI, identifying a first antenna port associated with the first resource, identifying a second antenna port associated with the second resource, acquiring the first CSI based on a channel measurement using the first resource of the first antenna port and an interference measurement using the second resource of the second antenna port, transmitting the first CSI to the base station.

In accordance with another aspect of the disclosure, a method performed by a base station in a communication system is provided. The method includes transmitting, to a terminal, information configuring a first resource as a channel measurement resource (CMR) for a first channel state information (CSI) and a second resource as a non-zero power based interference measurement resource (NZP-IMR) for the first CSI, identifying a first antenna port associated with the first resource, identifying a second antenna port associated with the second resource, and receiving, from the terminal, the first CSI depending on a channel measurement using the first resource of the first antenna port and an interference measurement using the second resource of the second antenna port.

In accordance with another aspect of the disclosure, a terminal in a communication system is provided. The terminal includes a transceiver, and at least one processor configured to receive, from a base station, information configuring a first resource as a channel measurement resource (CMR) for a first channel state information (CSI) and a second resource as a non-zero power based interference measurement resource (NZP-IMR) for the first CSI, identify a first antenna port associated with the first resource, identify a second antenna port associated with the second resource, acquire the first CSI based on a channel measurement using the first resource of the first antenna port and an interference measurement using the second resource of the second antenna port, and transmit the first CSI to the base station.

In accordance with another aspect of the disclosure, a base station in a communication system is provided. The base station includes a transceiver, and at least one processor configured to transmit, to a terminal, information configuring a first resource as a channel measurement resource (CMR) for a first channel state information (CSI) and a second resource as anon-zero power based interference measurement resource (NZP-IMR) for the first CSI, identify a first antenna port associated with the first resource, identify a second antenna port associated with the second resource, and receive, from the terminal, the first CSI depending on a channel measurement using the first resource of the first antenna port and an interference measurement using the second resource of the second antenna port.

According to an embodiment, of the disclosure, a transmission method and apparatus for acquiring more accurate channel state information than the case in which network cooperative communication is used in a mobile communication system and reporting channel state information with smaller overhead.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 24 illustrates a structure of a medium access control (MAC) control element (CE) for transmission configuration indicator (TCI) state activation of a UE-specific physical downlink control channel (PDCCH) according to an embodiment of the disclosure;

FIG. 27 illustrates a configuration of resources for NC-JT CSI measurement according to an embodiment of the disclosure;

Throughout the drawings, like reference numerals will be understood to refer to like parts, components, and structures.

DETAILED DESCRIPTION

Figure 1:
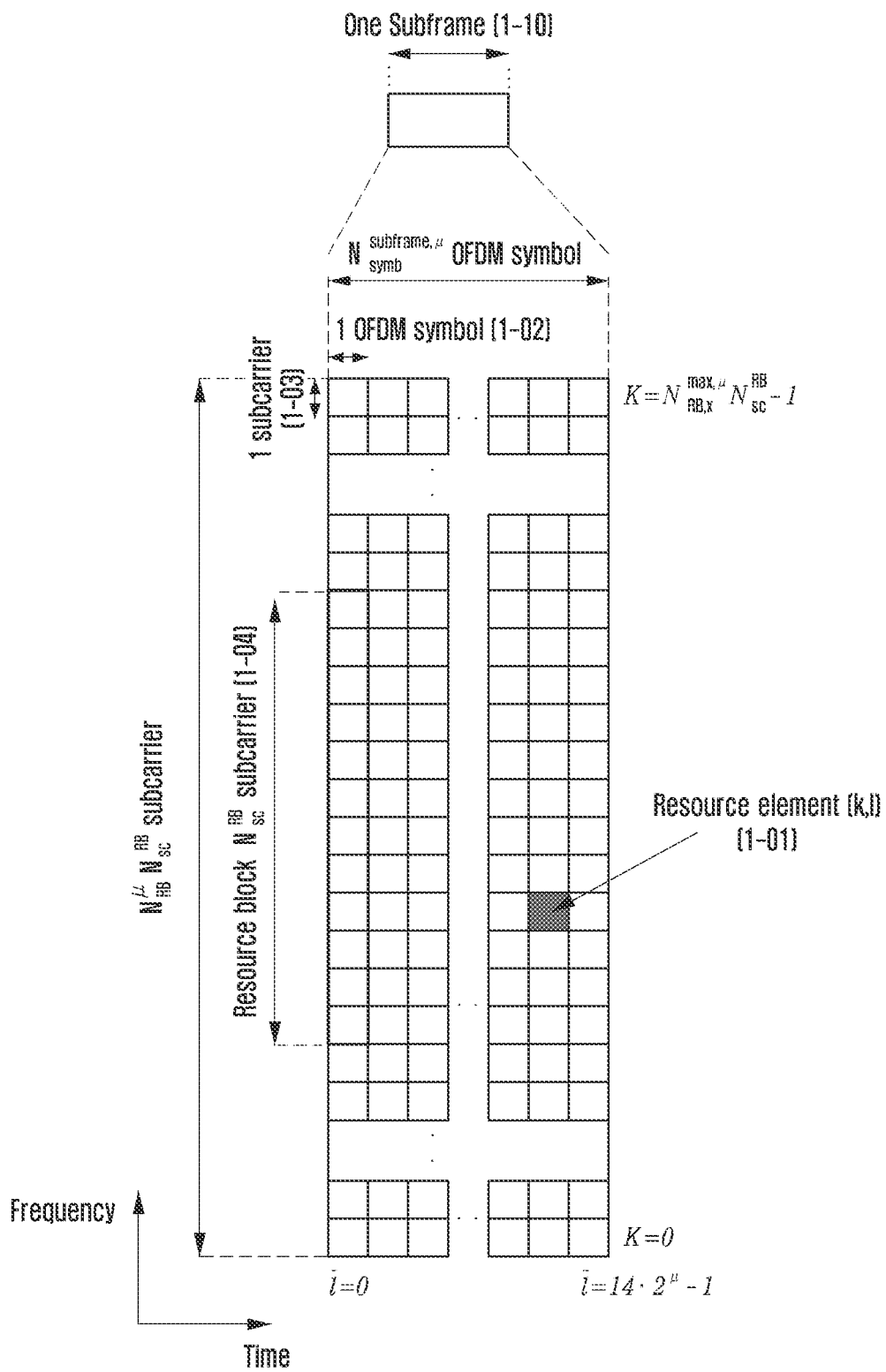
FIG. 1 illustrates a basic structure of time-frequency domains which are radio resource areas in a $5^{th}$ generation (5G) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described with reference to the accompanying drawings. In describing the disclosure below, a detailed description of known functions or configurations incorporated herein will be omitted when it is determined that the description may make the subject matter of the disclosure unnecessarily unclear. The terms which will be described below are terms defined based on the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, the disclosure is not limited to these examples. In the following description, the disclosure is directed to a technology for receiving, by a terminal, broadcast information from a base station in a wireless communication system. The disclosure relates to a communication technique for converging Internet of things (IoT) technologies with $5^{th}$ generation (5G) communication systems for supporting a higher data transfer rate beyond the $4^{th}$ generation (4G) communication systems, and a system therefor. The disclosure may be applied to intelligent services (e.g., smart home, smart buildings, smart cities, smart cars or connected cars, healthcare, digital education, retail businesses, security- and safety-related services, or the likef).

In the following description, terms referring to broadcast information, terms referring to control information, terms related to communication coverage, terms referring to status changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in 3rd generation partnership project long term evolution (3GPP LTE) standards may be used for the convenience of description. However, the disclosure is not limited by these terms and names, and may be applied in the same way to systems that conform other standards.

A wireless communication system has developed into a broadband wireless communication system that provides a high-speed and high-quality packet data service according to communication standards, such as high-speed packet access (HSPA) of 3GPP, long-term evolution (LTE) or evolved universal terrestrial radio access (E-UTRA), LTE-advanced (LTE-A), LTE-Pro, high rate packet data (HRPD) of 3GPP2, ultra mobile broadband (UMB), and 802.16e of IEEE beyond the initially provided voice-based service.

In an LTE system, which is a representative example of broadband wireless communication systems, a downlink (DL) adopts an orthogonal frequency division multiplexing (OFDM) scheme and an uplink (UL) adopts a single-carrier frequency division multiple access (SC-FDMA) scheme. The uplink is a radio link through which a user equipment (UE) (or a mobile station (MS)) transmits data or a control signal to a base station (BS) (or an eNode B), and the downlink is a radio link through which the BS transmits data or a control signal to the UE. In such a multi-access scheme, time-frequency resources for carrying data or, control information are allocated and operated in a manner to prevent overlapping of resources, that is, to establish orthogonality, between users so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine type communication (mMTC), ultra reliability low latency communication (URLLC), and the like.

According to some embodiments of the disclosure, the eMBB aims to provide a data transmission rate that is improved so as to surpass the data transmission rate supported by LTE, LTE-A, or LTE-Pro. For example, in the 5G communication system, the eMBB should provide a peak downlink data rate of 20 Gbps and a peak uplink data rate of 10 Gbps from the viewpoint of one BS. In addition, the eMBB should provide an increased user-perceived data rate of the UE. In order to satisfy these requirements, improvement of various transmission/reception technologies, including a further improved multi-input multi-output (MIMO) transmission technology, is needed. Further, a data transmission rate required by the 5G communication system can be satisfied through the use of a frequency bandwidth wider than 20 MHz in a frequency band from 3 to 6 GHz or a frequency band higher than or equal to 6 GHz instead of a band of 2 GHz used by current LTE.

In addition, in order to support an application service, such as the Internet of Things (IoT), mMTC is considered in the 5G communication system. The mMTC may be required to support access by massive numbers of UEs within a cell, improve coverage of the UE, increase a battery lifetime, and reduce the costs of the UE in order to efficiently provide IoT. IoT is attached to various sensors and devices to provide communication, and thus should support a large number of terminals (for example, 1,000,000 terminals/km$^2$) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC needs to be produced at low cost and it is difficult to frequently exchange a battery thereof, so that a very long battery lifetime may be required.

Last, the URLLC is a mission-critical cellular-based wireless communication service, which is used for remote control of a robot or machinery, industrial automation, a unmanned aerial vehicle, remote health care, emergency alert, and the like, and should provide ultra-low latency and ultra-high reliable communication. For example, services supporting the URLLS should satisfy a radio access delay time (air interface latency) shorter than 0.5 milliseconds and also have requirements of a packet error rate equal to or smaller than 10-5. Accordingly, for services supporting the URLLC, the 5G system should provide a transmit time interval (TTI) smaller than that of other systems and also has design requirements of allocating wide resources in a frequency band. However, the mMTC, the URLLC, and the eMBB are only different types of service, but service types to which the disclosure is applied are not limited thereto.

Services considered in the 5G communication system should be combined and provided based on one framework. For example, in order to efficiently manage and control resources, it is preferable to perform control and transmission such that the services are integrated into one system rather than to independently operate the services.

Hereinafter, an embodiment of the disclosure is described based on an LTE, LTE-A, LTE Pro, or NR system by way of example, but the embodiment of the disclosure can be applied to other communication systems having a similar technical background or channel form. In addition, the embodiment of the disclosure may be applied to other communication systems through some modifications without departing from the scope of the disclosure based on the determination of those skilled in the art.

Hereinafter, the frame structure of the 5G system will be described with reference to the drawings.

FIG. 1 illustrates a basic structure of a time-frequency domain which is a radio resource area in which data or control information is transmitted in a wireless communication system according to an embodiment of the disclosure.

Referring to FIG. 1, a horizontal axis and a vertical axis of the time-frequency domain illustrated in FIG. 1 indicate a time domain and a frequency domain, respectively. A basic unit of resources in the time domain and the frequency domain is a resource element (RE) 1-01, and may be defined as 1 orthogonal frequency division multiplexing (OFDM) symbol 1-02 in the time domain and as 1 subcarrier 1-03 in the frequency domain. For example, in the frequency domain, 1 resource block (RB) 1-04 may include 12 successive REs ($N_{SC}^{RB}$). According to an embodiment of the disclosure, 1 subframe 1-10 may include a plurality of OFDM symbols.

Figure 2:
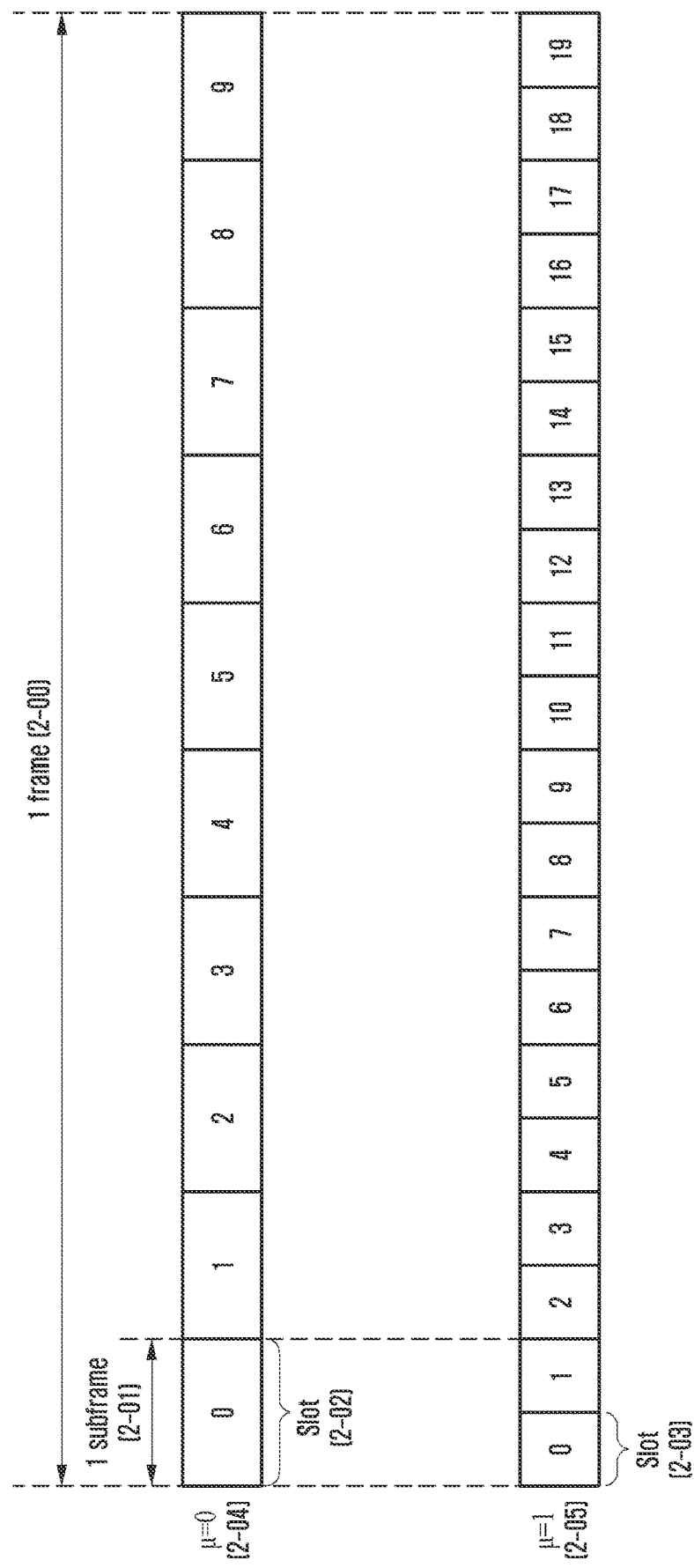
FIG. 2 illustrates a slot structure considered in a 5G system according to an embodiment of the disclosure.

FIG. 2 illustrates a slot structure used in a wireless communication system according to an embodiment of the disclosure.

Referring to FIG. 2, 1 frame 2-00 may include one or more subframes 2-01, and 1 subframe may include one or more slots 2-02. For example, 1 frame 2-00 may be defined as 10 ms. 1 subframe 2-01 may be defined as 1 ms, in which case 1 frame 2-00 may include a total of 10 subframes 2-01. 1 slot 2-02 or 2-03 may be defined as 14 OFDM symbols. For example, the number of symbols ($N_{symb}^{slot}$) per slot may be "14". 1 subframe 2-01 may include one or more slots 2-02 or 2-03, and the number of slots 2-02 or 2-03 per 1 subframe 2-01 may vary depending on a configuration value (μ) 2-04 or 2-05 for subcarrier spacing. FIG. 2 illustrates the case 2-04 in which the subcarrier spacing configuration value (μ) is "0" and the case 2-05 in which the subcarrier spacing configuration value (μ) is "1" by way of example. 1 subframe 2-01 may include 1 slot 2-02 in the case of μ=0 2-04, and 1 subframe 2-01 may include 2 slots 2-03 in the case of μ=1 2-05. For example, the number ($N_{slot}^{subframe,\mu}$) of slots per subframe may vary depending on the configuration value (μ) for subcarrier spacing, and accordingly the number ($N_{slot}^{frame,\mu}$) of slots per frame may vary. The number ($N_{slot}^{subframe,\mu}$) of slots per subframe according to the subcarrier spacing configuration value (μ) and the number ($N_{slot}^{frame,\mu}$) of slots per frame may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (SSB) (interchangeable with an SS block or an SS/PBCH block) may be transmitted for initial access, and the synchronization signal block may include a primary synchronization signal (PSS), a secondary synchronization signal (SSS), and a physical broadcast channel (PBCH). More specifically, the synchronization signal block may be defined as follows.

PSS: is a signal that is a reference for downlink time/frequency synchronization and may provide some pieces of information of a cell ID.

SSS: is a reference for downlink time/frequency synchronization and may provide the remaining cell ID information that the PSS does not provide. In addition, the SSS serves as a reference signal for demodulation of a PBCH.

PBCH: may provide necessary system information required for transmitting and receiving a data channel and a control channel by the UE. The necessary system information may include control information related to a search space indicating radio resource mapping information of a control channel, scheduling control information for a separate data channel for transmitting system information, and the like.

SS/PBCH block: may include a combination of a PSS, an SSS, and a PBCH. One or a plurality of SS/PBCH blocks may be transmitted within a time of 5 ms, and each of the transmitted SS/PBCH blocks may be separated by an index.

In an initial access step in which the UE initially accesses the system, the UE may synchronize downlink time and frequency domains based on a synchronization signal through a cell search and acquire a cell ID. The synchronization signal may include a PSS and an SSS. The synchronization signal is a signal which is the reference of the cell search, and may be transmitted after subcarrier spacing suitable for a channel environment, such as phase noise may be applied for each frequency band. A 5G BS may transmit a plurality of synchronization signal blocks according to the number of analog beams to be operated. The PSS and the SSS may be mapped to and transmitted over 12 RBs, and the PBCH may be mapped to and transmitted over 24 RBs.

Subsequently, the UE may receive a PBCH for transmitting a master information block (MIB) from the base station and acquire system information related to transmission and reception, such as a system bandwidth, and a basic parameter value. The system information includes configuration information for control region #0. The UE may monitor control region #0 based on the assumption that the selected SS/PBCH block and a demodulation reference signal (DMRS) transmitted in control region #0 are quasi co-located (QCLed). The UE acquires scheduling information for a physical downlink shared channel (PDSCH) containing a system information block (SIB) through downlink control information transmitted in control region #0, that is, a physical downlink control channel (PDCCH). The UE may acquire configuration information related to a random access channel (RACH) required for initial access from the acquired system information block. The UE may transmit a physical RACH (PRACH) to the base station based on an index of the selected SS/PBCH, and the BS receiving the PRACH may acquire information on the index of the SS/PBCH block selected by the UE. The BS may know which block is selected by the UE from among the SS/PBCH blocks based on information on the acquired SS/PBCH block index and know that the UE monitors control region #0 corresponding to the selected SS/PBCH block. Thereafter, the UE initially accesses the network via steps of registration, authentication, and the like with the BS.

Next, a configuration of a bandwidth part (BWP) in the 5G communication system will be described with reference to the drawings.

In an NR system, 1 component carrier (CC) or serving cell may include a maximum of 250 or more RBs. Accordingly, when the UE always receives the entire serving cell bandwidth like in LTE, power consumption of the UE may be extremely large. To address the issue, the BS may configure one or more bandwidth parts (BWPs) in the UE and support the UE to change a reception area within the cell. In the NR system, the BS may configure an initial BWP which is a bandwidth of control region #0,that is, control resource set (CORESET) #0 or a common search area, that is, a common search space (CSS) in the UE through a master information block (MIB). Thereafter, the BS may configure a first BWP of the UE through radio resource control (RRC) signaling and notify the UE of BWP configuration information which can be indicated through downlink control information (DCI) in the future. Accordingly, the BS may indicate which band will be used by the UE to the UE by notifying the UE of a BWP ID through DCI. If the UE does not receive the DCI in the currently allocated BWP for a specific time or longer, the UE may return to a default BWP and attempt reception of the DCI.

Figure 3:
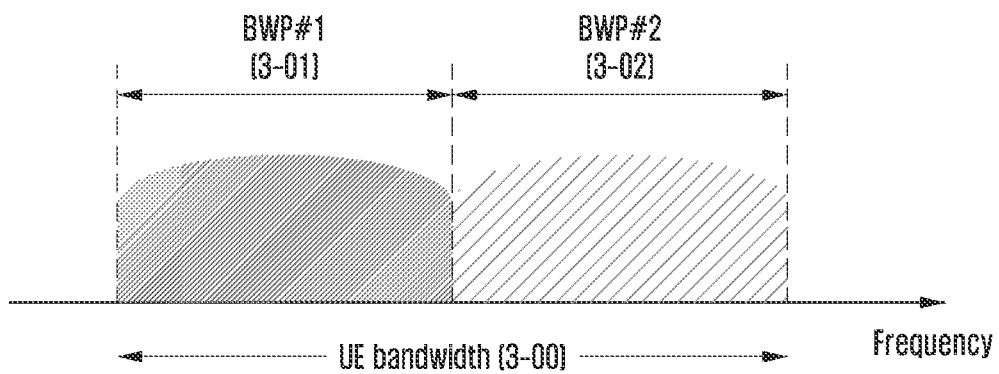
FIG. 3 illustrates a configuration of a BWP in a 5G communication system according to an embodiment of the disclosure.

FIG. 3 illustrates a configuration for a bandwidth part (BWP) in a wireless communication system according to an embodiment of the disclosure.

Referring to FIG. 3, it illustrates an example in which a UE bandwidth 3-00 is configured as two BWPs, that is, BWP #1 3-01 and BWP #2 3-02. The BS may configure one or more BWPs in the UE and configure information as shown in Table 2 below for each BWP.

TABLE 2

| BWP ::= | SEQUENCE { |
|---|---|
| bwp-Id | BWP-Id, |
| (BWP identifier) | |
| locationAndBandwidth | INTEGER (1..65536), |
| (BWP location) | |
| subcarrierSpacing | ENUMERATED {n0, n1, n2, n3, n4, n5}, |
| (Subcarrier spacing) | |
| cyclicPrefix | ENUMERATED { extended } |
| (cyclic prefix) | |
| } | |

Of course, embodiments of the disclosure are not limited to the above examples, and various parameters related to a BWP as well as the above-described configuration information may be configured in the UE. The information may be transmitted from the BS to the UE through higher-layer signaling (for example, RRC signaling). Among one or more configured BWPs, at least one BWP may be activated. Information indicating whether the configured BWP is activated may be semi-statically transmitted from the BS to the UE through RRC signaling or dynamically transmitted through a medium access control (MAC) control element (CE) or DCI.

According to an embodiment of the disclosure, the UE before the radio resource control (RRC) connection may receive a configuration of an initial BWP for initial access from the BS through a master information block (MIB). More specifically, in order to receive system information required for initial access through the MIB in an initial access stage. the UE may receive configuration information for a control resource set (CORESET) in which a physical downlink control channel (PDCCH) can be transmitted and a search space. For example, the system information may include remaining system information (RMSI) or system information block 1 (SIB1). The control resource set and the search space configured as the MIB may be considered as an identity (ID) 0.

The BS may inform the UE of configuration information, such as frequency allocation information for control resource set #0,time allocation information, and numerology. Further, the BS may inform the UE of configuration information for a monitoring period and an occasion of control resource set #0,that is, configuration information for search space #0 through the MIB. The UE may consider a frequency domain configured as control resource set #0 acquired through the MIB as an initial BWP for initial access. At this time, an ID of the initial BWP may be considered as 0.

A configuration for a BWP supported by the next-generation mobile communication system (5G or NR system) may be used for various purposes.

For example, when a bandwidth supported by the UE is narrower than the system bandwidth, the configuration for the BWP may be used. For example, in Table 2, as the frequency location (configuration information 2) of the BWP is configured in the UE, the UE may transmit and receive data at a specific frequency location within the system bandwidth.

In another example, in order to support different numerologies, the BS may configure a plurality of BWPs in the UE. For example, two BWPs may be configured to use subcarrier spacings of 15 kHz and 30 kHz, respectively, to support all of data transmission and reception of a predetermined UE using the subcarrier spacings of 15 kHz and 30 kHz. Different BWPs may be frequency-division-multiplexed (FDM), and when data is transmitted/received at particular subcarrier spacing, the BWP configured as the corresponding subcarrier spacing may be activated.

In another example, the BS may configure BWPs having different sizes of bandwidths in the UE to reduce power consumption of the UE. For example, when the UE supports a very large bandwidth, for example, a bandwidth of 100 MHz, and always transmits/receives data through the corresponding bandwidth, very high power consumption may result. Particularly, in a situation in which there is no traffic, it is very inefficient for the UE to monitor a downlink control channel for an unnecessarily larger bandwidth of 100 MHz in an aspect of power consumption. Therefore, the BS may configure a BWP having a relatively narrow bandwidth, for example, a BWP of 20 MHz in the UE to reduce power consumption of the UE. In the situation in which there is no traffic, the UE may perform monitoring in the BWP of 20 MHz, and if data is generated, may transmit and receive data through the BWP of 100 MHz according to an indication of the BS.

In the method of configuring the BWP, UEs before the RRC connection may receive configuration information for an initial BWP through a master information block (MIB) in an initial access step. More specifically, the UE may receive a configuration of a control region or a control resource set (CORESET) for a downlink control channel in which downlink control information (DCI) for scheduling a system information block (SIB) can be transmitted from an MIB of a physical broadcast channel (PBCH). A bandwidth of the control resource set configured as the MIB may be considered as an initial BWP, and the UE may receive a physical downlink shared channel (PDSCH), in which the SIB is transmitted, through the configured initial BWP. The initial BWP may be used not only for receiving the SIB but also for other system information (OSI), paging, or random access.

When one or more BWPs are configured in the UE, the BS may instruct the UE to change the BWPs through a BWP indicator field within the DCI. For example, when a currently activated BWP of the UE is BWP #1 3-01 in FIG. 3, the BS may indicate BWP #2 3-02 through a BWP indicator within DCI to the UE, and the UE may perform a BWP change to BWP #2 3-02 indicated by the received BWP indicator within the DCI.

As described above, since the DCI-based BWP change may be indicated by the DCI for scheduling the PDSCH or the physical uplink shared channel (PUSCH), the UE should receive or transmit the PDSCH or the PUSCH scheduled by the corresponding DCI in the changed BWP without any difficulty if the UE receives a BWP change request. To this end, the standard has defined requirements for a delay time (TBWP) required for the BWP change, and, for example, may be defined as follows.

TABLE 3

| μ | NR Slot length (ms) | BWP switch delay TBWP (slots) | |
|---|---|---|---|
| | | Type 1Note 1 | Type 2Note 1 |
| 0 | 1 | 1 | 3 |
| 1 | 0.5 | 2 | 5 |
| 2 | 0.25 | 3 | 9 |
| 3 | 0.125 | 6 | 17 |

Note 1:
Depends on UE capability.
Note 2:
If the BWP switch involves changing of SCS, the BWP switch delay is determined by the larger one between the SCS before BWP switch and the SCS after BWP switch.

The requirements for the BWP change delay time support type 1 or type 2 according to a UE capability. The UE may report a BWP delay time type which can be supported by the BS.

Figure 4:
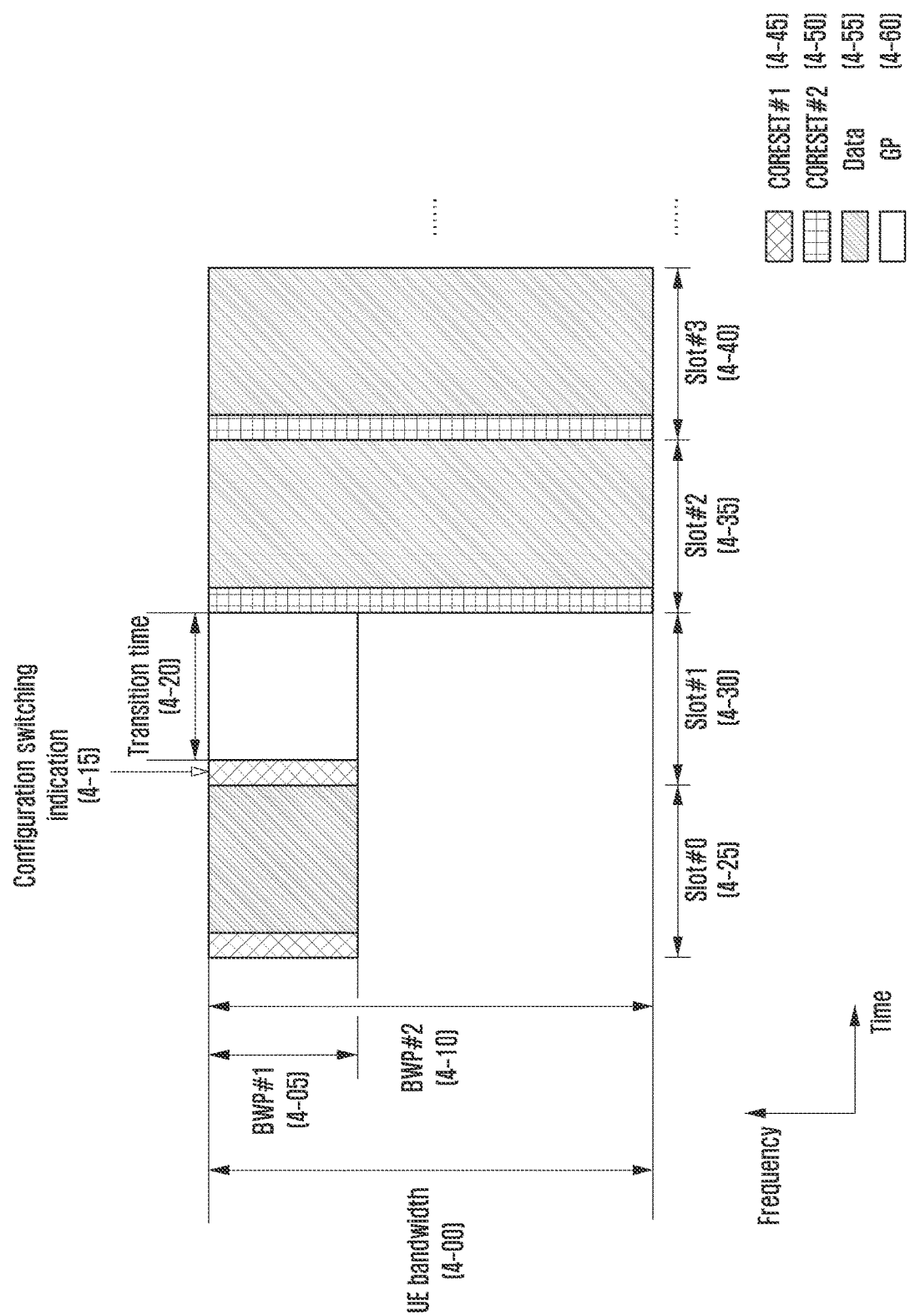
FIG. 4 illustrates a BWP change procedure in a 5G communication system according to an embodiment of the disclosure.

FIG. 4 illustrates a BWP change method according to an embodiment of the disclosure.

Referring to FIG. 4, it illustrates an example in which a UE bandwidth 4-00 is configured in a frequency axis where, when the UE receives DCI including a BWP change indicator in slot n according to the requirements for the BWP change delay time as indicated by reference numeral 4-15, the UE may complete a change to a new BWP indicated by the BWP change indicator at a time point that is not later than slot $n+T_{BWP}$ and transmit and receive a data channel scheduled by the corresponding DCI in the changed new BWP 4-10 from BWP #1 4-05. The time axis includes slot #0 4-25 to slot #3 4-40 and CORSET #1 4-45, CORSET #2 4-50, data 4-55, and GP 4-60. When the BS desires to schedule a data channel in the new BWP 4-10, the BS may determine allocation of time domain resources for the data channel based on the BWP change delay time ($T_{BWP}$) 4-20 of the UE. For example, in a method of determining allocation of time domain resources for the data channel, when scheduling the data channel through the new BWP 4-10, the BS may schedule the corresponding data channel after the BWP bandwidth change delay time 4-35 and 4-40. Accordingly, the UE may not expect that the DCI indicating the BWP change indicates a slot offset (K0 or K2) smaller than the BWP change delay time ($T_{BWP}$) 4-20.

If the UE receives DCI (for example, DCI format 1_1 or 0_1) indicating the BWP change, the UE may perform no transmission or reception during a time interval corresponding to symbols from a third symbol of a slot for receiving the PDCCH including the corresponding DCI to a start point of the slot indicated by the slot offset (K0 or K2) indicated by a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

Subsequently, a method of configuring transmission and reception-related parameters for each BWP in the 5G system is described.

The UE may receive a configuration of one or a plurality of BWPs from the BS and additionally receive a configuration of parameters (for example, uplink data channel and control channel-related configuration information) to be used for transmission and reception for each of the configured BWPs. For example, when the UE receives a configuration of BWP #1 3-01 and BWP #2 3-02 in FIG. 3, the UE may receive a configuration of transmission/reception parameter #1 for BWP #1 3-01 and a configuration of transmission/reception parameter #2 for BWP #2 3-02. The UE may perform transmission and reception with the BS based on transmission/reception parameter #1 when BWP #1 3-01 is activated, and perform transmission and reception with the BS based on transmission/reception parameter #2 when BWP #2 3-02 is activated.

More specifically, the following parameters may be configured in the UE by the BS.

First, the following information may be configured for an uplink BWP.

TABLE 4

```
BWP-Uplink ::= SEQUENCE {
bwp-Id        BWP-Id,
(BWP identifier)
bwp-Common         BWP-UplinkCommon OPTIONAL, -- Cond SetupOtherBWP
Cell-specific or common parameter)
bwp-Dedicated      BWP-UplinkDedicated OPTIONAL, -- Cond SetupOtherBWP
(UE-specific parameter)
...
}
BWP-UplinkCommon ::= SEQUENCE {
genericParameters     BWP,
(normal parameter)
rach-ConfigCommon      SetupRelease { RACH-ConfigCommon } OPTIONAL,
-- Need M
(random access-related common parameter)
pusch-ConfigCommon     SetupRelease { PUSCH-ConfigCommon } OPTIONAL,
-- Need M
(PUSCH-related common parameter)
pucch-ConfigCommon          SetupRelease { PUCCH-ConfigCommon }
```

TABLE 4-continued

```
OPTIONAL, -- Need M
(PUSCH-related common parameter)
...
}
BWP-UplinkDedicated ::= SEQUENCE {
pucch-Config        SetupRelease { PUCCH-Config } OPTIONAL, -- Need M
(PUCCH-related UE-specific parameter)
pusch-Config        SetupRelease { PUSCH-Config } OPTIONAL, -- Need M
(PUSCH-related UE-specific parameter)
configuredGrantConfig
(Configured grant-related parameter) SetupRelease { ConfiguredGrantConfig }
OPTIONAL, -- Need M
srs-Config
(SRS-related parameter)
SetupRelease { SRS-Config } OPTIONAL, -- Need M
beamFailureRecoveryConfig
(beam failure recovery-related parameter)
...
}
```

According to the above table, the UE may receive a configuration of cell-specific (or cell common or common) transmission-related parameters (for example, random access channel (RACH), uplink control channel (physical uplink control channel (PUCCH); and uplink data channel (physical uplink shared channel)-related parameters) from the BS (corresponding to BWP-UplinkCommon). Further, the UE may receive a configuration of UE-specific (or dedicated) transmission-related parameters (for example, PUCCH, PUSCH, non-grant-based uplink transmission (configured grant PUSCH), and sounding reference signal (SRS)-related parameters) from the BS (corresponding to BWP-UplinkDedicated).

Subsequently, the following information may be configured for a downlink BWP.

According to the above table, the UE may receive a configuration of cell-specific (or cell common or common) reception-related parameters (for example, downlink control channel (physical downlink control channel (PDCCH)), and downlink data channel (physical downlink shared channel)-related parameters) from the BS (corresponding to BWP-DownlinkCommon). Further, the UE may receive a configuration of UE-specific (or dedicated) reception-related parameters (for example, PDCCH, PDSCH, non-grant-based downlink data transmission (semi-persistent scheduled PDSCH), and radio link monitoring (RLM)-related parameters) from the BS (corresponding to BWP-DownlinkDedicated).

TABLE 5

```
BWP-Downlink ::= SEQUENCE {
bwp-Id        BWP-Id,
(BWP identifier)
bwp-Common          BWP-DownlinkCommon OPTIONAL, -- Cond
SetupOtherBWP
(cell-specific or common parameter)
bwp-Dedicated       BWP-DownlinkDedicated OPTIONAL, -- Cond
SetupOtherBWP
(UE-specific parameter)
...
}
BWP-DownlinkCommon ::= SEQUENCE {
genericParameters   BWP,
(normal parameter)
pdcch-ConfigCommon     SetupRelease { PDCCH-ConfigCommon } OPTIONAL,
-- Need M
(PDCCH-related common parameter)
pdsch-ConfigCommon     SetupRelease { PDSCH-ConfigCommon } OPTIONAL,
-- Need M
(PDSCH-related common parameter)
...
}
BWP-DownlinkDedicated ::= SEQUENCE {
pdcch-Config        SetupRelease { PDCCH-Config } OPTIONAL, -- Need M
(PDCCH-related UE-specific parameter)
pdsch-Config        SetupRelease { PDSCH-Config } OPTIONAL, -- Need M
(PDSCH-related UE-specific parameter)
sps-Config
(SPS-related parameter) SetupRelease { SPS-Config } OPTIONAL, -- Need M
radioLinkMonitoringConfig
(RLM-related parameter)    SetupRelease { radioLinkMonitoringConfig}
OPTIONAL, -- Cond SpCellOnly
...
}
```

Figure 5:
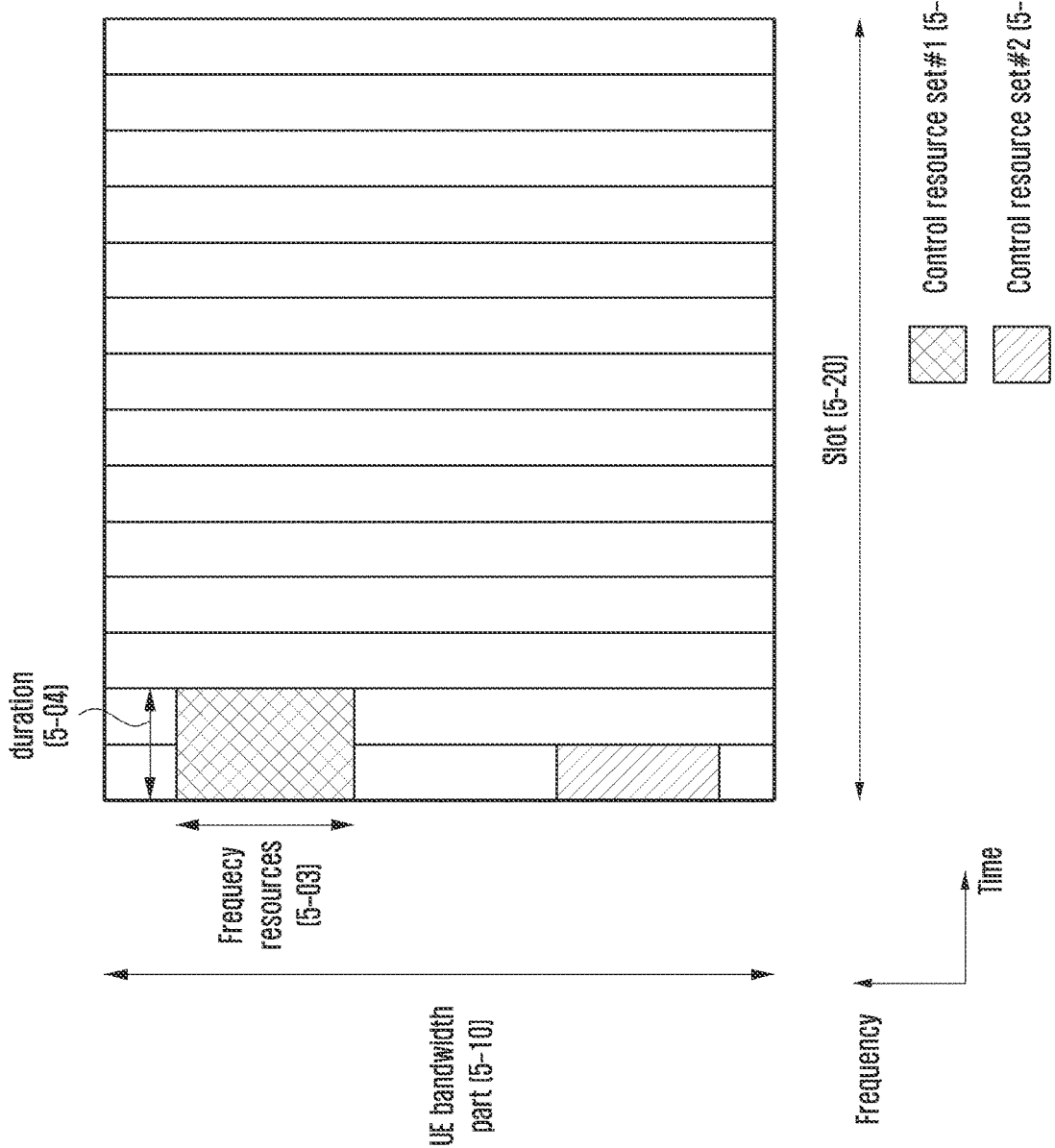
FIG. 5 illustrates a control resource set (CORESET) in which a downlink control channel is transmitted in a 5G wireless communication system according to an embodiment of the disclosure.

FIG. 5 illustrates a control resource set (CORESET) in which a downlink control channel is transmitted in a wireless communication system according to an embodiment of the disclosure.

Referring to FIG. 5, it illustrates an example in which a UE bandwidth part 5-10 is configured in a frequency axis and two CORESETs (CORESET #1 5-01 and CORESET #2 5-02) are configured within 1 slot 5-20 in a time axis. The control resource sets 5-01 and 5-02 may be configured in specific frequency resources 5-03 within the entire UE BWP 5-10 in the frequency axis. One or a plurality of OFDM symbols may be configured in the time axis, which may be defined as a control resource set duration 5-04. Referring to the example of FIG. 5, resource control reset #1 5-01 may be configured as the control resource set duration of 2 symbols, and resource control set #2 5-02 may be configured as the control resource set duration of 1 symbol.

The resource control set in the 5G system may be configured in the UE by the BS through higher-layer signaling (for example, system information, a master information block (MIB), or Radio Resource Control (RRC) signaling). Configuring the control resource set in the UE may mean providing information, such as an identity of the control resource set, a frequency location of the control resource set, a symbol length of the control resource set, and the like. For example, information provided to configure the control resource set is described below.

In the 5G system, the resource control set may include $N_{RB}^{CORESET}$ RBs in the frequency domain, and include $N_{sym}^{CORESET} \in \{1,2,3\}$ symbols in the time axis. 1 CCE may include 6 REGs, and the REG may be defined as 1 RB during 1 OFDM symbol. In REGs in one resource control set, REG indexes, starting at REG index 0, may be assigned in a time-first order from the lowest RB in a first OFDM symbol of the control resource set.

In the 5G system, an interleaved scheme and a non-interleaved scheme are supported for a PDCCH transmission method. The BS may configure whether to perform interleaving or non-interleaving transmission for each resource control set in the UE through higher-layer signaling. Interleaving may be performed in units of REG bundles. The REG bundle may be defined as a set of one or a plurality of REGs. The UE may determine a CCE-to-REG mapping scheme in the corresponding control resource set as the following method based on the information indicating whether to perform interleaving or non-interleaving transmission configured by the BS.

TABLE 6

```
ControlResourceSet ::=                    SEQUENCE {
    -- Corresponds to L1 parameter 'CORESET-ID'
    controlResourceSetId              ControlResourceSetId,
    (control resource set identity)
        frequencyDomainResources          BIT STRING (SIZE
(45)),
    (frequency axis resource allocation information)
        duration                      INTEGER
(1..maxCoReSetDuration),
    (time axis resource allocation information)
        cce-REG-MappingType
        CHOICE {
    CCE-to-REG mapping scheme)
        interleaved
        SEQUENCE {
            reg-BundleSize
        ENUMERATED {n2, n3, n6},
    REG bundle size)
            precoderGranularity
        ENUMERATED {sameAsREG-bundle, allContiguousRBs},
            interleaverSize
        ENUMERATED {n2, n3, n6}
            (interleaver size)
            shiftIndex
        INTEGER(0..maxNrofPhysicalResourceBlocks-1)
                OPTIONAL
            (interleaver shift)
    },
        noninterleaved                  NULL
    },
        tci-StatesPDCCH
        SEQUENCE(SIZE (1..maxNrofTCI-StatesPDCCH)) OF TCI-StateId
            OPTIONAL,
    (QCL configuration information)
        tci-PresentInDCI              ENUMERATED
{enabled}
            OPTIONAL, -- Need S
    }
```

TABLE 7

The CCE-to-REG mapping for a control-resource set can be interleaved or non-interleaved and is described by REG bundles:
REG bundle i is defined as REGs {iL, iL + 1, . . . , iL + L 1} where L is the REG bundle size, i = 0, 1, . . . , $N_{REG}^{CORESET}/L - 1$, and $N_{REG}^{CORESET} = N_{RB}^{CORESET} N_{symb}^{CORESET}$ is the number of REGs in the CORESET
CCE j consists of REG bundles {f(6j/L), f(6j/L + 1), . . . , f(6j/L + 6/L − 1)} where f(·) is an interleaver
For non-interleaved CCE-to-REG mapping, L = 6 and f(x) = x.
For interleaved CCE-to-REG mapping, L ∈ {2, 6} for $N_{symb}^{CORESET} = 1$ and L ∈ {$N_{symb}^{CORESET}$, 6} for $N_{symb}^{CORESET} \in \{2, 3\}$. The interleaver is defined by
f(x) = (rC + c + $n_{shift}$)mod($N_{REG}^{CORESET}/L$)
x = cR + r
r = 0, 1, . . . , R − 1
c = 0, 1, . . . , C − 1
C = $N_{REG}^{CORESET}/(LR)$
where R ∈ {2, 3, 6}.

A basic unit of the downlink control channel, that is, the REG may include all of REs to which DCI is mapped and an area to which a demodulation reference signal (DMRS) corresponding to a reference signal (RS) for decoding the REs is mapped. In one REG, 3 DMRS REs may be included. The number of CCEs required to transmit the PDCCH may be 1, 2, 4, 8, or 16 according to an aggregation level (AL), and the different numbers of CCEs may be used to implement link adaptation of the downlink control channel. For example, if AL=L, one downlink control channel may be transmitted through L CCEs.

The UE is required to detect a signal in the state in which the UE is not aware of information on the downlink control channel, and a search space indicating a set of CCEs may be used to assist such a blind decoding. The search space is a set of downlink control channel candidates including CCEs for which the UE should attempt decoding at the given aggregation level, and there are several aggregation levels at which one set of CCEs is configured by 1, 2, 4, 8, and 16 CCEs, so that the UE may have a plurality of search spaces. The search space set may be defined as a set of search spaces at all configured aggregation levels.

The search spaces may be classified into a common search space and a UE-specific search space. UEs in a predetermined group or all UEs may search for a common search space of the PDCCH in order to receive cell-common control information, such as dynamic scheduling for system information or paging messages. For example, the UE may receive PDSCH scheduling allocation information for transmission of an SIB including information on a service provider of a cell by searching for a common search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

In the 5G system, parameters for the PDCCH search space may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a terminal-specific search space, a combination of a DCI format and an RNTI to be monitored in the corresponding search space, and a control resource set index for monitoring the search space. For example, the parameters for the PDCCH search space may include the following information.

TABLE 8

```
SearchSpace ::=                                    SEQUENCE {
    -- Identity of the search space. SearchSpaceId = 0 identifies the SearchSpace
configured via PBCH (MIB) or ServingCellConfigCommon.
        searchSpaceId                              SearchSpaceId,
    (search space identifier)
        controlResourceSetId                       ControlResourceSetId,
    (control resource set identifier)
        monitoringSlotPeriodicityAndOffset         CHOICE {
    (monitoring slot level period)
            sl1
            NULL,
            sl2
            INTEGER (0..1),
            sl4
            INTEGER (0..3),
            sl5
            INTEGER (0..4),
            sl8
            INTEGER (0..7),
            sl10
            INTEGER (0..9),
            sl16
            INTEGER (0..15),
            sl20
```

TABLE 8-continued

```
    INTEGER (0..19)
    }
                                       OPTIONAL,
  Duration (monitoring length)         INTEGER (2..2559)
      monitoringSymbolsWithinSlot      BITSTRING
(SIZE (14))
      OPTIONAL,
  (monitoring symbol within slot)
      nrofCandidates                   SEQUENCE {
  (number of PDCCH candidates for each aggregation level)
      aggregationLevel1
      ENUMERATED {n0, n1, n2, n3, n4, n5, n6, n8},
      aggregationLevel2
      ENUMERATED {n0, n1, n2, n3, n4, n5, n6, n8},
      aggregationLevel4
      ENUMERATED {n0, n1, n2, n3, n4, n5, n6, n8},
      aggregationLevel8
      ENUMERATED {n0, n1, n2, n3, n4, n5, n6, n8},
      aggregationLevel16
      ENUMERATED {n0, n1, n2, n3, n4, n5, n6, n8}
      },
      searchSpaceType                  CHOICE {
      (search space type)
      -- Configures this search space as common search space (CSS) and DCI
formats to monitor.
      common
      SEQUENCE {
      (common search space)
  }
      ue-Specific
      SEQUENCE {
      (UE-specific search space)
      -- Indicates whether the UE monitors in this USS for DCI formats
0-0 and 1-0 or for formats 0-1 and 1-1.
      formats
      ENUMERATED {formats0-0-And-1-0, formats0-1-And-1-1},
      ...
      }
```

The BS may configure one or a plurality of search space sets in the UE according to configuration information. According to some embodiments of the disclosure, the BS may configure search space set 1 and search space set 2 in the UE. The UE may be configured to monitor a DCI format A scrambled by an X-RNTI in the common search space in search space set 1 and to monitor a DCI format B scrambled with a Y-RNTI in the UE-specific search space in search space set 2.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

Common search spaces may be classified into specific types of search space sets according to the purpose. RNTIs to be monitored for each of the predetermined search space set types may be different. For example, common search space types, purposes, and RNTIs to be monitored may be classified as shown in Table 9 below.

TABLE 9

| Search space type | purpose | RNTI |
| --- | --- | --- |
| Type0 CSS | Transmit PDCCH for scheduling SIB | SI-RNTI |
| Type0A CSS | Transmit PDCCH for scheduling SI (SIB2 and the like) other than SIB1 | SI-RNTI |
| Type1 CSS | Transmit PDCCH for scheduling random access | RA-RNTI, TC-RNTI |

TABLE 9-continued

| Search space type | purpose | RNTI |
| --- | --- | --- |
| | response (RAR), scheduling Msg3 retransmission, and scheduling Msg4 | |
| Type2 CSS | Paging | P-RNTI |
| Type3 CSS | Transmit group control information | INT-RNTI, SFI-RNTI, TPC-PUSCH-RNTI, TPC-PUCCH-RNTI, TPC-SRS-RNTI |
| | Transmit PDCCH for scheduling data in case of PCell | C-RNTI, MS-C-RNTI, CS-RNTI |

In the common search space, the following combinations of DCI formats and RNTIs may be monitored. Of course, the disclosure is not limited to the following examples.
  DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI
In the UE-specific search space, the following combinations of DCI formats and RNTIs may be monitored. Of course, the disclosure is not limited to the following examples.
  DCI format 0_0/1_0 with CRC scrambled by C-RNTI, CS-RNTI, TC-RNTI DCI format 0_1/0_2 with CRC scrambled by C-RNTI, CS-RNTI, TC-RNTI, SP-CSI-RNTI DCI format 1_1/1_2 with CRC scrambled by C-RNTI, CS-RNTI, TC-RNTI The described RNTIs may follow the following definition and use.

Cell RNTI (C-RNTI): used for UE-specific PDSCH scheduling

Temporary cell RNTI (TC-RNTI): used for UE-specific PDSCH scheduling

Configured scheduling RNTI (CS-RNTI): used for semi-statically configured UE-specific PDSCH scheduling Random access RNTI (RA-RNTI): used for scheduling PDSCH at random access stage Paging RNTI (P-RNTI): used for scheduling PDSCH through which paging is transmitted System information RNTI (SI-RNTI: used for scheduling PDSCH through which system information is transmitted Interruption RNTI (INT-RNTI): used for indicating whether puncturing is performed for PDSCH Transmit power control for PUSCH RNTI (PC-PUSCH-RNTI): used for indicating PUSCH power control command Transmit power control for PUCCH RNTI (PC-PUXCH-RNTI): used for indicating PUCCH power control command Transmit power control for SRS RNTI (TPC-SRS-RNTI): used for indicating SRS power control command The DCI formats may follow definitions below.

TABLE 10

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources as defined in Clause 9.3.1 of [10, TS38.473] |

TABLE 10-continued

| DCI format | Usage |
|---|---|
| 2_6 | Notifying the power saving information outside DRX Active Time for one or more UEs |
| 3_0 | Scheduling of NR sidelink in one cell |
| 3_1 | Scheduling of LTE sidelink in one cell |

In the 5G system, a control resource set p and a search space at an aggregation level L in a search space set s may be expressed as shown in the following equation.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{Equation 1}$$

L: aggregation level $n_{CI}$: carrier index $N_{CCE,p}$: total number of CCEs existing within control resource set p $n_{s,f}^\mu$: slot index $M^{(L)}_{p,s,max}$: number of PDCCH candidates at aggregation level L $m_{snCI}=0, \ldots, M^{(L)}_{p,s,max}-1$: PDCCH candidate index at aggregation level L i=0, . . . , L−1

$Y_{p,n_{s,f}^\mu}=(A_p \cdot Y_{p,n_{s,f}^\mu-1}) \bmod D$, $Y_{p,-1}=n_{RNTI} \neq 0$, $A_0=39827$, $A_1=39829$, $A_2=39839$, $D=65537$ $n_{RNTI}$: UE identifier A value of $Y\_(p,n^\mu_{s,f})$ may correspond to 0 in the case of the common search space.

A value of $Y\_(p,n^\mu_{s,f})$ may correspond to a value varying depending on a UE identity (a C-RNTI or an ID configured in the UE by the BS) and a time index in the case of the UE-specific search space.

Hereinafter, a method of configuring a transmission configuration indication (TCI) state that is a means for indicating or exchanging quasi co-location (QCL) information between the UE and the BS in the 5G communication system is described in detail.

In the wireless communication system, one or more different antenna ports (or replaced with one or more channels, signals, and combinations thereof, but commonly referred to as different antenna ports for convenience in the following description of the disclosure) may be associated by a QCL configuration shown in Table 11 below.

TABLE 11

```
QCL-Info::=        SEQUENCE{
    cell           ServCellIndex (index of serving cell in which QCL
reference RS is transmitted)
    bwp-Id         BWP-Id (index of BWP in which QCL reference RS is
transmitted)
    referenceSignal   CHOICE (indicator indicating one of CSRI-RS or
SS/PBCH block through QCL reference RS)
        cis-rs     NZP-CSI-RS-ResourceId,
        ssb        SSB-Index
    },
    qcl-Type       ENUMERATED {typeA, typeB, typeC, typeD}, (QCL
type indicator)
    ...
}
```

Specifically, in the QCL configuration, two different antenna ports may be connected through association between a (QCL) target antenna port and a (QCL) reference antenna port, and when receiving the target antenna port, the UE may apply (or assume) all or some of the statistical characteristics of a channel (for example, a large scale parameter of the channel, such as Doppler shift, Doppler spread, average delay, delay spread, average gain, spatial Rx (or Tx) parameter, and the like, and a reception spatial filter coefficient or a transmission spatial filter coefficient of the UE) measured by the reference antenna port. The target antenna port is an antenna port for transmitting a channel or a signal configured by a higher-layer configuration including the QCL configuration or an antenna port for transmitting a channel or a signal to which a TCI state indicating the QCL configuration is applied. The reference antenna port is an antenna port for transmitting a channel or a signal indicated (specified) by a parameter (for example, referenceSignal) indicating a reference signal within the QCL configuration.

Specifically, statistical characteristics of the channel (indicated by a parameter, for example, qcl-Type indicating a QCL type within the QCL configuration) limited by the QCL configuration may be classified according to the QCL type as follows.

QCL-TypeA': {Doppler shift, Doppler spread, average delay, delay spread}
QCL-TypeB': {Doppler shift, Doppler spread}
QCL-TypeC': {Doppler shift, average delay}
QCL-TypeD': {Spatial Rx parameter}

At this time, the QCL types are not limited to the above four types, but all available combinations are not listed not to make the subject of the description unclear. The QCL-TypeA is a QCL type used when a bandwidth of the reference antenna port and a transmission section are sufficient and thus all statistical characteristics which can be measured in frequency and time axes can be applied to the target antenna port (for example, when the number of samples of the reference antenna port and a transmission band/time are larger than the number of samples of the target antenna port and a transmission band/time in both the frequency axis and the time axis). The QCL-TypeB is a QCL type used when the transmission section of the reference antenna port is sufficient to measure statistical characteristics which can be measured in the time axis, that is, Doppler shift and Doppler spread. The QCL-TypeC is a QCL type used when a bandwidth and a transmission section of the reference antenna port is insufficient to measure second-order statistics, that is, Doppler spread and delay spread, and thus only first-order statistics, that is, Doppler shift and average delay can be referred. The QCL-TypeD is a QCL type configured when spatial reception filter values used when the reference antenna port is received can be used when the target antenna port is received.

Meanwhile, the BS can configure or indicate a maximum of two QCL configurations in one target antenna port through a TCI state configuration shown in Table 12a below.

TABLE 12a

TCI-state::= SEQUECE {
  tci-StateId  TCI-StateID, (TCI state indicator)
  qcl-Type1    QCL-Info, (first QCL configuration for target antenna port to which corresponding TCI state is applied)
  qcl-Type2    QCL-Info, (second QCL configuration for target antenna port to which corresponding TCI state is applied) OPTIONAL, -Need R
  ...
}

Among the two QCL configurations included in one TCI state configuration, a first QCL configuration may be one of the QCL-TypeA, the QCL-TypeB, and the QCL-TypeC. At this time, configurable QCL types are specified according to types of the target antenna port and the reference antenna port, which will be described below in detail. Among the two QCL configurations included in one TCI state configuration, a second QCL configuration may be the QCL-TypeD and may be omitted according to circumstances.

Table 12ba to Table 12be below are tables showing valid TCI state configurations according to the target antenna port type.

Table 12ba shows effective TCI state configurations when the target antenna port is a CSI-RS for tracking (TRS). The TRS is an NZP CSI-RS for which a repetition parameter is not configured and trs-Info is configured as true among CSI-RSs. The third configuration in Table 12ba may be used for an aperiodic TRS.

TABLE 12ba

Effective TCI state configurations when the target antenna port is a CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 12bb shows valid TC state configurations when the target antenna port is a CSI-RS for CSI. The CSI-RS for CSI is an NZP CSI-RS which is not used for beam management (for example, repetition parameter is not configured) and for which trs-Info is not configured as true among the CSI-RSs.

TABLE 12bb

Valid TCI state configurations when the target antenna port is a CSI-RS for CSI

| Valid TCI state Configuration | DL RS 1 | qcl-Type1 | DC RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 12bc shows valid TCI state configurations when the target antenna port is a CSI-RS for beam management (BM) (that is the same meaning as a CSI-RS for L1 RSRP reporting). The CSI-RS for BM is an NZP CSI-RS for which a repetition parameter is configured to have a value of on or off and trs-Info is not configured as true.

TABLE 12bc

Valid TCI state configurations when the target antenna port is a CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |

TABLE 12bc-continued

Valid TCI state configurations when the target antenna
port is a CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 2 | TRS | QCL-TypeA | CSI-RS (BM) | QCL-TypeD |
| 3 | SS/PBCH Block | QCL-TypeC | SS/PBCH Block | QCL-TypeD |

Table 12bd shows valid TCI state configurations when the target antenna port is a PDCCH DMRS.

TABLE 12bd

Valid TCI state configurations when the
target antenna port is a PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 12be shows valid TCI state configurations when the target antenna port is a PDSCH DMRS.

TABLE 12be shows valid TCI state configurations when the target
antenna port is a PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by Table 12ba to Table 12be, the target antenna port and the reference antenna port for each step are configured and operated as "SSB"->"TRS"->"CSI-RS for CSI, CSI-RS for BM, PDCCH DMRS, or PDSCH DMRS". Accordingly, it is possible to assist the UE in the reception operation by associating statistical characteristics which can be measured from the SSB and the TRS with respective antenna ports.

Hereinafter, time and frequency resource allocation methods for data transmission in NR are described.

Figure 6:
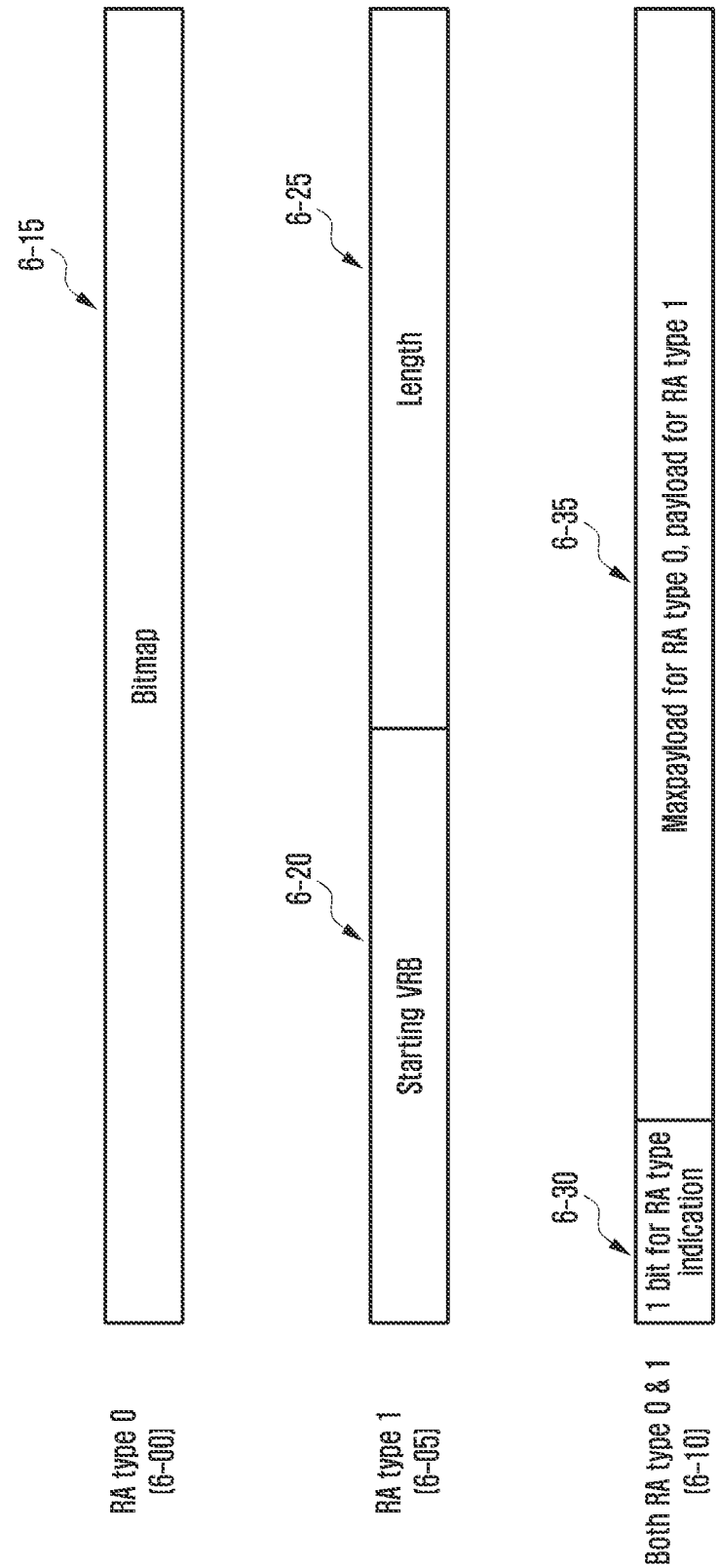
FIG. 6 illustrates frequency-axis resource allocation methods in a 5G communication system according to an embodiment of the disclosure.

In NR, detailed frequency domain resource allocation (FD-RA) methods may be provided in addition to frequency axis (domain) resource candidate allocation through a BWP indication. FIG. 6 illustrates an example of PDSCH frequency axis resource allocation in a wireless communication system according to an embodiment of the disclosure.

FIG. 6 illustrates 3 frequency axis resource allocation methods of type 0 6-00, type 1 6-05, and dynamic switch 6-10 which can be configured in the wireless communication system according to an embodiment of the disclosure.

Referring to FIG. 6, when the UE is configured to use only resource type 0 through higher-layer signaling as indicated by reference numeral 6-00, some pieces of downlink control information (DCI) for allocating the PDSCH to the corresponding UE has a bitmap including NRBG bits. A condition therefor is described later again. At this time, NRBG is the number of resource block groups (RBGs) determined as shown in Table 13 below according to a BWP size and a higher-layer parameter rbg-Size allocated by a BWP indicator, and data is transmitted in an RBG indicated as 1 by the bitmap.

TABLE 13

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling as indicated by reference numeral 6-05, some pieces of DCI for allocating the PDSCH to the corresponding UE has frequency axis resource allocation information including $\lceil \log_2(N_{RB}^{DL,BWP}(N_{RB}^{DL,BWP}+1)/2) \rceil$ bits. A condition therefor is described later again. The BS may configure a starting VRB 6-20 and a length 6-25 of frequency axis resources allocated successively therefrom.

When the UE is configured to use both resource type 0 and resource type 1 through higher-layer signaling as indicated by reference numeral 6-10, some pieces of DCI for allocating the PDSCH to the corresponding UE has frequency axis resource allocation information including bits of a larger value 6-35 among payload 6-15 for configuring resource type 0 and payload 6-20 and 6-25 for configuring resource type 1. A condition therefor is described later again. At this time, one bit may be added to the first part (MSB) of the frequency axis resource allocation information within the DCI, and the use of resource type 0 may be indicated when the corresponding bit is 0 and the use of resource type 1 may be indicated when the corresponding bit is 1.

Figure 7:
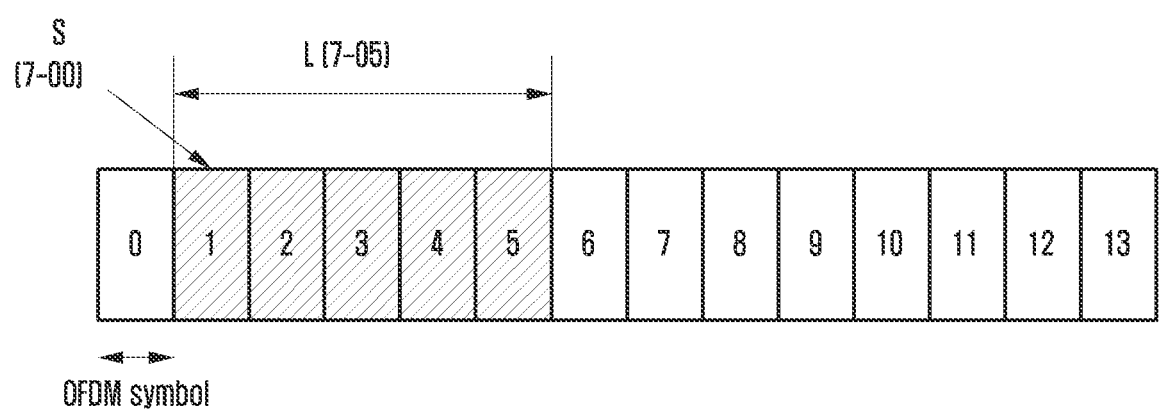
FIG. 7 illustrates time-axis resource allocation in NR according to an embodiment of the disclosure.

FIG. 7 illustrates physical downlink shared channel (PDSCH) time axis resource allocation in a wireless communication system according to an embodiment of the disclosure.

Referring to FIG. 7, the BS may indicate a time axis location of PDSCH resources according to subcarrier spacings (SCS) (pPDSCH, PDCCH) of a data channel and a control channel configured using a higher layer, a scheduling offset (K0) value, and an OFDM symbol start location 7-00 and length 7-05 within one slot 7-10 dynamically indicated through DCI.

Figure 8:
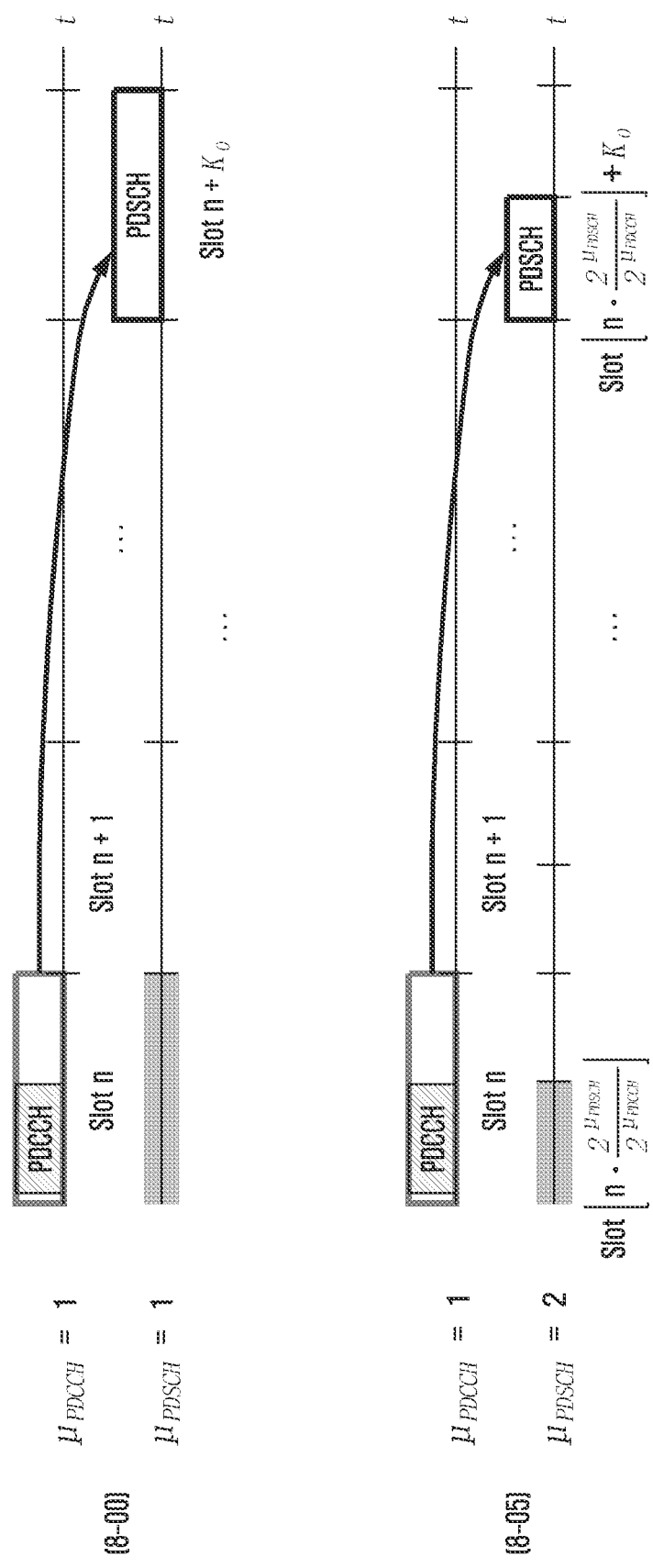
FIG. 8 illustrates time-axis resource allocation according to subcarrier spacing of a data channel and a control channel in a wireless communication system according to an embodiment of the disclosure.

FIG. 8 illustrates time axis resource allocation according to subcarrier spacings of a data channel and a control channel in a wireless communication system according to an embodiment of the disclosure.

Referring to FIG. 8, when subcarrier spacings of a data channel and a control channel are the same as each other (gPDSCH=PDCCH) as indicated by reference numeral 8-00, slot numbers for the data channel and the control channel are the same as each other, and thus the BS and the UE may identify a scheduling offset according to a predetermined slot offset K0. On the other hand, when subcarrier spacings of a data channel and a control channel are different from each other (gPDSCHfpPDCCH) as indicated by reference numeral 8-05, slot numbers for the data channel and the control channel are different from each other, and thus the BS and the UE may identify a scheduling offset according to a predetermined slot offset K0 based on subcarrier spacing of the PDCCH.

Although FIG. 8 illustrates an offset interpretation method in the case in which subcarriers spacings of the data channel and the control channel are the same as or different from each other, the method is not limited thereto and may be similarly applied to other cases in which subcarrier spacings of other channels or reference signals are the same or different, such as the case in which subcarrier spacings of a CSI-RS and a control channel or subcarrier spacings of an SRS and a control channel are different.

Hereinafter, downlink control information (DCI) in a next-generation mobile communication system (5G or NR system) is described in detail.

In the next-generation mobile communication system (5G or NR system), scheduling information for uplink data (or a physical uplink data channel (physical uplink shared channel (PUSCH)) or downlink data (or physical downlink data channel (physical downlink shared channel (PDSCH)) may be transmitted from the BS to the UE through DCI. The UE may monitor a fallback DCI format and a non-fallback DCI format for the PUSCH or the PDSCH. The fallback DCI format may include a predefined field between the BS and the UE, and the non-fallback DCI format may include a configurable field.

The DCI may be transmitted through a physical downlink control channel (PDCCH) corresponding to a physical downlink control channel via a channel coding and modulation process. A cyclic redundancy check (CRC) may be added to a DCI message payload and may be scrambled by a radio network temporary identifier (RNTI) corresponding to the identity of the UE. Different RNTIs may be used for scrambling the CRC added to the payload of the DCI message according to the purpose of the DCI message. For example, the purpose of the DCI message may include UE-specific data transmission, a power control command, a random access response, or the like. For example, the RNTI is not explicitly transmitted but may be transmitted while being inserted into the CRC calculation process. When the DCI message transmitted on the PDCCH is received, the UE may identify the CRC by using the allocated RNTI. When the CRC identification result is correct, the UE may know that the corresponding message is transmitted to the UE.

For example, DCI for scheduling a PDSCH for system information (SI) may be scrambled by an SI-RNTI. DCI for scheduling a PDSCH for a RANDOM ACCESS RESPONSE (RAR) message may be scrambled by a random access (RA)-RNTI. DCI for scheduling a PDSCH for a paging message may be scrambled by a paging-RNTI (P-RNTI). DCI for notifying of a Slot Format Indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

DCI format 0_0 may be used as fallback DCI for scheduling a PUSCH in which case the CRC may be scrambled by a C-RNTI, a configured scheduling (CS)-RNTI, or a modulation coding scheme (MCS)-cell (C)-RNTI. In an embodiment of the disclosure, DCI format 0_0 in which the CRC is scrambled by the C-RNTI may include information as shown in Table 14 below.

TABLE 14

Identifier for DCI formats - 1 bit
Frequency domain resource assignment - $\lceil \log_2(N_{RB}^{UL, BWP}(N_{RB}^{UL, BWP} + 1)/2) \rceil$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
Transmit power control (TPC) command for scheduled PUSCH - 2 bits
Uplink (UL)/Supplementary UL (SUL) indicator - 0 or 1 bit DCI format 0_1 may be used as non-fallback DCI for scheduling a PUSCH in which case the CRC may be scrambled by a C-RNTI, a CS-RNTI, a semi persistent (SP)-channel state information (CSI)-RNTI, or an MCS-C-RNTI. In an embodiment of the disclosure, DCI format 0_1 in which the CRC is scrambled by the C-RNTI may include information as shown in Table 15 below.

TABLE 15

Carrier indicator - 0 or 3 bits
UL/SUL indicator 0 or 1 bit
Identifier for DCI formats -1 bits
Bandwidth part indicator - 0, 1 or 2 bits
Frequency domain resource assignment
For resource allocation type 0, 'bits
For resource allocation type 1, $\lceil \log_2(N_{RB}^{UL,BWP}(N_{RB}^{UL,BWP} +1)/2) \rceil$ bits
If both resource allocation types 0 and 1 are configured,
max ($\lceil \log_2(N_{RB}^{UBL, BWP} (N_{RB}^{UL, BWP} +1)/2) \rceil$, $N_{RBG}$ )+ 1 bits
  Time domain resource assignment -1, 2, 3, 4, 5, or 6 bits
  Frequency hopping flag - 0 or 1 bit, only for resource allocation type 1.
0 bit if only resource allocation type 0 is configured;
1 bit otherwise.
  Modulation and coding scheme - 5 bits
  New data indicator - 1 bit
  Redundancy version - 2 bits
  HARQ process number - 4 bits
  1st downlink assignment index - 1 or 2 or 4 bits
1 bit for semi-static HARQ-ACK codebook;
2 bits for dynamic HARQ-ACK codebook, or for enhanced dynamic HARQ-ACK codebook without UL-TotalDAI-Included-r16.
4 bits for enhanced dynamic HARQ-ACK codebook with UL-TotalDAI-Included-r16.
  2nd downlink assignment index - 0 or 2 bits
2 bits for dynamic HARQ-ACK codebook, or for enhanced dynamic HARQ-ACK codebook without UL-TotalDAI-Included-r16 .

TABLE 15-continued 4 bits for enhanced dynamic HARQ-ACK codebook with UL-TotalDAI-Included-r16.
0 bit otherwise.
    TPC command for scheduled PUSCH - 2 bits $$SRS \text{ resource indicator} - \left\lceil \log_2 \left( \sum_{k=1}^{\min\{L_{max}, N_{SRS}\}} \binom{N_{SRS}}{k} \right) \right\rceil \text{ or } \lceil \log_2(N_{SRS}) \rceil \text{ bits}$$

$\left\lceil \log_2 \left( \sum_{k=1}^{\min\{L_{max}, N_{SRS}\}} \binom{N_{SRS}}{k} \right) \right\rceil$ bits for non-codebook based *PUSCH* transmission, $\lceil \log_2(N_{SRS}) \rceil$ bits for codebook based PUSCH transmission.
    Precoding information and number of layers - up to 6 bits
    Antenna ports - up to 5 bits
    SRS request - up to 3 bits
    Channel state information (CSI) request - 0, 1, 2, 3, 4, 5, or 6 bits
    Code block group (CBG) transmission information - 0, 2, 4, 6, or 8 bits
    Phase tracking reference signal (PTRS)-Demodulation reference signal
(DMRS) association - 0 or 2 bits.
    beta_offset indicator - 0, 1, or 2 bits
    DMRS sequence initialization - 0 or 1 bit
UL-SCH indicator (indicator indicating whether TB is transmitted) - 0 or 1 bit
Open-loop power control parameter set indication - up to 2 bits
SCell dormancy indication (SCell dormancy state switching indicator) - up to 5 bits DCI format 0_2 may be used as non-fallback DCI for scheduling a PUSCH and may more flexibly configure the DCI payload compared to DCI format 0_1. At this time, the CRC may be scrambled by the C-RNTI, the CS-RNTI, the SP-CSI-RNTI, or the MCS-C-RNTI. In an embodiment of the disclosure, DCI format 0_2 in which the CRC is scrambled by the C-RNTI may include information as shown in Table 16 below.

TABLE 16

Carrier indicator - up to 3 bits
UL/SUL indicator - 0 or 1 bit
Identifier for DCI formats - 1 bits
Bandwidth part indicator - 0, 1 or 2 bits
Frequency domain resource assignment
For resource allocation type 0, $N_{RBG}$ bits
For resource allocation type 1, $\lceil \log_2 (N_{RBG,K1}(N_{RBG,K1} +1)/2) \rceil$ bits
If both resource allocation types 0 and 1 are configured,
    max($\log_2 (N_{RBG,K1}(N_{RBG,K1} +1)/2)$], $N_{RBG}$) + 1 bits
Time domain resource assignment -1, 2, 3, 4, 5, or 6 bits
Frequency hopping flag - 0 or 1 bit, only for resource allocation type 1.
0 bit if only resource allocation type 0 is configured;
1 bit otherwise.
    Modulation and coding scheme - 5 bits
    New data indicator - 1 bit
    Redundancy version - up to 2 bits
    HARQ process number - up to 4 bits
    Downlink assignment index - 0 or 1 or 2 or 4 bits
0 bits if the higher layer parameter Downlinkassignmentindex-ForDCIFormat0_2 is not
configured
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
    TPC command for scheduled PUSCH - bits $$SRS \text{ resource indicator} - \left\lceil \log_2 \left( \sum_{k=1}^{L_{max}} \binom{N_{SRS}}{k} \right) \right\rceil \text{ or } \lceil \log_2(N_{SRS}) \rceil \text{ bits}$$

$\left\lceil \log_2 \left( \sum_{k=1}^{L_{max}} \binom{N_{SRS}}{k} \right) \right\rceil$ bits for non-codebook based *PUSCH* transmission, $\lceil \log_2(N_{SRS}) \rceil$ bits for codebook based PUSCH transmission.
    Precoding information and number of layers -up to 6 bits
    Antenna ports - up to 5 bits

TABLE 16-continued

SRS request - up to 3 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit
UL-SCH indicator (indicator indicating whether TB is transmitted) - 1 bit
Open-loop power control parameter set indication - up to 2 bits
SCell dormancy indication (SCell dormancy state switching indicator) - up to 5 bits DCI format 1_0 may be used for fallback DCI for scheduling a PDSCH in which case the CRC may be scrambled by a C-RNTI, a CS-RNTI, or an MCS-C-RNTI. In an embodiment of the disclosure, DCI format 1_0 in which the CRC is scrambled by the C-RNTI may include information as shown in Table 17 below.

TABLE 17

Identifier for DCI formats - 1 bit
Frequency domain resource assignment -$\lceil \log_2(N_{RB}^{DL, BWP}(N_{RB}^{DL, BWP} + 1)/2)\rceil$ bits
Time domain resource assignment - 4 bits
Frequency hopping flag - 1 bit.
Modulation and coding scheme - 5 bits
New data indicator - 1 bit
Redundancy version - 2 bits
HARQ process number - 4 bits
Downlink assignment index - 2 bits
Transmit power control (TPC) command for scheduled PUCCH - 2 bits
Physical uplink control channel (PUCCH) resource indicator - 3 bits
PDSCH-to-HARQ feedback timing indicator - 3 bits DCI format 1_1 may be used for non-fallback DCI for scheduling a PDSCH in which case the CRC may be scrambled by a C-RNTI, a CS-RNTI, or an MCS-C-RNTI. In an embodiment of the disclosure, DCI format 1_1 in which the CRC is scrambled by the C-RNTI may include information as shown in Table 18 below.

TABLE 18

Carrier indicator - 0 or 3 bits
Identifier for DCI formats -1 bits
Bandwidth part indicator - 0, 1 or 2 bits
Frequency domain resource assignment
For resource allocation type 0, 'bits
For resource allocation type 1, $\lceil \log_2(N_{RB}^{DL, BWP}(N_{RB}^{DL, BWP} + 1)/2)\rceil$ bits
If both resource allocation type 0 and 1 are configured,
max($\lceil \log_2(N_{RB}^{DL, BWP}(N_{RB}^{DL, BWP} + 1)/2)\rceil$, $N_{RBG}$) + 1 bits
Time domain resource assignment - 0, 1, 2, 3, or 4 bits
VRB-to-PRB mapping - 0 or 1 bit, only for resource allocation type 1.
0 bit if only resource allocation type 0 is configured;
1 bit otherwise.
Physical resource block (PRB) bundling size indicator - 0 or 1 bit
Rate matching indicator - 0, 1, or 2 bits
Zero power (ZP) CSI-RS trigger - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 2 or 4 or 6 bits
TPC command for scheduled PUCCH - 2 bits
PUCCH resource indicator- 3 bits
PDSCH-to-HARQ feedback timing indicator - 3 bits
Antenna ports - up to 6 bits
Transmission configuration indication - 0 or 3 bits
SRS request - up to 3 bits

TABLE 18-continued

CBG transmission information - 0, 2, 4, 6, or 8 bits
DMRS sequence initialization - 0 or 1 bit
Open-loop power control parameter set indication - up to 2 bits
SCell dormancy indication (SCell dormancy state switching indicator) - up to 5 bits DCI format 1_2 may be used as non-fallback DCI for scheduling a PDSCH and may more flexibly configure the DCI payload compared to DCI format 1_1. At this time, the CRC may be scrambled by the C-RNTL, the CS-RNTI, or the MCS-C-RNTI. In an embodiment of the disclosure, DCI format 1_2 in which the CRC is scrambled by the C-RNTI may include information as shown in Table 19 below.

TABLE 19

Carrier indicator - up to 3 bits
Identifier for DCI formats -1 bits
Bandwidth part indicator - 0, 1 or 2 bits
Frequency domain resource assignment
For resource allocation type 0, bits
For resource allocation type 1, $\lceil \log_2(N_{RBGK2}(N_{RBGK2}$ bits
If both resource allocation types 0 and 1 are configured,
max($\lceil \log_2(N_{RBGK2}(N_{RBGK2} + 1)/2)\rceil$, $N_{RBG}$ ) +1 bits
Time domain resource assignment -0, 1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator - 0 or 1 bit
Rate matching indicator - 0, 1, or 2 bits
ZP CSI-RS trigger - 0, 1, or 2 bits
Modulation and coding scheme - 5 bits
New data indicator - 1 bit
Redundancy version - up to 2 bits
HARQ process number - up to 4 bits
Downlink assignment index - 0, 1, 2 or 4 bits
TPC command for scheduled PUCCH - 2 bits
PUCCH resource indicator- up to 3 bits
PDSCH-to-HARQ_feedback timing indicator - up to 3 bits
Antenna ports - up to 6 bits
Transmission configuration indication - up to3 bits
SRS request - up to 3 bits
CBG transmission information - 0, 2, 4, 6, or 8 bits
DMRS sequence initialization - 0 or 1 bit
Open-loop power control parameter set indication - up to 2 bits
SCell dormancy indication (SCell dormancy state switching indicator) - up to 5 bits A maximum number of different sizes of DCI which the UE can receive per slot in the corresponding cell is 4. A maximum number of different sizes of DCI scrambled by the C-RNTI which the UE can receive per slot in the corresponding cell is 3.

Meanwhile, an antenna port indication field of DCI format 1_1 or 1_2 may be configured as shown in Table 20 to Table 23 below.

TABLE 20

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 21

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 5 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 22

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |

TABLE 22-continued

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 23-1

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |

TABLE 23-2

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

It is preferable that Table 23-1 and Table 23-2 above are associated with each other.

Table 20 is a table used when dmrs-type is indicated as 1 and maxLength is indicated as 1, and Table 21 is a table used when dmrs-Type is indicated as 1 and maxLength is indicated as 2. A DNMRS port used based on Table 22 is indicated in the case of dmrs–type=2 and maxLength=1, and a DMRS port used based on Table 23-1 and Table 23-2 is indicated in the case of drms-type is 2 and maxLength is 2.

Numbers 1, 2, and 3 indicated by Number of DMRS CDM group(s) without data in the table mean CDM groups {0}, {0, 1}, and {0, 1, 2}, respectively. DMRS port(s) mean sequential indexes of used ports. The antenna port is indicated by DMRS port+1000. A DMRS CDM group is connected to a method of generating aDMRS sequence and an antenna port as shown in Table 24 and Table 25. Table 24 shows parameters when dmrs–type=1 is used, and Table 25 shows parameters when dmrs–type=2 is used.

TABLE 24

Parameters for PDSCH DM-RS dmrs-type = 1.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |

TABLE 24-continued

Parameters for PDSCH DM-RS dmrs-type = 1.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1006 | 1 | 1 | +1 | +1 | +1 | −1 |
| 1007 | 1 | 1 | +1 | −1 | +1 | −1 |

TABLE 25

Parameters for PDSCH DM-RS dmrs-type = 2.

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A DMRS sequence according to each parameter is determined by Equation 2 below.

$$a_{k,l}^{(p,\mu)} = \beta_{PDSCH}^{DMRS} w_f(k')w_t(l')r(2n+k') \quad \text{Equation 2}$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Subsequently, a channel state measurement and report process in a wireless communication system according to an embodiment of the disclosure is described in detail.

In NR, a channel state information reference signal (CSI-RS) may be supported as a reference signal for measuring a channel state of the UE, and each CSI-RS resource configuration performed by a higher layer may include at least the following detailed configuration information. However, the CSI-RS resource configuration is not limited to the following examples.

NZP-CSI-RS-Resource ConfigID: IDs of corresponding CSI-RS resource configurations NrofPorts: number of CSI-RS ports included in corresponding CSI-RS resources CSI-RS-timeConfig: transmission period of corresponding CSI-RS resources and slot offset CSI-RS-ResourceMapping: location of OFDM symbol within slot of corresponding CSI-RS resources and location of subcarrier within PRB CSI-RS-Density: frequency density of corresponding CSI-RS CDMType: CDM length and CDM RE pattern of corresponding CSI-RS CSI-RS-FreqBand: transmission bandwidth and start location of corresponding CSI-RS Pc: ratio between physical downlink shared channel (PDSCH) energy per RE (EPRE) and NZP CSI-RS EPRE powerControlOffset: ratio between PDSCH EPRE and CSI-RS EPRE powerControlOffsetSS: ratio between SS/PBCH block EPRE and CSI-RS EPRE According to some embodiments of the disclosure, the number of CSI-RS ports corresponding to one of {1, 2, 4, 8, 12, 16, 24, 32} may be configured in one CSI-RS resource and different configuration degrees of freedom are supported according to the number of CSI-RS ports configured in the CSI-RS resource. Table 1] shows CSI-RS density which can be configured according to the number (X) of NR CSI-RS ports, a CDM length and type, a start location $(\bar{k},\bar{l})$ in a frequency axis and a time axis of a CSI-RS component RE pattern, and the number (k') of REs in the frequency axis and the number (l') of REs in the time axis of the CSI-RS component RE pattern.

According to some embodiments of the disclosure, the CSI-RS component RE pattern is a basic unit of CSI-RS resources, and may include a total of YZ REs of adjacent Y=1+max(k') REs in the frequency axis and adjacent Z=1+max(l') REs in the time axis. Referring to Table 26, in NR, different configuration degrees of freedom in the frequency axis are supported according to the number of CSI-RS ports configured in the CSI-RS resource.

TABLE 26

| Row | Ports X | Density ρ | cdm-Type | $(\bar{k}, \bar{l})$ | CDM group index j | k' | l' |
|---|---|---|---|---|---|---|---|
| 1 | 1 | 3 | no CDM | $(k_0, l_0), (k_0 + 4, l_0), (k_0 + 8, l_0)$ | 0, 0, 0 | 0 | 0 |
| 2 | 1 | 1, 0.5 | no CDM | $(k_0, l_0)$ | 0 | 0 | 0 |
| 3 | 2 | 1, 0.5 | fd-CDM2 | $(k_0, l_0)$ | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | 0 |
| 6 | 8 | 1 | fd-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4 (FD2, TD2) | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0), (k_4, l_0), (k_5, l_0)$ | 0, 1, 2, 3, 4, 5 | 0, 1 | 0 |
| 10 | 12 | 1 | cdm4 (FD2, TD2) | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1)$ | 0, 1, 2, 3, 4, 5, 6, 7 | 0, 1 | 0 |
| 12 | 16 | 1, 0.5 | cdm4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1), (k_1, l_0 + 1), (k_2, l_0 + 1),$ $(k_0, l_1), (k_1, l_1), (k_2, l_1), (k_0, l_1 + 1), (k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | cdm4 (FD2, TD2) | $(k_0, l_0), (k_1, l_0), (k_2, l_0), (k_0, l_1), (k_1, l_1), (k_2, l_1)$ | 0, 1, 2, 3, 4, 5 | 0, 1 | 0, 1 |
| 15 | 24 | 1, 0.5 | cdm8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | fd-CDM2 | $(k_0, l_0), (k_1, l_0), (k_2, l_0), (k_3, l_0),$ $(k_0, l_0 + 1), (k_1, l_0 + 1), (k_2, l_0 + 1), (k_3, l_0 + 1),$ $(k_0, l_1), (k_1, l_1), (k_2, l_1), (k_3, l_1),$ $(k_0, l_1 + 1), (k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4 (FD2, TD2) | $(k_0, l_0), (k_1, l_0), (k_2, l_0), (k_3, l_0), (k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | cdm8 (FD2, TD4) | $(k_0, l_0), (k_1, l_0), (k_2, l_0), (k_3, l_0)$ | 0, 1, 2, 3 | 0, 1 | 0, 1, 2, 3 |

Figure 9:
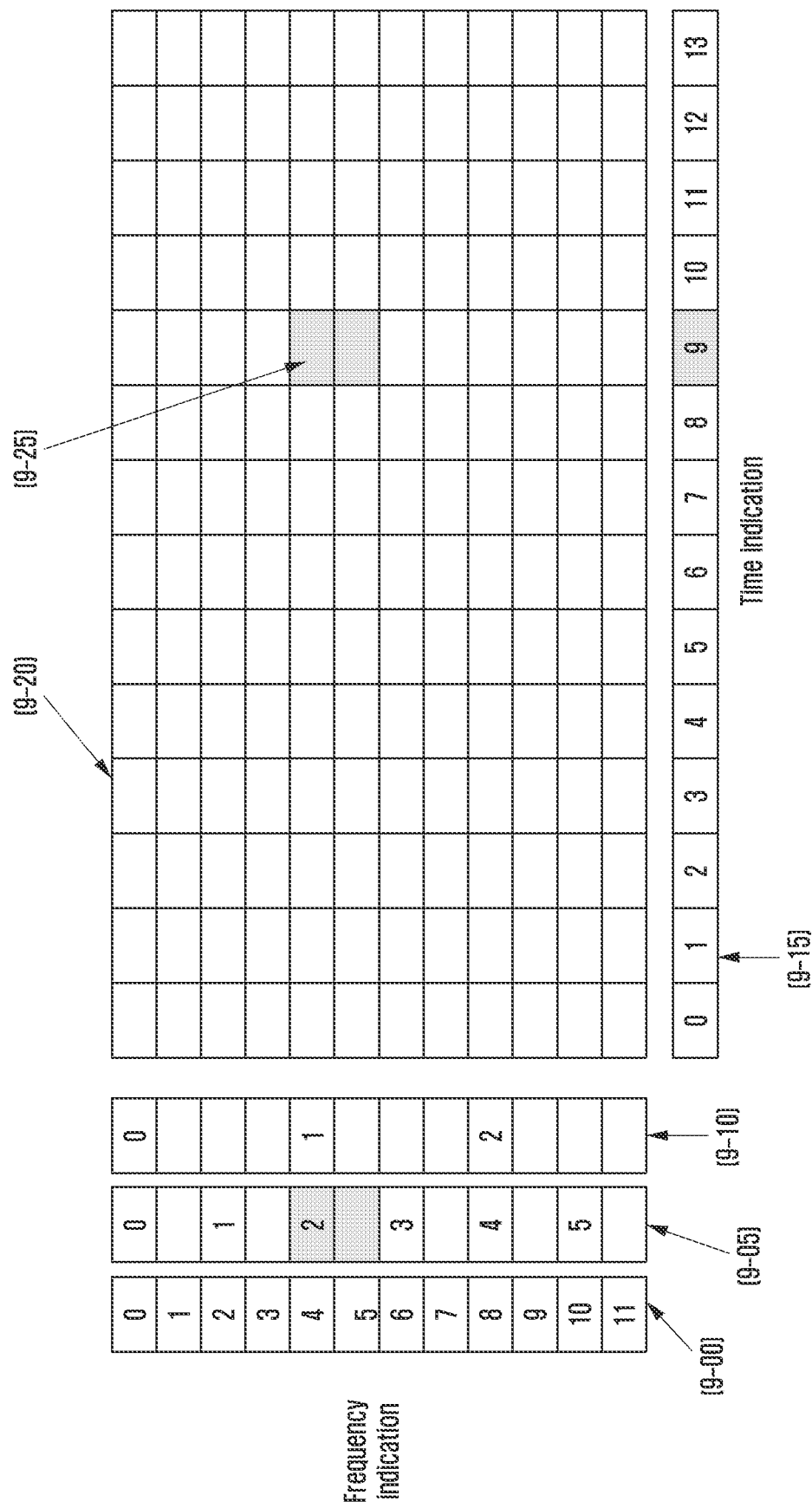
FIG. 9 illustrates designation of CSI-RS resource elements by CSI-RS resource mapping in a wireless communication system according to an embodiment of the disclosure.

FIG. 9 illustrates designation of CSI-RS resource elements by CSI-RS resource mapping in a wireless communication system according to an embodiment of the disclosure.

Referring to FIG. 9, it illustrates an example of designation of CSI-RS REs by CSI-RS-ResourceMapping configured by a higher layer. When the CSI-RS corresponds to 1 port, the CSI-RS can be configured without any subcarrier limit within the PRB, and the UE may receive designation of the CSI-RS RE location by a bitmap of 12 bits as indicated by reference numeral 9-00. In the case of {2, 4, 8, 12, 16, 24, 32} ports and Y=2, the CSI-RS can be configured in every two subcarriers within the PRB, and the UE may receive designation of the CSI-RS RE location by a bitmap of 6 bits as indicated by reference numeral 9-05. In the case of 4 ports and Y=4, the CSI-RS can be configured in every 4 subcarriers within the PRB, and the UE may receive designation of the CSI-RS RE location by a bitmap of 3 bits as indicated by reference numeral 9-10. Similarly, in the case of the RE location in the time axis, the UE may receive designation of the CSI-RS through a bitmap of a total of 14 bits. At this time, the length of the bitmap can vary depending on a Z value in Table 19 (CSI-RS locations within a slot) like the frequency location designation, but the principle is similar to the above description, and thus a detailed description thereof is omitted.

For example, in the case of X=2 ports, the BS may designate the RE location in the frequency axis by reference numeral 9-05, and if the BS designates the subcarrier location in the frequency axis by 2 of reference numeral 9-05 and designate the OFDM symbol location in the time axis by 9 of reference numeral 9-15, the UE may know that the CSI-RS is transmitted at the RE location of reference number 9-25 within the corresponding PRB 9-20 on the basis thereof.

Subsequently, a channel state measurement and report method in a 5G communication system is described in detail.

Channel state information (CSI) may include a channel quality indicator (channel quality information (CQI)), a precoding matrix index (precoding matric indicator (PMI)), a CSI-RS resource indicator (CRI), an SS/PBCH block resource indicator (SSBRI), a layer indicator (LI), a rank indicator (RI), and/or a L1-reference signal received power (RSRP). The BS may control time and frequency resources for the CSI measurement and report of the UE.

For the CSI measurement and report, the UE may receive a configuration of setting information (CSI-ReportConfig) for N(≥1) CSI reports, setting information (CSI-ResourceConfig) for M(≥1) RS transmission resources, one or two trigger states (CSI-AperiodicTriggerStateList, CSI-SemiPersistentOnPUSCH-TriggerStateList) list information through higher-layer signaling.

The configuration information for the CSI measurement and report may be described through Table 27 to Table 32.

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

TABLE 27

| CSI-ReportConfig information element |
| --- |
| -- ASN1START |
| -- TAG-CSI-REPORTCONFIG-START |
| CSI-ReportConfig ::=                       SEQUENCE { |
|     reportConfigId                              CSI-ReportConfigId, |
|     carrier                                            ServCellIndex          OPTIONAL, -- Need S |
|     resourcesForChannelMeasurement    CSI-ResourceConfigId, |
|     csi-IM-ResourcesForInterference      CSI-ResourceConfigId   OPTIONAL, -- Need R |
|     nzp-CSI-RS-ResourcesForInterference  CSI-ResourceConfigId   OPTIONAL, -- Need R |
|     reportConfigType                           CHOICE { |
|         periodic                                     SEQUENCE { |
|             reportSlotConfig                         CSI-ReportPeriodicityAndOffset, |
|             pucch-CSI-ResourceList                 SEQUENCE (SIZE (1..maxNrofBWPs)) OF PUCCH-CSI-Resource |
|         }, |
|         semiPersistentOnPUCCH              SEQUENCE { |
|             reportSlotConfig                         CSI-ReportPeriodicityAndOffset, |
|             pucch-CSI-ResourceList                 SEQUENCE (SIZE (1..maxNrofBWPs)) OF PUCCH-CSI-Resource |
|         }, |
|         semiPersistentOnPUSCH              SEQUENCE { |
|             reportSlotConfig                         ENUMERATED {sl5, sl10, sl20, sl40, sl80, sl160, sl320}, |
|             reportSlotOffsetList                     SEQUENCE (SIZE (1.. maxNrofUL-Allocations)) OF INTEGER(0..32), |
|             p0alpha                                     P0-PUSCH-AlphaSetId |
|         }, |
|         aperiodic                                    SEQUENCE { |
|             reportSlotOffsetList                     SEQUENCE (SIZE (1..maxNrofUL-Allocations)) OF INTEGER(0..32) |
|         } |
|     }, |
|     reportQuantity                              CHOICE { |
|         none                                           NULL, |
|         cri-RI-PMI-CQI                            NULL, |
|         cri-RI-i1                                      NULL, |
|         cri-RI-i1-CQI                               SEQUENCE { |
|             pdsch-BundleSizeForCSI              ENUMERATED {n2, n4} OPTIONAL-- Need S |
|         }, |

TABLE 27-continued

| CSI-ReportConfig information element |
|---|

```
        cri-RI-CQI                      NULL,
        cri-RSRP                        NULL,
        ssb-Index-RSRP                  NULL,
        cri-RI-LI-PMI-CQI               NULL
    },
    reportFreqConfiguration             SEQUENCE {
        cqi-FormatIndicator             ENUMERATED { widebandCQI,
subbandCQI }                            OPTIONAL, -- Need R
        pmi-FormatIndicator             ENUMERATED { widebandPMI,
subbandPMI }                            OPTIONAL, -- Need R
        csi-ReportingBand               CHOICE {
            subbands3                   BITSTRING(SIZE(3)),
            subbands4                   BITSTRING(SIZE(4)),
            subbands5                   BITSTRING(SIZE(5)),
            subbands6                   BITSTRING(SIZE(6)),
            subbands7                   BITSTRING(SIZE(7)),
            subbands8                   BITSTRING(SIZE(8)),
            subbands9                   BITSTRING(SIZE(9)),
            subbands10                  BITSTRING(SIZE(10)),
            subbands11                  BITSTRING(SIZE(11)),
            subbands12                  BITSTRING(SIZE(12)),
            subbands13                  BITSTRING(SIZE(13)),
            subbands14                  BITSTRING(SIZE(14)),
            subbands15                  BITSTRING(SIZE(15)),
            subbands16                  BITSTRING(SIZE(16)),
            subbands17                  BITSTRING(SIZE(17)),
            subbands18                  BITSTRING(SIZE(18)),
            ...,
            subbands19-v1530            BITSTRING(SIZE(19))
        } OPTIONAL-- Need S
    }
OPTIONAL, -- Need R
    timeRestrictionForChannelMeasurements      ENUMERATED {configured,
notConfigured},
    timeRestrictionForInterferenceMeasurements ENUMERATED {configured,
notConfigured},
    codebookConfig                      CodebookConfig
OPTIONAL, -- Need R
    dummy                               ENUMERATED {n1, n2}
OPTIONAL, -- Need R
    groupBasedBeamReporting             CHOICE {
        enabled                         NULL,
        disabled                        SEQUENCE {
            nrofReportedRS              ENUMERATED {n1, n2, n3, n4}
OPTIONAL-- Need S
        }
    },
    cqi-Table                           ENUMERATED {table1, table2, table3, spare1}
OPTIONAL, -- Need R
    subbandSize                         ENUMERATED {value1, value2},
    non-PMI-PortIndication              SEQUENCE (SIZE (1..maxNrofNZP-CSI-RS-
ResourcesPerConfig)) OF PortIndexFor8Ranks OPTIONAL, -- Need R
    ...,
    [[
    semiPersistentOnPUSCH-v1530         SEQUENCE {
        reportSlotConfig-v1530          ENUMERATED {sl4, sl8, sl16}
    }
OPTIONAL-- Need R
    ]]
}
CSI-ReportPeriodicityAndOffset ::= CHOICE {
    slots4                              INTEGER(0..3),
    slots5                              INTEGER(0..4),
    slots8                              INTEGER(0..7),
    slots10                             INTEGER(0..9),
    slots16                             INTEGER(0..15),
    slots20                             INTEGER(0..19),
    slots40                             INTEGER(0..39),
    slots80                             INTEGER(0..79),
    slots160                            INTEGER(0..159),
    slots320                            INTEGER(0..319)
}
PUCCH-CSI-Resource ::=                  SEQUENCE {
    uplinkBandwidthPartId               BWP-Id,
    pucch-Resource                      PUCCH-ResourceId
}
PortIndexFor8Ranks ::=                  CHOICE {
    portIndex8                          SEQUENCE{
```

TABLE 27-continued

| CSI-ReportConfig information element |
|---|

```
        rank1-8                    PortIndex8
OPTIONAL, -- Need R
        rank2-8                    SEQUENCE(SIZE(2)) OF PortIndex8
OPTIONAL, -- Need R
        rank3-8                    SEQUENCE(SIZE(3)) OF PortIndex8
OPTIONAL, -- Need R
        rank4-8                    SEQUENCE(SIZE(4)) OF PortIndex8
OPTIONAL, -- Need R
        rank5-8                    SEQUENCE(SIZE(5)) OF PortIndex8
OPTIONAL, -- Need R
        rank6-8                    SEQUENCE(SIZE(6)) OF PortIndex8
OPTIONAL, -- Need R
        rank7-8                    SEQUENCE(SIZE(7)) OF PortIndex8
OPTIONAL, -- Need R
        rank8-8                    SEQUENCE(SIZE(8)) OF PortIndex8
OPTIONAL-- Need R
    },
    portIndex4                 SEQUENCE{
        rank1-4                    PortIndex4
OPTIONAL, -- Need R
        rank2-4                    SEQUENCE(SIZE(2)) OF PortIndex4
OPTIONAL, -- Need R
        rank3-4                    SEQUENCE(SIZE(3)) OF PortIndex4
OPTIONAL, -- Need R
        rank4-4                    SEQUENCE(SIZE(4)) OF PortIndex4
OPTIONAL-- Need R
    },
    portIndex2                 SEQUENCE{
        rank1-2                    PortIndex2
OPTIONAL, -- Need R
        rank2-2                    SEQUENCE(SIZE(2)) OF PortIndex2
OPTIONAL-- Need R
    },
    portIndex1                 NULL
}
PortIndex8::=                  INTEGER (0..7)
PortIndex4::=                  INTEGER (0..3)
PortIndex2::=                  INTEGER (0..1)
-- TAG-CSI-REPORTCONFIG-STOP
-- ASN1STOP
```

| CSI-ReportConfig field descriptions |
|---| carrier
Indicates in which serving cell the CSI-ResourceConfig indicated below are to be found. If the field is absent, the resources are on the same serving cell as this report configuration.
codebookConfig
Codebook configuration for Type-1 or Type-II including codebook subset restriction.
cqi-FormatIndicator
Indicates whether the UE shall report a single (wideband) or multiple (subband) CQI. (see TS 38.214 [19], clause 5.2.1.4).
cqi-Table
Which CQI table to use for CQI calculation (see TS 38.214 [19], clause 5.2.2.1).
csi-IM-ResourcesForInterference
CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.
csi-ReportingBand
Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).
dummy
This field is not used in the specification. If received it shall be ignored by the UE.
groupBasedBeamReporting

| CSI-ReportConfig field descriptions |
| --- |

Turning on/off group beam based reporting (see TS 38.214 [19], clause 5.2.1.4)
non-PMI-PortIndication
Port indication for RI/CQI calculation. For each CSI-RS resource in the linked
ResourceConfig for channel measurement, a port indication for each rank R,
indicating which R ports to use. Applicable only for non-PMI feedback (see TS
38.214 [19], clause 5.2.1.4.2).
The first entry in non-PMI-PortIndication corresponds to the NZP-CSI-RS-Resource
indicated by the first entiy in nzp-CSI-RS-Resources in the NZP-CSI-RS-
ResourceSet indicated in the First entry of nzp-CSI-RS-ResourceSetList of the CSI-
ResourceConfig whose CSI-ResourceConfigId is indicated in a CSI-MeasId together
with the above CSI-ReportConfigId; the second entry in non-PMI-PortIndication
corresponds to the NZP-CSI-RS-Resource indicated by the second entry in nzp-CSI-
RS-Resources in the NZP-CSI-RS-ResourceSet indicated in the first entry of nzp-
CSI-RS-ResourceSetList of the same CSI-ResourceConfig, and so on until the NZP-
CSI-RS-Resource indicated by the last entry in nzp-CSI-RS-Resources in the in the
NZP-CSI-RS-ResourceSet indicated in the first entry of nzp-CSI-RS-
ResourceSetList of the same CSI-ResourceConfig. Then the next entry corresponds
to the NZP-CSI-RS-Resource indicated by the first entry in nzp-CSI-RS-Resources
in the NZP-CSI-RS-ResourceSet indicated in the second entry of nzp-CSI-RS-
ResourceSetList of the same CSI-ResourceConfig and so on.
nrofReportedRS
The number (N) of measured RS resources to be reported per report setting in a non-
group-based report. N <= N_max, where N_max is either 2 or 4 depending on UE
capability.
(see TS 38.214 [19], clause 5.2.1.4) When the field is absent the UE applies the value
1
nzp-CSI-RS-ResourcesForInterference
NZP CSI RS resources for interference measurement. csi-ResourceConfigId of a
CSI-ResourceConfig included in the configuration of the serving cell indicated with
the field "carrier" above. The CSI-ResourceConfig indicated here contains only
NZP-CSI-RS resources. The bwp-Id in that CSI-ResourceConfig is the same value
as the bwp-Id in the CSI-ResourceConfig indicated by
resourcesForChannelMeasurement.
p0alpha
Index of the p0-alpha set determining the power control for this CSI report
transmission (see TS 38.214 [19], clause 6.2.1.2).
pdsch-BundleSizeForCSI
PRB bundling size to assume for CQI calculation when reportQuantity is
CRI/RI/i1/CQI. If the field is absent, the UE assumes that no PRB bundling is
applied (see TS 38.214 [19], clause 5.2.1.4.2).
pmi-FormatIndicator
Indicates whether the UE shall report a single (wideband) or multiple (subband) PMI.
(see TS 38.214 [19], clause 5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214 [19], clause
5.2.1.4).
reportQuantity
The CSI related quantities to report. Corresponds to L1 parameter 'ReportQuantity'
(see TS 38.214 [19], clause 5.2.1).
reportSlotConfig
Periodicity and slot offset (see TS 38.214 [19], clause 5.2.1.4) .
reportSlotConfig-v1530
Extended value range for reports lotConfig for semi-persistent CSI on PUSCH. If the
field is present, the UE shall ignore the value provided in the legacy field
(semiPersistentOnPUSCH.reportSlotConfig).
reportSlotOffsetList
Timing offset Y for semi persistent reporting using PUSCH. This field lists the
allowed offset values. This list must have the same number of entries as the pusch-
TimeDomainAllocationList in PUSCH-Config. A particular value is indicated in
DCI. The network indicates in the DCI field of the UL grant, which of the configured
report slot offsets the UE shall apply. The DCI value 0 corresponds to the first report
slot offset in this list, the DCI value 1 corresponds to the second report slot offset in
this list, and so on. The first report is transmitted in slot n + Y, second report in
n + Y + P, where P is the configured periodicity.
Timing offset Y for aperiodic reporting using PUSCH. This field lists the allowed
offset values. This list must have the same number of entries as the pusch-
TimeDomainAllocationList in PUSCH-Config. A particular value is indicated in
DCI. The network indicates in the DCI field of the UL grant, which of the configured
report slot offsets the UE shall apply. The DCI value 0 corresponds to the first report

| CSI-ReportConfig field descriptions |
| --- |
| slot offset in this list, the DCI value 1 corresponds to the second report slot offset in this list, and so on (see TS 38.214 [19], clause 5.2.3).<br>resourcesForChannelMeasurement<br>Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.<br>subbandSize<br>Indicates one out of two possible BWP-dependent values for the subband size as indicated in TS 38.214 [19], Table 5.2.1.4-2 . If csi-ReportingBand is absent, the UE shall ignore this field.<br>timeRestrictionForChannelMeasurements<br>Time domain measurement restriction for the channel (signal) measurements (see TS 38.214 [19], clause 5.2.1.1)<br>timeRestrictionForInterferenceMeasurements<br>Time domain measurement restriction for interference measurements (see TS 38.214 [19], clause 5.2.1.1) |

The IE CSI-ResourceConfig defines a group of one or more NZP-CSI-RS-ResourceSet, CSI-IM-ResourceSet and/or CSI-SSB-ResourceSet.

The IE NZP-CSI-RS-ResourceSet is a set of Non-Zero-Power (NZP) CSI-RS resources (their IDs) and set-specific parameters.

TABLE 28

| CSI-ResourceConfig information element |
| --- |
| ```
-- ASN1START
-- TAG-CSI-RESOURCECONFIG-START
CSI-ResourceConfig ::=   SEQUENCE {
  csi-ResourceConfigId   CSI-ResourceConfigId,
  csi-RS-ResourceSetList  CHOICE {
    nzp-CSI-RS-SSB         SEQUENCE {
       nzp-CSI-RS-ResourceSetList SEQUENCE (SIZE (1..maxNrofNZP-CSI-RS-
ResourceSetsPerConfig)) OF NZP-CSI-RS-ResourceSetId
OPTIONAL, -- Need R
       csi-SSB-ResourceSetList SEQUENCE (SIZE (1..maxNrofCSI-SSB-
ResourceSetsPerConfig)) OF CSI-SSB-ResourceSetId
OPTIONAL-- Need R
    },
    csi-IM-ResourceSetList  SEQUENCE (SIZE (1..maxNrofCSI-IM-
ResourceSetsPerConfig)) OF CSI-IM-ResourceSetId
  },
  bwp-Id             BWP-Id,
  resourceType          ENUMERATED { aperiodic, semiPersistent, periodic },
  ...
}
-- TAG-CSI-RESOURCECONFIG-STOP
-- ASN1STOP
``` |

| CSI-ResourceConfig field descriptions |
| --- |
| bwp-Id<br>The DL BWP which the CSI-RS associated with this CSI-ResourceConfig are located in (see TS 38.214 [19], clause 5.2.1.2<br>csi-ResourceConfigId<br>Used in CSI-ReportConfig to refer to an instance of CSI-ResourceConfig<br>csi-RS-ResourceSetList<br>Contains up to maxNrofNZP-CSI-RS-ResourceSetsPerConfig resource sets if ResourceConfigType is 'aperiodic' and 1 otherwise (see TS 38.214 [19], clause 5.2.1.2)<br>csi-SSB-ResourceSetList<br>List of SSB resources used for beam measurement and reporting in a resource set (see TS 38.214 [19], section FFS_Section)<br>resourceType<br>Time domain behavior of resource configuration (see TS 38.214 [19], clause 5.2.1.2). It does not apply to resources provided in the csi-SSB-ResourceSetList. |

TABLE 29-1

NZP-CSI-RS-ResourceSet information element

```
-- ASN1START
-- TAG-NZP-CSI-RS-RESOURCESET-START
NZP-CSI-RS-ResourceSet ::=          SEQUENCE {
   nzp-CSI-ResourceSetId            NZP-CSI-RS-ResourceSetId,
   nzp-CSI-RS-Resources             SEQUENCE (SIZE (1..maxNrofNZP-CSI-RS-
ResourcesPerSet)) OF NZP-CSI-RS-ResourceId,
   repetition                       ENUMERATED { on, off }
OPTIONAL, -- Need S
   aperiodicTriggeringOffset        INTEGER(0..6)
OPTIONAL, -- Need S
   trs-Info                         ENUMERATED {true}
OPTIONAL, -- Need R
   ...
}
-- TAG-NZP-CSI-RS-RESOURCESET-STOP
-- ASN1STOP
```

NZP-CSI-RS-ResourceSet field descriptions aperiodicTriggeringOffset
Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set
repetition
Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"
trs-Info
Indicates that the antenna port for all NZP-CSI-RS resources in the CSI-RS resource set is same. If the field is absent or released the UE applies the value "false" (see TS 38.214 [19], clause 5.2.2.3.1).

The IE CSI-SSB-ResourceSet is used to configure one SS/PBCH block resource set which refers to SS/PBCH as indicated in ServingCellConfigCommon.

TABLE 29-2

CSI-SSB-ResourceSet information element

```
-- ASN1START
-- TAG-CSI-SSB-RESOURCESET-START
CSI-SSB-ResourceSet ::= SEQUENCE {
   csi-SSB-ResourceSetId    CSI-SSB-ResourceSetId,
   csi-SSB-ResourceList     SEQUENCE (SIZE(1..maxNrofCSI-SSB-
ResourcePerSet)) OF SSB-Index,
   ...
}
-- TAG-CSI-SSB-RESOURCESET-STOP
-- ASN1STOP
```

The IE CSI-IM-ResourceSet is used to configure a set of one or more CSI Interference Management (IM) resources (their IDs) and set-specific parameters.

TABLE 30

CSI-IM-ResourceSet information element

```
-- ASN1START
-- TAG-CSI-IM-RESOURCESET-START
CSI-IM-ResourceSet ::=         SEQUENCE {
   csi-IM-ResourceSetId        CSI-IM-ResourceSetId,
   csi-IM-Resources            SEQUENCE (SIZE(1..maxNrofCSI-IM-
ResourcesPerSet)) OF CSI-IM-ResourceId,
   ...
}
-- TAG-CSI-IM-RESOURCESET-STOP
-- ASN1STOP
```

CSI-IM-ResourceSet field descriptions csi-IM-Resources
CSI-IM-Resources associated with this CSI-IM-ResourceSet (see TS 38.214 [19], clause 5.2)

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfo-List for that trigger state.

TABLE 31

| CSI-AperiodicTriggerStateList information element |
| --- |
| -- ASN1START<br>-- TAG-CSI-APERIODICTRIGGERSTATELIST-START<br>CSI-AperiodicTriggerStateList ::=   SEQUENCE (SIZE (1..maxNrOfCSI-AperiodicTriggers)) OF CSI-AperiodicTriggerState<br>CSI-AperiodicTriggerState ::=   SEQUENCE {<br>  associatedReportConfigInfoList   SEQUENCE (SIZE(1..maxNrofReportConfigPerAperiodicTrigger)) OF CSI-AssociatedReportConfigInfo,<br>  ...<br>}<br>CSI-AssociatedReportConfigInfo ::=   SEQUENCE {<br>  reportConfigId                              CSI-ReportConfigId,<br>  resourcesForChannel                   CHOICE {<br>    nzp-CSI-RS                              SEQUENCE {<br>      resourceSet                              INTEGER (1..maxNrofNZP-CSI-RS-ResourceSetsPerConfig),<br>      qcl-info                              SEQUENCE (SIZE (1..maxNrofAP-CSI-RS-ResourcesPerSet)) OF TCI-StateId OPTIONAL-- Cond Aperiodic<br>    },<br>    csi-SSB-ResourceSet                              INTEGER (1..maxNrofCSI-SSB-ResourceSetsPerConfig)<br>  },<br>  csi-IM-ResourcesForInterference   INTEGER (1..maxNrofCSI-IM-ResourceSetsPerConfig)         OPTIONAL, -- Cond CSI-IM-ForInterference<br>  nzp-CSI-RS-ResourcesForInterference INTEGER (1..maxNrofNZP-CSI-RS-ResourceSetsPerConfig)   OPTIONAL, -- Cond NZP-CSI-RS-ForInterference<br>  ...<br>}<br>-- TAG-CSI-APERIODICTRIGGERSTATELIST-STOP<br>-- ASN1STOP |

| CSI-AssociatedReportConfigInfo field descriptions |
| --- |
| csi-IM-ResourcesForInterference<br>CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.<br>csi-SSB-ResourceSet<br>CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).<br>nzp-CSI-RS-ResourcesForInterference<br>NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).<br>qcl-info<br>List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)<br>reportConfigId<br>The reportConfigId of one of the CSI-ReportConfigToAddMod configured in CSI-MeasConfig<br>resourceSet<br>NZP-CSI-RS-ResourceSet for channel measurements. Entry number in nzp-CSI-RS-ResourceSetList in the CSI-ResourceConfig indicated by |

-continued

| CSI-AssociatedReportConfigInfo field descriptions |
|---|
| resourcesForChannelMeasurement in the CSI-ReportConfig indicated by reportConfigId above (1 corresponds to the first entry, 2 to thesecond entry, and so on). |

| Conditional Presence | Explanation |
|---|---|
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

The CSI-SemiPersistentOnPUSCH-TriggerStateList IE is used to configure the UE with list of trigger states for semi-persistent reporting of channel state information on L1. See also TS 38.214 [19], clause 5.2.

TABLE 32

| CSI-SemiPersistentOnPUSCH-TriggerStateList information element |
|---|
| -- ASN1START<br>-- TAG-CSI-SEMIPERSISTENTONPUSCHTRIGGERSTATELIST-START<br>CSI-SemiPersistentOnPUSCH-TriggerStateList ::= SEQUENCE(SIZE (1..maxNrOfSemiPersistentPUSCH-Triggers)) OF CSI-SemiPersistentOnPUSCH-TriggerState<br>CSI-SemiPersistentOnPUSCH-TriggerState ::= SEQUENCE {<br>   associatedReportConfigInfo    CSI-ReportConfigId,<br>   ...<br>}<br>-- TAG-CSI-SEMIPERSISTENTONPUSCHTRIGGERSTATELIST-STOP<br>-- ASN1STOP |

For the CSI report settings (CSI-ReportConfig), each report setting CSI-ReportConfig may be associated with one or more CSI resource settings, that is, CSI-ResourceConfig. Association between CSI report settings and CSI resource settings may be indicated by the following parameters within CSI-ReportConfig.

carrier: indicates a cell/component carrier (CC) to which CSI resource settings associated with CSI report settings belong resourcesForChannelMeasurement: indicates CSI resource settings for channel measurement associated with CSI report settings csi-IM-ResourcesForInterference: indicates CSI resource settings including CSI-IM resources for interference measurement associated with CSI report settings nzp-CSI-RS-ResourcesForInterference: indicates CSI resource settings including CSI-RS resources for interference measurement associated with CSI report settings Precoding or beamforming may performed such that each port of CSI-RS resources belonging to the CSI resource settings indicates a separate interference layer (interference transmission layer).

The UE performs a CSI report based on channel state information measured by CSI-RS or CSI-IM resources within the associated CSI resource settings according to the association.

As a time domain report operation for each report setting CSI-ReportConfig, "aperiodic", "semi-persistent", and "periodic" schemes may be supported, and may be configured in the UE by the BS through reportConfigType parameters configured by a higher layer. The type of uplink resources through which the CSI report is transmitted is determined according to the time domain report operation. An aperiodic CSI report of the UE is performed using a PUSCH, a periodic CSI report is performed using a PUCCH, and a semi-persistent CSI report supports a "PUCCH-based semi-persistent (semi-PersistentOnPUCCH)" or "PUSCH-based semi-persistent (semi-PersistentOnPUSCH)" report. When the semi-persistent CSI report is triggered or activated by DCI, the report is performed using a PUSCH. When the semi-persistent CSI report is activated by a MAC control element (CE), the report is performed using a PUCCH. In the case of the periodic or semi-persistent CSI report method, the UE may receive a configuration of PUCCH or PUSCH resources for transmitting the CSI from the BS through higher-layer signaling. A period of PUCCH or PUSCH resources for transmitting the CSI and a slot offset may be given based on numerology of an uplink (UL) BWP configured to transmit the CSI report. In the case of the aperiodic CSI report method, the UE may receive scheduling of PUSCH resources for transmitting the CSI from the BS through L1 signaling (DCI) (for example, DCI format 0_1).

For the CSI resource settings (CSI-ResourceConfig), each CSI resource setting CSI-ReportConfig may include S(≥1) CSI resource sets (configured as a higher-layer parameter csi-RS-ResourceSetList). The CSI resource set list may include a non-zero power (NZP) CSI-RS resource set and an SS/PBCH block set or include a CSI-interference measurement (CSI-IM) resource set. Each CSI resource setting may be located at a downlink (DL) BWP identified by a higher-layer parameter bwp-id. The time domain operation of CSI-RS resources within the CSI resource settings may be configured as one of "aperiodic", "periodic", or "semi-persistent" from the higher-layer parameter resourceType.

For the periodic or semi-persistent CSI resource settings, the number of CSI-RS resource sets may be limited to S=1, and the configured period and slot offset may be given based on numerology of a downlink BWP identified by bwp-id.

There is a limit in the time domain operation between the CSI report settings and the CSI resource settings associated therewith. For example, aperiodically configured CSI resource settings cannot be associated with periodically configured CSI report settings. A combination of supported CSI report settings and CSI resource settings may be based on Table 33 below.

TABLE 33

Triggering/Activation of CSI Reporting for the possible CSI-RS Configurations (Table 5.2.1.4-1)

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI report may be triggered by a "CSI request" indicator field of DCI format 0_1 or 0_2 corresponding to scheduling DCI for the PUSCH. The UE may monitor the PDCCH, acquire control information following DCI format 0_1 or 0_2, and acquire scheduling information for the PUSCH and the CSI request indicator from the corresponding control information. The CSI request indicator may be configured as $N_{TS}$(=0, 1, 2, 3, 4, 5, or 6), and the number of bits of the CSI request indicator may be determined by higher-layer signaling (reportTriggerSize). The CSI request indicator field is mapped to one trigger state, and mapping between the indicator field and the trigger state is indicated by a higher-layer parameter CSI-AperiodicTriggerStateList. Each trigger state may indicate one aperiodic CSI report setting and one CSI resource set in CSI resource settings associated therewith. The purpose of indicating the CSI resource set is to inform of, when two or more CSI resource sets are included in the CSI resource settings, one CSI resource set based on which the CSI report is performed among the two CSI resource sets.

Meanwhile, the number of CSI request indicator fields and the number of trigger states of the higher-layer parameter CSI-AperiodicTriggerStateList may not be the same. Interpretation of the CSI request indicator therefor is described below.

A CSI request indicator 0 (all bit values are 0) may indicate that a CSI report is not requested.

When the number (M) of CSI trigger states within the configured CSI-AperiodicTriggerStateList is larger than $2^{NTs}-1$, M CSI trigger states may be mapped to $2^{NTs}-1$ according to a predefined mapping relation, and one of $2^{NTs}-1$ trigger states may be indicated by the CSI request field.

When the number (M) of CSI trigger states within the configured CSI-AperiodicTriggerStateList is smaller than or equal to $2^{NTs}-1$, one of M CSI trigger states may be indicated by the CSI request field.

Table 34 below shows an example of the relation between a CSI request indicator and a CSI trigger state which can be indicated by the corresponding indicator.

TABLE 34

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may measure CSI resources within the CSI trigger state triggered by the CSI request field and generate the CSI (including one or more of the CQI, the PMI, the CRI, the SSBRI, the LI, the RI, or the L1-RSRP) on the basis thereof. The UE may transmit the acquired CSI by using a PUSCH scheduled by corresponding DCI format 0_1. When 1 bit corresponding to an uplink data indicator (UL-SCH indicator) within DCI format 0_1 indicates "1", uplink data (UL-SCH) and the acquired CSI may be multiplexed and transmitted through PUSCH resources scheduled by DCI format 0_1. When 1 bit corresponding to an uplink data indicator (UL-SCH indicator) within DCI format 0_1 indicates "0", only the CSI may be mapped and transmitted through PUSCH resources scheduled by DCI format 0_1 without uplink data (UL-SCH).

Figure 10:
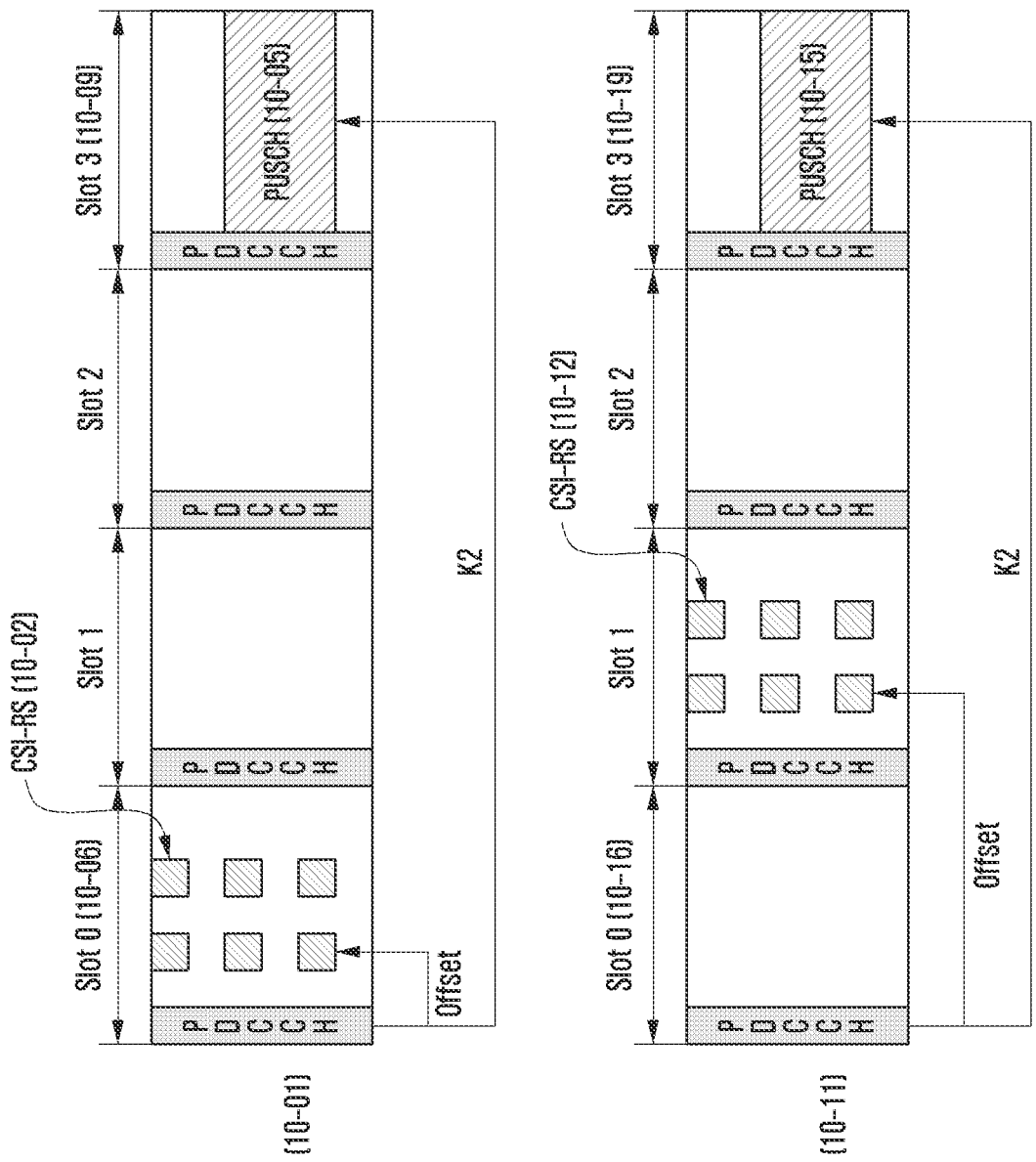
FIG. 10 illustrates an aperiodic CSI report method in a wireless communication system according to an embodiment of the disclosure.

FIG. 10 illustrates an aperiodic CSI report method in a wireless communication system according to an embodiment of the disclosure.

Referring to FIG. 10, the UE may acquire DCI format 0_1 or 0_2 by monitoring a PDCCH 10-01 and acquire scheduling information for a PUSCH 10-05 and CSI request information therefrom. The UE may acquire resource information for a CSI-RS 10-02 to be measured from the received CSI request indicator. The UE may determine a time point at which resources of the transmitted CSI-RS 10-02 are measured based on a time point at which DCI format 0_1 or 0_2 is received and a parameter for an offset (aperiodicTriggeringOffset) within a CSI resource set configuration (for example, NZP CSI-RS resource set configuration (NZP-CSI-RS-ResourceSet)). More specifically, the UE may receive a configuration of an offset value X of the parameter aperiodicTriggeringOffset within the NZP-CSI-RS resource set configuration from the BS through higher-layer signaling, and the configured offset value X may be an offset between a slot for receiving DCI of triggering the aperiodic CSI report and a slot for transmitting CSI-RS resources. For example, the aperiodicTriggeringOffset parameter value and the offset value X may have a mapping relation shown in Table 35 below.

TABLE 35

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

Figure 11:
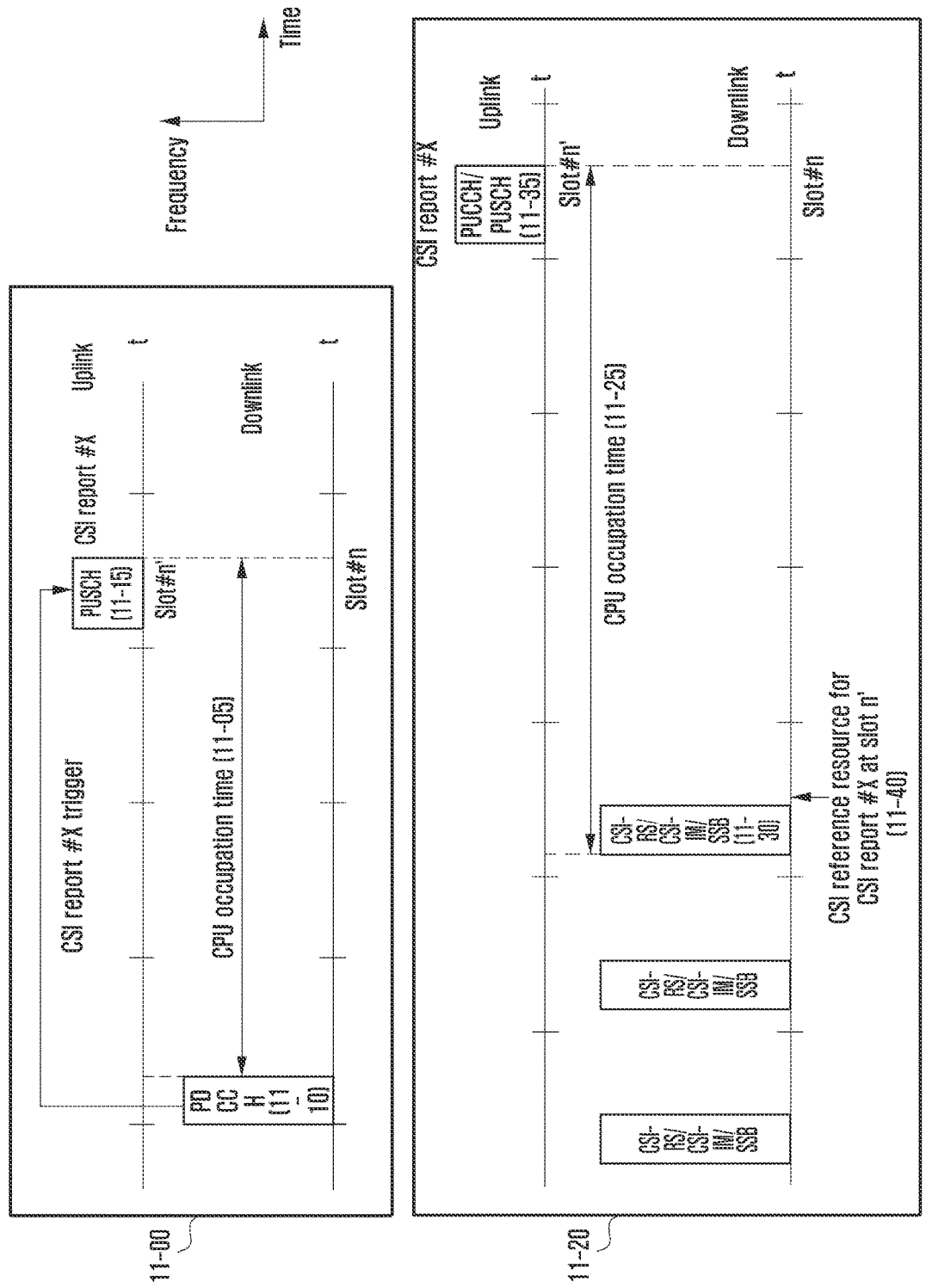
FIG. 11 illustrates a central processing unit (CPU) occupation time for a CSI report having a report quality included in the CSI report which is not configured as "none" according to an embodiment of the disclosure.

The example of FIG. 10 illustrates a configuration of the offset value X=0. In this case, the UE may receive the CSI-RS 10-02 in the slot (corresponding to slot 0 in FIG. 11) for receiving DCI format 0_1 of triggering the aperiodic CSI report and report CSI information measured by the received CSI-RS to the BS through the PUSCH 10-05. The UE may acquire scheduling information (information corresponding to each field of DCI format 0_1) for the PUSCH 10-05 for the CSI report from DCI format 0_1. For example, the UE may acquire information on a slot for transmitting the PUSCH 10-05 based on the time domain resource allocation information for the PUSCH 10-05 in DCI format 0_1. In the example of FIG. 11, the UE may acquire 3 that is a K2 value corresponding to a slot offset value for PDCCH-to-PUSCH, and accordingly, the PUSCH 10-05 may be transmitted at a time point at which the PDCCH 10-01 is received, in slot 3 10-09 spaced apart from slot 0 10-06 by 3 slots.

In another example of FIG. 10, the UE may acquire DCI format 0_1 by monitoring a PDCCH 10-11 and acquire scheduling information for a PUSCH 10-15 and CSI request information therefrom. The UE may acquire resource information for a CSI-RS 11-12, to be measured, from the received CSI request indicator. The example of FIG. 10 illustrates a configuration of the offset value X=1 for the CSI-RS. In this case, the UE may receive a CSI-RS 10-12 in the slot (corresponding to slot 0 10-16 in FIG. 10) for receiving DCI format 0_1 of triggering the aperiodic CSI report and report CSI information measured by the received CSI-RS to the BS through the PUSCH 10-15 in slot 3 10-19.

The BS may transmit the precoded or beamformed CSI-RS to the UE, and respective precoded CSI-RS ports may be individual transmission layers to which different precoders are applied. At this time, the BS may indicate that the CSI-RS has been precoded to the UE through the CSI report associated with the CSI-RS. More specifically, when the BS prevents PMI reporting from being performed by configuring the CSI type reported through the CSI report, that is, reportQuantity as "cri-RI-CQI", the UE may recognize that the CSI-RS associated with the CSI report has been precoded. The BS may indicate a CSI-RS port to which each RI reported by the UE is mapped through a higher-layer parameter non-PMI-PortIndication. For example, the use of CSI-RS port #X when RI=1 is reported and the use of CSI-RS ports {#Y, #Z} when RI=2 is reported may be indicated through the higher-layer parameter. After calculating the number of CSI-RS ports that achieve an optimal rank according to the mapping, the UE may report the corresponding number of ports to the BS in an RI form. When the higher-layer parameter is not configured, it may be assumed that RI=1 indicates that CSI-RS port #0 is mapped and used, RI=2 indicates that CSI-RS ports {#0, #1} are mapped and used, and RI=3 indicates that CSI-RS ports {#0, #1, #2} are mapped and used.

When the BS indicates the aperiodic CSI report or the semi-persistent CSI report to the UE through DCI, the UE may determine whether a valid channel report can be performed through the indicated CSI report based on a channel computation time required for the CSI report (CSI computation time). For the aperiodic CSI report or the semi-persistent CSI report indicated through DCI, the UE may perform the valid CSI report from an uplink symbol after Z symbols from the end of the last symbol included in the PDCCH including DCI indicating the CSI report, and the Z symbols may vary depending on numerology of a downlink BWP corresponding to the PDCCH including DCI indicating the CSI report, numerology of an uplink BWP corresponding to the PUSCH transmitting the CSI report, and a type or a characteristic of channel information reported by the CSI report (report quantity, frequency band granularity, the number of ports of reference signals, a codebook type, and the like). In other words, in order to determine which CSI report is valid (in order to make the corresponding CSI report a valid CSI report), uplink transmission of the corresponding CSI report must not be performed earlier than a symbol Zref, including timing advance. At this time, the symbol Zref is an uplink symbol starting a cyclic prefix (CP) after a time $T_{proc,CSI}=(Z)(2048+144)\cdot\kappa 2^{-\mu}\cdot T_C$ from the moment the last symbol of the triggering PDCCH ends. A detailed value of Z follows the description below, and $T_c=1/(\Delta f_{max}\cdot N_f)$, $\Delta f_{max}=480\cdot 10^3$ Hz, $N_f=4096$, $\kappa=64$, and $\mu$ are numerology. $\mu$ may be appointed such that a value causing the largest $T_{proc,CS}$ among $(\mu_{PDCCH},\mu_{CSI-RS},\mu_{UL})$ is used, $\mu_{PDCCH}$ denotes subcarrier spacing used for PDCCH transmission, $\mu_{CSI-RS}$ denotes subcarrier spacing used for CSI-RS transmission, and $\mu_{UL}$ denotes subcarrier spacing of an uplink channel used for uplink control information (UCI) transmission for CSI reporting. In another example, can be appointed to use a value that causes the largest $T_{proc,CS)}$ among $(\mu_{PDCCH},\mu_{UL})$. Definition of $\mu_{PDCCH}$ and $\mu_{UL}$ is referred to by the above description. For convenience of later description, satisfaction of the above condition means satisfaction of CSI reporting validity condition 1.

When the reference signal for channel measurement for the aperiodic CSI report indicated to the UE through DCI is an aperiodic reference signal, the terminal may perform the valid CSI report from an uplink symbol after Z' symbols from the end of the last symbol including the reference signal, and the Z' symbols may vary depending on numerology of a downlink BWP corresponding to the PDCCH including DCI indicating the CSI report, numerology of a BSP corresponding to a reference signal for channel measurement for the CSI report, numerology of an uplink BWP corresponding to the PUSCH transmitting the CSI report, and a type or a characteristic of channel information reported by the CSI report (report quantity, frequency band granularity, the number of ports of reference signals, codebook type, and the like). In other words, in order to determine which CSI report is valid (in order to make the corresponding CSI report a valid CSI report), uplink transmission of the corresponding CSI report must not be performed earlier than a symbol Zref', including timing advance. At this time, the symbol Zref' is an uplink symbol starting a cyclic prefix (CP) after a time $T'_{proc,CSI}=(Z'(2048+144)\cdot\kappa 2^{-\mu}\cdot T_C$ from the moment the last symbol of the aperiodic CSI-RS or aperiodic CSI-IM triggered by the triggering PDCCH ends. A detailed value of Z' follows the description below, and $T_c=1/(\Delta f_{max}\cdot N_f)$, $\Delta f_{max}=480\cdot 10^3$ Hz, $N_f=4096$, $\kappa=64$, and $\mu$ are numerology. $\mu$ may be appointed such that a value causing the largest $T_{proc,CS)}$ among $(\mu_{PDCCH},\mu_{CSI-RS},\mu_{UL})$ is used, $\mu_{PDCCH}$ denotes subcarrier spacing used for PDCCH transmission, $\mu_{CSI-RS}$ denotes subcarrier spacing used for CSI-RS transmission, and $\mu_{UL}$ denotes subcarrier spacing of an uplink channel used for Uplink Control Information (UCI) transmission for CSI reporting. In another example, $\mu$ can be appointed to use a value that causes the largest $T_{proc,CSI}$ among ($\mu_{PDCCH}, \mu_{UL}$) Definition of $\mu_{PDCCH}$ and $\mu_{UL}$ is referred to by the above description. For convenience of later description, satisfaction of the above condition means satisfaction of CSI reporting validity condition 2.

When the BS indicates the aperiodic CSI report for the aperiodic reference signal to the UE through DCI, the UE may perform the valid CSI report from a first uplink symbol satisfying both a time point after Z symbols after the end of the last symbol included in the PDCCH including DCI indicating the CSI report and a time point after Z' symbols after the end of the last symbol including the reference signal. For example, only when CSI reporting validity conditions 1 and 2 are all satisfied, the aperiodic CSI reporting based on the aperiodic reference signal may be determined as the valid CSI report.

When the CSI report time point indicated by the BS does not satisfy a CSI computation time requirement, the UE may determine that the corresponding CSI report is not valid and may not consider an update of the channel information state for the CSI report.

The Z and Z' symbols for calculating the CSI computation time follow Table 36 and Table 37 below. For example, when channel information reported by the CSI report includes only wideband information, the number of ports of the reference signal is equal to or smaller than 4, the number of reference signal resources is 1, and the codebook type is "typeI-SinglePanel" or the report channel information type (report quantity) is "cri-RI-CQI", the Z and Z' symbols follow $Z_1$ and $Z_1'$ in Table 37. This is named delay requirement 2 later. In addition, when the PUSCH including the CSI report does not include a TB or HARQ-ACK and CPU occupation of the UE is 0, the Z and Z' symbols follow $Z_1$ and $Z_1'$ in Table 36, which is named delay requirement 1. The CPU occupation is described below in detail. When the report quantity is "cri-RSRP" or "ssb-Index-RSRP", the Z and Z' symbols follow $Z_3$ and $Z_3'$ in Table 37. $X_1$, $X_2$, $X_3$, and $X_4$ in Table 37 indicate UE capability for a beam report time, and $KB_1$ and $KB_2$ in Table 37 indicate UE capability for a beam change time. In the case that does not correspond to the type or the characteristic of the channel information reported by the CSI report, Z and Z' symbols follow $Z_2$ and $Z_2'$ in Table 37.

TABLE 36

| | $Z_1$ [symbols] | |
|---|---|---|
| $\mu$ | $Z_1$ | $Z'_1$ |
| 0 | 10 | 8 |
| 1 | 13 | 11 |
| 2 | 25 | 21 |
| 3 | 43 | 36 |

TABLE 37

| | $Z_1$ [symbols] | | $Z_2$ [symbols] | | $Z_3$ [symbols] | |
|---|---|---|---|---|---|---|
| $\mu$ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |

TABLE 37-continued

| | $Z_1$ [symbols] | | $Z_2$ [symbols] | | $Z_3$ [symbols] | |
|---|---|---|---|---|---|---|
| $\mu$ | $Z_1$ | $Z'_1$ | $Z_2$ | $Z'_2$ | $Z_3$ | $Z'_3$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

When indicating the aperiodic/semi-persistent/periodic CSI report to the UE, the BS may configure CSI reference resources in units of slots in order to determine a reference time of the reference signal for channel information measurement reported by the CSI report. For example, when transmission of CSI report #X in uplink slot n' is indicated, CSI reference resources of CSI report #X transmitted in uplink slot n' may be defined as downlink slot n-$n_{CSI-ref}$. Downlink slot n is calculated as n=$\lfloor n' \cdot 2^{\mu DL}/2^{\mu UL} \rfloor$ based on downlink and uplink numerologies pDL and VUL. When CSI report #0 transmitted in uplink slot n' is the semi-persistent report or the periodic CSI report, nCSI-ref that is a slot interval between downlink slot n and the CSI reference resource follows $n_{CSI-ref}$=4·$2^{\mu DL}$ if a single CSI-RS resource is connected to the corresponding CSI report according to the number of CSI-RS resources for DL channel measurement, and follows $n_{CSI-ref}$5·$2^{\mu DL}$ if multiple CSI-RS resources are connected to the corresponding CSI report. When CSI report #0 transmitted in uplink slot n' is the aperiodic CSI report, n is calculated as $n_{CSI-ref}$=$\lceil Z'/N_{symb}^{slot} \rceil$ based on the CSI computation time Z' for channel measurement. $N_{symb}^{slot}$ is the number of symbols included in one slot and it is assumed that $N_{symb}^{slot}$=14 in NR.

When the BS indicates transmission of any CSI report in uplink slot n' to the UE through higher-layer signaling or DCI, the UE may report the CSI by performing channel measurement or interference measurement for CSI-RS resources, CSI-IM resources, or SSB resources that are transmitted not later than a CSI reference resource slot of the CSI report transmitted in uplink slot n' among CSI-RS resources, CSI-IM resources, or SSB resources associated with the corresponding CSI report. The CSI-RS resources associated with the corresponding CSI report, the CSI-IM resources, or the SSB resources may be CSI-RS resources, CSI-IM resources, or SSB. resources, which are included in the resource set configured in resource setting referred to by report setting for the CSI report of the UE configured through higher-layer signaling, CSI-RS resources, CSI-IM resources, or SSB resources, which are referred to by a CSI report trigger state including a parameter for the corresponding CSI report, or CSI-RS resources, CSI-IM resources, or SSB resources, which care indicated by an ID of a Reference Signal (RS) set.

In embodiments of the disclosure, the CSI-RS/CSI-IM/SSB occasion is a time point at which CSI-RS/CSI-IM.SSB resource(s) determined by a combination of a higher-layer configuration or a combination of the higher-layer configuration and DCI triggering are transmitted. For example, as the semi-persistent or periodic CSI-RS resources, a slot transmitted according to a slot period and a slot offset configured through higher-layer signaling is determined, and transmission symbol(s) within the slot are determined with reference to one of resource mapping methods within the slot in Table 26 according to resource mapping information (resourceMapping). In another example, as the aperiodic CSI-RS resources, a slot transmitted according to a slot offset with the PDCCH including DCI indicating the channel report configured through higher-layer signaling is determined, and transmission symbol(s) within the slot are determined with reference to one of resource mapping methods within the slot in Table 26 according to resource mapping information (resourceMapping).

The CSI-RS occasion may be determined by independently considering the time point at which each CSI-RS resource is transmitted or considering together time points at which one or more CSI-RS resource(s) included in the resource set are transmitted, and accordingly two interpretations below are possible for the CSI-RS occasion according to each resource set configuration.

Interpretation 0-1-1: from a start point of the earliest symbol to an end point of the latest symbol in which one specific resource is transmitted among one or more CSI-RS resources included in resource set(s) configured in the resource setting referred to by the report setting configured for the CSI report Interpretation 0-1-2: from a start point of the earliest symbol in which CSI-RS resources transmitted at the earliest time point are transmitted to an end point of the latest symbol in which CSI-RS resources transmitted at the latest time point are transmitted among all CSI-RS resources included in resource set(s) configured in the resource setting referred to by the report setting configured for the CSI report Hereinafter, in embodiments of the disclosure, the individual application is possible based on the two interpretations for the CSI-RS occasion. Further, like in the case of the CSI-RS occasion, both the two interpretations can be considered for the CSI-IM occasion and the SSB occasion, but the principle is similar to the above description, and thus an overlapping description is omitted hereinafter.

In embodiments of the disclosure, "the CSI-RS/CSI-IM/SSB occasion for CSI report #X transmitted in uplink slot n'" is a set of the CSI-RS occasion, the CSI-IM occasion, and the SSB occasion which are not later than CSI reference resources of CSI report #X transmitted in uplink slot n' among CSI-RS occasions, CSI-IM occasions, and SSB occasions of CSI-RS resources, CSI-IM resources, and SSB resources included in the resource set configured in resource setting referred to by report setting configured for CSI report #X.

In embodiments of the disclosure, "the latest CSI-RS/CSI-IM/SSB occasion among the CSI-RS/CSI-IM/SSB occasions for CSI report #X transmitted in uplink slot n'" can have two interpretations below.

Interpretation 0-2-1: a set of occasions including the latest CSI-RS occasion among CSI-RS occasions for CSI report #X transmitted in uplink slot n', the latest CSI-IM occasion among CSI-RS occasions for CSI report #X transmitted in uplink slot n', and the latest SSB occasion among SSB occasions for CSI report #0 transmitted in uplink slot n'

Interpretation 0-2-2: the latest occasion among all of the CSI-RS occasions, the CSI-IM occasions, and the SSB occasions for CSI report #X transmitted in uplink slot n'

In embodiments of the disclosure, the individual application is possible based on both the two interpretations for the "latest CSI-RS/CSI-IM/SSB occasion among the CSI-RS/CSI-IM/SSB occasions for CSI report #X transmitted in uplink slot n'". When the two interpretations (interpretation 0-1-1 and interpretation 0-1-2) are considered for the CSI-RS occasion, the CSI-IM occasion, and the SSB occasion, "the latest CSI-RS/CSI-IM/SSB occasion among the CSI-RS/CSI-IM/SSB occasions for CSI report #X transmitted in uplink slot n'" can be individually applied based on all of four different interpretations (the application of interpretation 0-1-1 and interpretation 0-2-1, the application of interpretation 0-1-1 and interpretation 0-2-2, and the application of interpretation 0-1-2 and interpretation 0-2-1, and the application of interpretation 0-1-2 and interpretation 0-2-2) in embodiments of the disclosure.

The BS may indicate the CSI report based on an amount of channel information which can be simultaneously calculated by the UE for the CSI report, that is, the number of channel information computation units (CSI processing units (CPUs) of the UE. When the number of channel information computation units which the UE can simultaneously calculate is $N_{CPU}$ the UE may not expect the CSI report indication of the BS which requires channel information computations larger than $N_{CPU}$ or may not consider an update of channel information which requires channel information computations larger than $N_{CPU}$. $N_{CPU}$ may be reported to the BS by the UE through higher-layer signaling or may be configured by the BS through higher-layer signaling.

It is assumed that the CSI report indicated to the UE by the BS occupies some or all of the CPUs for channel information computation among the total number $N_{CPU}$ of pieces of channel information which can be simultaneously calculated by UE. When the number of channel information computation units required for each CSI report, for example, CSI report n(n=0,1, . . . ,N−1) is $O_{CPU}^{(n)}$ the number of channel information computation units required for a total of N CSI reports may be $\Sigma_{n=0}^{N-1} O_{CPU}^{(n)}$. The channel information computation units required for each reportQuantity configured in the CSI report may be configured as shown in Table 38 below.

TABLE 38

$O_{CPU}^{(n)}$ = 0: reportQuantity configured in CSI report is configured as "none" and trs-Info is configured in CSI-RS resource set connected to CSI report $O_{CPU}^{(n)}$ = 1: reportQuantity configured in CSI report is configured as "none", "cri-RSRP", or "ssb-Index-RSRP" and trs-Info is not configured in CSI-RS resource set connected to CSI report reportQuantity configured in CSI report is configured as "cri-RI-PMI-CQI", "cri-RI-i1", "cri-RI-i1-CQI", "cri-RI-CQI", or "cri-RI-LI-PMI-CQI"

>>$O_{CPU}^{(n)}$ = $N_{CPU}$: aperiodic CSI report is triggered and corresponding CSI report is not multiplexed with one or all of TB/HARQ-ACK; corresponding CSI report is wideband CSI, corresponds to maximum of 4 CSI-RS ports, and corresponds to a single resources having no CSI report, wherein codebookType corresponds to "typeI-SinglePanel" or reportQuantity corresponds to "cri-RI-CQI".

TABLE 38-continued (corresponding case may be the case corresponding to requirement 1 described above in which UE rapidly calculates an available CPU by using CSI and report the same)
>>$O_{CPU}^{(n)} = K_S$: all the remaining cases expect for the above cases; $K_S$ indicates number of CSI-RS resources within CSI-RS resource set for channel measurement.

When the number of channel information computations required by the UE for a plurality of CSI reports at a specific time point is larger than the number NCPU of channel information computation units which can be simultaneously calculated by the UE, the UE may not consider an update of channel information for some CSI reports. Among the plurality of indicated CSI reports, a CSI report which does not consider the update of the channel information is determined based on a time during which channel information computation required for at least one the CSI report occupies the CPU and a priority of the reported channel information. For example, the update of channel information for the CSI report starting at the latest time point of the time during which channel information computation required for the CSI report occupies the CPU may not be considered and the update of channel information may not be preferentially considered for the CSI report having a low priority of channel information.

The priority of the channel information may be determined with reference to Table 39 below.

TABLE 39

CSI priority value $\text{Pri}_{iCSI}$ (y, k, c, s) = 2 · $N_{cells}$ · $M_s$ · y + $N_{cells}$ · $M_s$ · k + $M_s$ · c + s
y = 0 in aperiodic CSI report transmitted through PUSCH, y = 1 in semi-persistent CSI report transmitted through PUSCH, y = 2 in semi-persistent CSI report transmitted through PUCCH, and y = 3 in periodic CSI report transmitted through PUCCH
k = 0 when CSI report includes L1-RSRP and k = 1 when CSI report does not include L1-RSPR
c: serving cell index, $N_{cells}$: maximum number of serving cells (maxNrofServingCells) configured through higher-layer signaling;
s: CSI report configuration index reportConfigID), $M_s$: maximum number of CSI report configurations (maxNrofCSI-ReportConfigurations) configured through higher-layer signaling The CSI priority for the CSI report is determined through the priority value PriiCSI(y,k,c,s) in Table 39. Referring to Table 39, the CSI priority value is determined through a type of channel information included in the CSI report, a time axis report characteristic of the CSI report (aperiodic, semi-persistent, periodic), a channel (PUSCH or PUCCH) in which the CSI report is transmitted, a serving cell index, or a CSI report configuration index. In the CSI priority for the CSI report, priority values PriiCSI(y,k,c,s) are compared and it is determined that a CSI priority for the CSI report having a smaller priority value is higher.

When a time occupying the CPU is a CPU occupation time based on channel occupation computation required for the CSI report which the BS indicates to the UE, the CPU occupation time is determined based on some or all of a type of channel information included in the CSI report (report quantity), a time axis characteristic of the CSI report (aperiodic, semi-persistent, periodic), a slot or a symbol occupied by higher-layer signaling or DCI indicating the CSI report, and a slot or a symbol occupied by a reference signal for channel state measurement.

FIG. 11 illustrates a CPU occupation time for a CSI report having a report quality included in the CSI report which is not configured as "none" according to an embodiment of the disclosure.

Reference numeral 11-00 referring to FIG. 11 illustrates a CPU occupation time for an aperiodic CSI report having a report quality included in the CSI report which is not configured as "none" according to some embodiments of the disclosure. When the BS indicates transmission of aperiodic CSI report #X in uplink slot n' through DCI using DCI format 0_1, a CPU occupation time 11-05 for CSI report #X transmitted in uplink slot n' may be defined as symbols from a symbol next to the last symbol occupied by a PDCCH 11-10 including DCI indicating aperiodic CSI report #X to the last symbol occupied by a PUSCH 11-15 including CSI report #X transmitted in uplink slot n'.

Reference numeral 11-20 referring to FIG. 9 illustrates a CPU occupation time for a periodic or semi-persistent CSI report having a report quality included in the CSI report which is not configured as "none" according to some embodiments of the disclosure. When the BS indicates transmission of periodic or semi-persistent CSI report #X in uplink slot n' through higher-layer signaling or DCI using DCI format 0_1 scrambled by an SP-CSI-RNTI, a CPU occupation time 11-25 for CSI report #X transmitted in uplink slot n' may be defined as symbols from a first symbol of the first transmitted CSI-RS/CSI-IM/SSB resource corresponding to the last CSI-RS/CSI-IM/SSB occasion 11-30 among CSI-RS/CSI-IM/SSB occasions for CSI report #X transmitted in uplink slot n' to the last symbol occupied by the PUCCH or the PUSCH including CSI report #X transmitted in uplink slot n' 1140, and the last CSI-RS/CSI-IM/SSB occasion 11-30 may not be located after the CSI reference resource for CSI report #X. Exceptionally, when the BS indicates a semi-persistent CSI report through DCI and the UE performs a first CSI report of semi-persistent CSI report #X, a CPU occupation time for the first CSI report may be defined as symbol from a symbol next to the last symbol occupied by the PDCCH including DCI indicating semi-persistent CSI report #X to the last symbol occupied by the PUSCH including the first CSI report. Accordingly, the operation causality in the time axis of the UE may be guaranteed based on a time point at which the CSI report is indicated and a time point at which the CPU occupation time starts.

For example, it may comply with the rule shown in Table 40.

TABLE 40

For a CSI report with CSI-ReportConfig with higher layer parameter reportQuantity not set to 'none', the CPU(s) are occupied for a number of OFDM symbols as follows:
A periodic or semi-persistent CSI report (excluding an initial semi-persistent CSI report on PUSCH after the PDCCH triggering the report) occupies CPU(s) from the first symbol of the earliest one of each CSI-RS/CSI-IM/SSB resource for channel or interference measurement, respective latest CSI-RS/CSI-IM/SSB occasion no later than the corresponding CSI reference resource, until the last symbol of the PUSCH/PUCCH carrying the report.
An aperiodic CSI report occupies CPU(s) from the first symbol after the PDCCH triggering the CSI report until the last symbol of the PUSCH carrying the report.
An initial semi-persistent CSI report on PUSCH after the PDCCH trigger occupies CPU(s) from the first symbol after the PDCCH until the last symbol of the PUSCH carrying the report.

Figure 12:
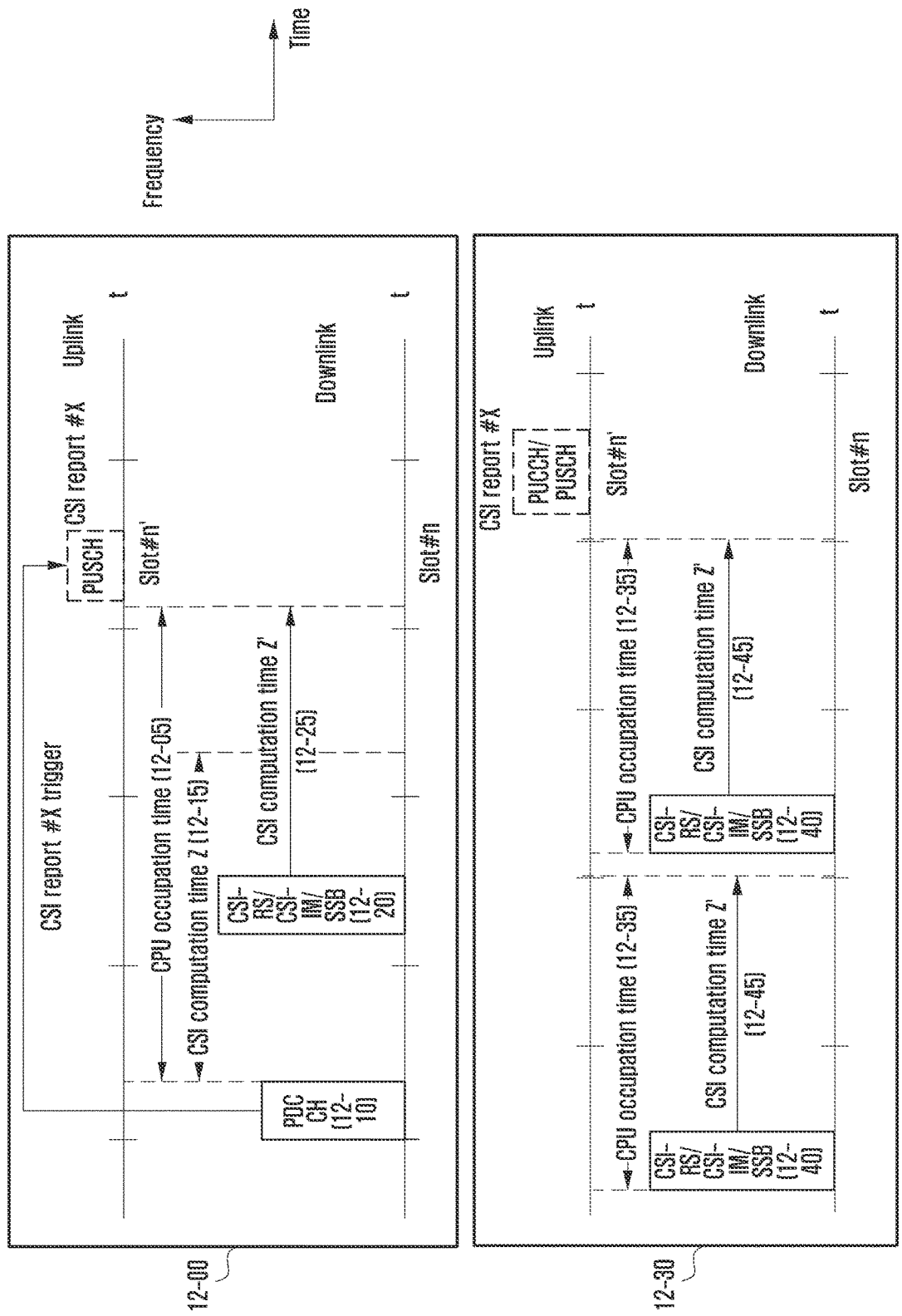
FIG. 12 illustrates a CPU occupation time for a CSI report having a report quality included in the CSI report which is configured as "none" according to an embodiment of the disclosure.

FIG. 12 illustrates a CPU occupation time for a CSI report having a report quality included in the CSI report which is configured as "none" according to an embodiment of the disclosure.

Referring to FIG. 12, reference numeral 12-00 illustrates a CPU occupation time for an aperiodic CSI report having a report quality included in the CSI report which is configured as "none" according to some embodiments of the disclosure. When the BS indicates transmission of aperiodic CSI report #X in uplink slot n' through DCI using DCI format 0_1, a CPU occupation time 12-05 for CSI report #X transmitted in uplink slot n' may be defined as symbols from a symbol next to the last symbol occupied by a PDCCH 12-10 including DCI indicating aperiodic CSI report #X to a symbol ending CSI computation. The symbol ending the CSI computation is the latest symbol among symbols after a CSI computation time Z 12-15 of the last symbol occupied by the PDCCH including DCI indicating CSI report #X and symbols after a CSI computation time Z' 12-25 of the last symbol of the most recent CSI-RS/CSI-IM/SSB 12-20 occasion for CSI report #X transmitted in uplink slot n'.

Reference numeral 12-30 referring to FIG. 12 illustrates a CPU occupation time for a periodic or semi-persistent CSI report having a report quality included in the CSI report which is configured as "none" according to some embodiments of the disclosure. When the BS indicates transmission of periodic or semi-persistent CSI report #X in uplink slot n' through higher-layer signaling or DCI using DCI format 0_1 scrambled by an SP-CSI-RNTI, a CPU occupation time 12-35 for CSI report #X transmitted in uplink slot n' may be defined as symbols from a first symbol of the first transmitted CSI-RS/CSI-IM/SSB resource corresponding to each CSI-RS/CSI-IM/SSB occasion 12-40 for CSI report #X transmitted in uplink slot n' to a symbol after a CSI computation time Z' 12-45 of the last symbol of the last transmitted CSI-RS/CSI-IM/SSB resource.

For example, it may comply with the rule shown in Table 41 below.

TABLE 41

For a CSI report with CSI-ReportConfig with higher layer parameter reportQuantity set to 'none' and CSI-RS-ResourceSet with higher layer parameter trs-Info is not configured, the CPU(s) are occupied for a number of OFDM symbols as follows:
A semi-persistent CSI report (excluding an initial semi-persistent CSI report on PUSCH after the PDCCH triggering the report) occupies CPU(s) from the first symbol of the earliest one of each transmission occasion of periodic or semi-persistent CSI-RS/SSB resource for channel measurement for L1-RSRP computation, until $Z'_3$ symbols after the last symbol of the latest one of the CSI-RS/SSB resource for channel measurement for L1-RSRP computation in each transmission occasion.
An aperiodic CSI report occupies CPU(s) from the first symbol after the PDCCH triggering the CSI report until the last symbol between $Z_3$ symbols after the first symbol after the PDCCH triggering the CSI report and $Z'_3$ symbols after the last symbol of the latest one of each CSI-RS/SSB resource for channel measurement for L1-RSRP computation.

In the NR system, a tracking RS (that is, TRS) may be configured to fine time/frequency tracking of the BS. The TRS may be called another term, such as a CSI-RS for tracking in the standard but is called the TRS for convenience of description in the specifications. The TRS may be transmitted in one (X=1) or two (X=2) successive slots with a specific period, such as 10 ms, 20 ms, or the like, which is named a TRS burst.

Figure 13:
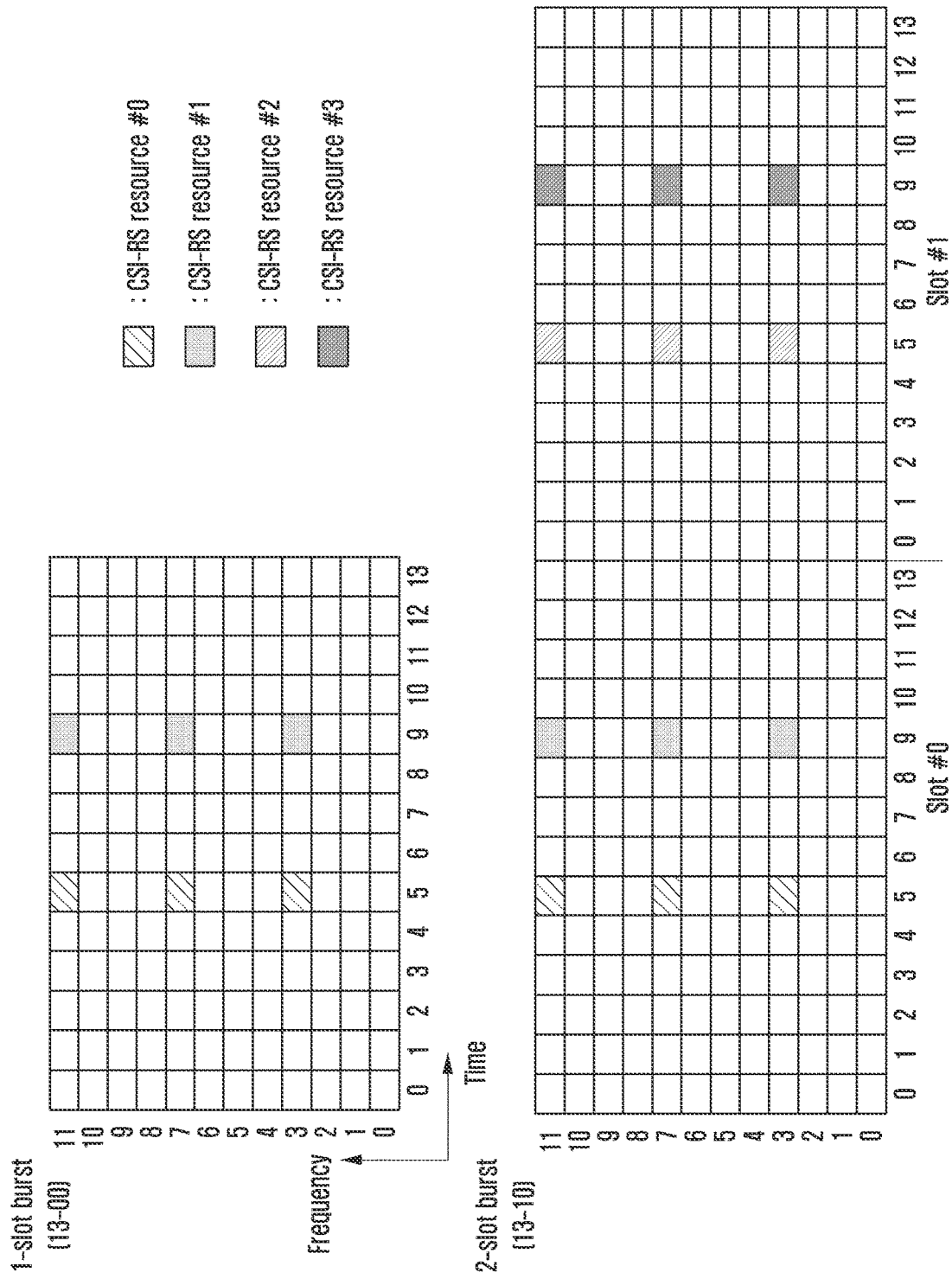
FIG. 13 illustrates an RE pattern of a TRS according to an embodiment of the disclosure.

FIG. 13 illustrates an RE patterm of the TRS according to an embodiment of the disclosure.

Referring to FIG. 13, examples of available TRS patterns within one slot 13-00 are illustrated. As illustrated in FIG. 13, the TRS may include a plurality of single port CSI-RS resources having a frequency RE density of 3 REs/RBs, and the number of CSI-RS resources which can be located within one slot may be 2. According to some embodiments of the disclosure, in a frequency band equal to or lower than 6 GHz referred to as frequency range 1 (FR1), the TRS may be transmitted over 2 consecutive slots, that is, X=2 as indicated by reference numeral 13-10, and a pair of symbols in which CSI-RS resources can be located within each slot may be one of [{fifth, ninth}, {sixth, tenth}, {seventh, eleventh}]. For example, transmission of one TRS may include 4 CSI-RS resources over 2 successive slots.

In a frequency band higher than or equal to 6 GHz referred to as frequency range 2 (FR2), a TRS transmission structure including 2 CSI-RS resources transmitted within one slot, that is, X=1 may be used as well as the TRS burst structure of FR1. At this time, pairs of symbols in which CSI-RS resources can be located within the slot may be [{first, fifth}, {second, sixth}, {third, seventh}, {fourth, eighth}, {fifth, ninth}, {sixth, tenth}, {seventh, eleventh}, {eighth, twelfth}, {ninth, thirteenth}, {tenth, fourteenth}]. In FIG. 11, the OFDM symbol location is an example of a TRS configuration, and it is noted that the actual transmission location may be changed according to transmission by the BS.

Figure 14:
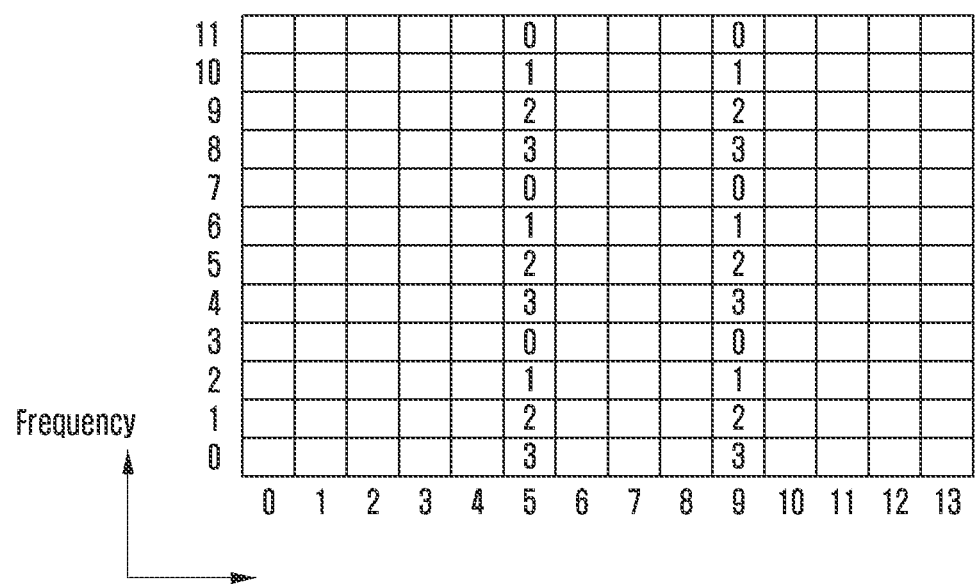
FIG. 14 illustrates a configuration of a single port CSI-RS according to an embodiment of the disclosure.

FIG. 14 illustrates a single port CSI-RS configuration according to an embodiment of the disclosure.

Referring to FIG. 14, it illustrates an example of a single port CSI-RS configuration for covering the TRS RE pattern of FIG. 13. The BS may configure one CSI resource set in one CSI resource setting (CSI resource config) and configure a maximum of 4 CSI-RS resources therein. At this time, a frequency density of the CSI-RS is configured as 3 REs/RBs/ports. The BS configures CSI-RS resources #0 and #1 when X=1 TRS burst is used, and configures CSI-RS resources #0, #1, #2, and #3 when X=2 TRS bursts are used. In the case of X=1 or X=2 TRS burst, for the CSI-RS resources configured within one resource set, the UE may assume the same antenna ports having the same port index, and perform continuous time/frequency tracking on the basis thereof. When CSI-RS resources within on CSI resource set are used as the TRS, the BS may configure a trs-Info parameter within the CSI resource set as "true". At this time, since a CSI report is not needed for the CSI-RS resources used as the TRS, it can be guaranteed that the UE uses the corresponding CSI-RS resources for time/frequency tracking and does not generate the CSI report by not configuring a report setting (CSI-ReportConfig) corresponding to the CSI resource set (that is, there is reporting setting referring to the corresponding CSI-RS resource) or making a configuration value of the reporting setting "none".

In FIG. 14, the subcarrier location and the OFDM symbol location of 1-port CSI-RS resource may be properly changed according to the TRS subcarrier location of FIG. 11.

The TRS can be transmitted in various forms, such as periodic, aperiodic, and the like. The periodic TRS (P-TRS) is periodically transmitted before an RRC reconfiguration according to an RRC-configured period and a slot offset value, and the aperiodic TRS (A-TRS) is triggered by a MAC CE or DCI and transmitted without any configuration of the period or the slot offset value. At this time, A-TRS triggering and A-TRS transmission timing may have offsets configured through a higher layer or follow pre-appointed values (for example, the A-TRS is transmitted in a slot which is the same as A-TRS triggering).

The aperiodic TRS (A-TRS) may be associated with the periodic TRS since the number of REs in the time axis lacks and thus it may be difficult to measure a statistical characteristic of the channel. The association between the A-TRS and the P-TRS can be supported through various methods, such as quasi-co-location (CQL) and the like. For example, the BS may configure at least one P-TRS as a QCL reference RS in the A-TRS to extract channel statistical values, such as delay spread, average delay, Doppler spread, Doppler shift, and the like (QCL type A) or extract spatial parameters, such as a TX beam, or an RX beam (QCL type D).

Further, the TRS receives allocation of bandwidth information from a higher-layer parameter freqBand and, a bandwidth of the TRS is the same as a bandwidth of a BWP when the bandwidth of the BWP in which the corresponding TRS is transmitted is narrower than 52 RBs, the bandwidth of the TRS is configured as 52 RBs when the bandwidth of BWP in which the corresponding TRS is transmitted is larger than or equal to 52 RBs.

Subsequently, a reference signal (sounding reference signal (SRS)) for uplink channel measurement is described in detail. The BS may indicate SRS transmission to the UE for uplink channel measurement, and the UE may transmit an SRS according to an indication.

Figure 15:
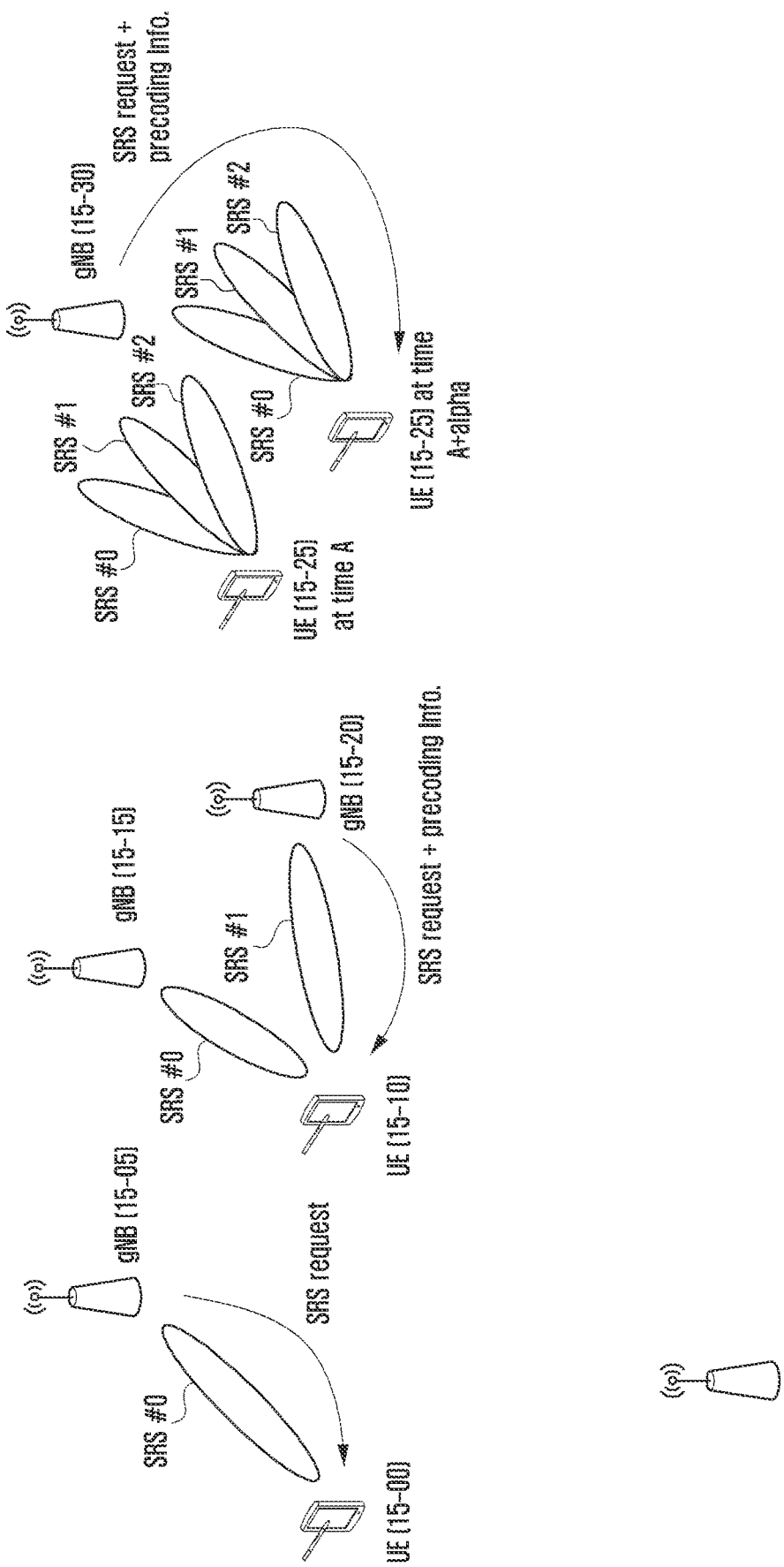
FIG. 15 illustrates various SRS operation scenarios according to an embodiment of the disclosure.

FIG. 15 illustrates various operation scenarios of an SRS according to an embodiment of the disclosure.

Referring to FIG. 15, at least three SRS operation scenarios below can be considered in the NR system.

1) A gNB 15-05 configures a one-direction beam in a UE 15-00 (configuring a one-direction beam/precoding in the specifications includes applying no beam/precoding or applying a wide beam (cell-coverage or sector coverage), and the UE 15-00 transmits an SRS according to a transmission period and an offset of the SRS in the case of a periodic SRS or a semi-persistent SRS and according to an SRS request of the gNB (at a predetermined time after the SRS request) in the case of an aperiodic SRS. At this time, the SRSs do not need additional information for beam/precoding.

2) gNBs 15-15 and 15-20 configure beams in one or more directions in a UE 15-10, and the UE 15-10 may transmit a plurality of SRSs beamformed in the one or more directions. For example, as illustrated in the example of FIG. 15, it is possible to configure SRS resource (or port) #0 to be beamformed to the gNB 15-15 and SRS resource (or port) #1 to be beamformed to the gNB 15-20. In this case, the gNBs 15-15 and 15-20 are required to inform not only the SRS request but also SRS beam/precoding information unlike method 1).

3) A gNB 15-30 configures beams in one or more directions in a UE 15-25, and the UE 15-25 may transmit a plurality of SRSs beamformed in the one or more directions. For example, as illustrated in the example of FIG. 15, the gNB may configure the UE to transmit the SRSs by applying different beams/precodings to SRS resource (or port) #0, SRS resource (or port) #1, and SRS resource (or port) #2. Accordingly, even when mobility of the UE is high, communication can be stably performed through beam/precoder diversity. For example, the UE 15-25 may provide channel state information to the gNB 15-30 through SRS #2 at a time point of time A and provide channel state information to the gNB 15-30 through SRS #0 at a time point of time A+alpha. In this case, the gNB 15-30 is required to inform not only the SRS request but also SRS beam/precoding information unlike method 1).

The above description has been made based on SRS transmission, but may be similarly expanded to different UL channel or/and RS transmission, such as a PRACH, a PUSCH, a PUCCH, and the like, and a detailed description for all cases is omitted to prevent the subject of the disclosure from being unclear.

Figure 16:
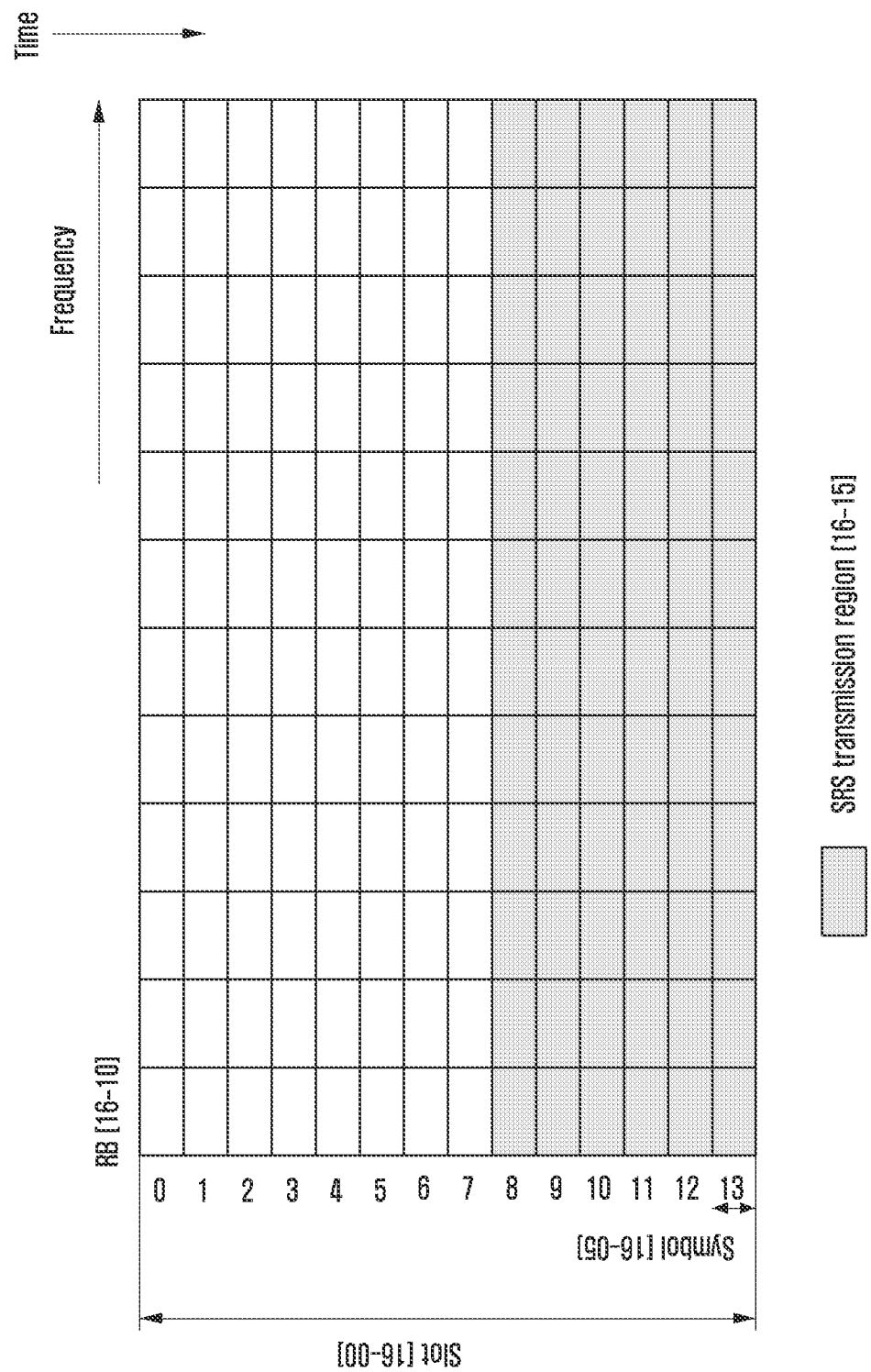
FIG. 16 illustrates a structure of uplink transmission in a wireless communication system according to an embodiment of the disclosure.

FIG. 16 illustrates an uplink transmission structure of a wireless communication system according to an embodiment of the disclosure.

Referring to FIG. 16, a basic transmission unit of the 5G or NR system is a slot 16-00, each slot includes 14 symbols 16-05 based on the assumption of a normal cyclic prefix (CP)length, and 1 symbol may correspond to one UL waveform (CP-OFDM or DFT-S-OFDM) symbol.

A resource block (RB) 16-10 is a resource allocation unit corresponding to one slot based on a time domain and may include 12 subcarriers based on a frequency domain.

An uplink structure may be largely divided into a data region and a control region. Unlike the LTE system, the control region may be configured at a predetermined uplink location and transmitted in the 5G or NR system. The data region includes a series of communication resources including data, such as a voice, a packet, and the like transmitted to each UE and corresponds to the remaining resources except for the control region in the subframe. The control region includes a series of communication resources for a downlink channel quality report from each UE, reception ACK/NACK for a downlink signal, an uplink scheduling request, and the like.

The UE may simultaneously transmit its own data and control information in the data region and the control region. According to an embodiment of the disclosure, symbols in which the UE can periodically transmit the SRS within one slot may be the last 6-symbol section 16-15, and may be transmitted through a preconfigured SRS transmission band within a UL BWP based on the frequency domain. However, this is only an example, and symbols capable of transmitting the SRS may be expanded to another time section or may be transmitted through a frequency band. When RBs capable of transmitting the SRS are transmitted in the frequency domain, the number of RBs may be a multiple of 4 RBs and a maximum of 272 RBs.

According to an embodiment of the disclosure, the number of symbols of the SRS may be configured as 1, 2, or 4, and successive symbols may be transmitted. In the 5G or NR system, repetitive transmission of SRS symbols is allowed. Specifically, a repetitive transmission factor (repetition factor r) of the SRS symbols is $r \in \{1,2,4\}$, where $r \leq N$. For example, when one SRS antenna is mapped to one system and transmitted, a maximum of 4 symbols may be repeatedly transmitted. Meanwhile, different 4 antenna ports may be transmitted through different 4 symbols. At this time, each antenna port is mapped to one symbol, and thus repetitive transmission of SRS symbols is not allowed. The above example is only an example, and the number N of symbols of the SRS and the repetition factor r may be expanded to different values.

The SRS may include constant amplitude zero auto correlation (CAZAC) sequences. CAZAC sequences including SRSs transmitted from a plurality of UEs have different cyclic shift values. Further, in one CAZAC sequence, each of the CAZAC sequences generated through a cyclic shift has a zero correlation value with sequences having a cyclic shift value different therefrom. SRSs simultaneously allocated to the same frequency domain using such a characteristic may be divided according to the CAZAC sequence cyclic shift value configured by the BS for each SRS.

SRSs of a plurality of UEs may be divided according to not only the cyclic shift value but also a frequency location. The frequency location may be divided by SRS subband unit allocation or Comb. The 5G or NR system may support Comb2 and Comb4. In the case of Comb2, one SRS may be allocated only to an even-numbered or odd-numbered subcarrier within the SRS subband. At this time, each of the even-numbered subcarriers and the odd-numbered subcarriers may configure one Comb.

Each UE may receive allocation of the SRS subband based on a tree structure. The UE may perform hopping on SRSs allocated to each subband at every SRS transmission time point. Accordingly, all transmission antennas of the UE may transmit SRSs through the entire uplink data transmission bandwidth.

Figure 17:
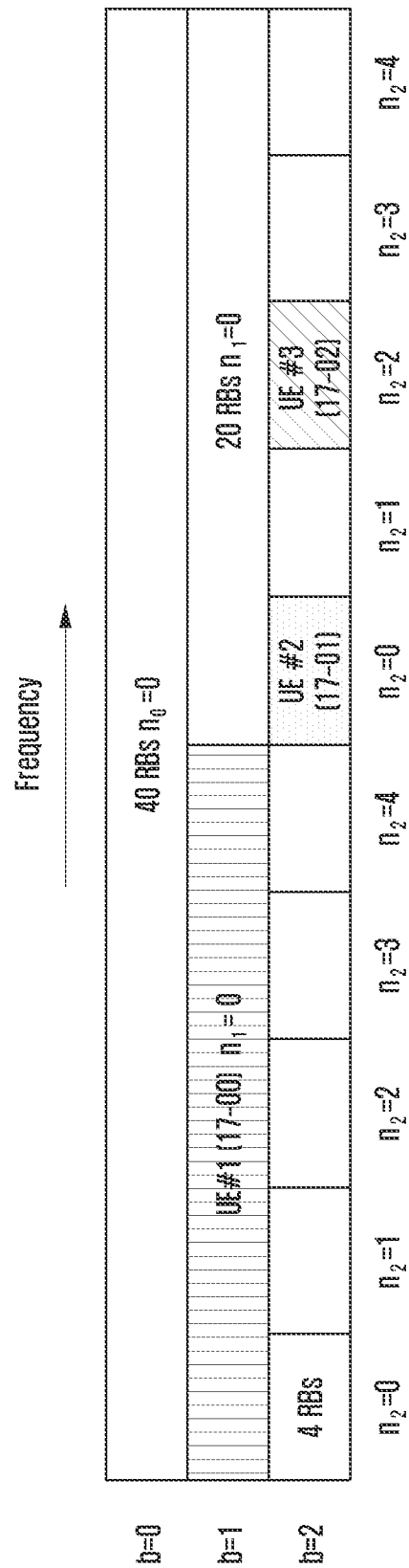
FIG. 17 illustrates a structure in which SRSs are allocated for each subband according to an embodiment of the disclosure.

FIG. 17 illustrates a structure in which SRSs are allocated for each subband according to an embodiment of the disclosure.

Referring to FIG. 17, an example in which, when there is a data transmission band corresponding to 40 RBs in the frequency, the SRSs are allocated to each UE based on a tree structure configured by the BS is illustrated.

In FIG. 17, when a level index of the tree structure is b, a highest level (b=0) of the tree structure may include one SRS subband in a bandwidth of 40 RBs. At a second level (b=1), 2 SRS subbands of a bandwidth of 20 RBs may be generated from the SRS subband at level b=0. Accordingly, there may be 2 SRS subbands in the entire data transmission band at the second level (b=1). At a third level (b=2), 5 SRS subbands of 4 RBs may be generated from the one SRS subband of 20 RBs at the next above level (b=1), and there may be a structure in which 10 SRS subbands of 4 RBs exist at one level.

The configuration of the tree structure may have various numbers of levels, various sizes of the SRS subband, and various numbers of SRS subbands per level according to the configuration of the BS. The number of SRS subbands at the level b generated from one SRS subband at the higher level may be defined as $N_b$ and indexes of $N_b$ SRS subbands may be defined as $n_b = \{0, \ldots, N_b-1\}$. As subbands vary depending on the level, UEs may be allocated for each subband per level as illustrated in FIG. 15. For example, UE 1 17-00 may be allocated to a first SRS subband ($n_1=0$) among 2 SRS subbands, each of which has a bandwidth of 20 RBs at level b=1, and UE 2 17-01 and UE 3 17-02 may be allocated to a first SRS subband ($n_2=0$) and a third SRS subband ($n_2=2$) below a second SRS subband of 20 RBs, respectively. Through the processes, a plurality of UEs may simultaneously transmit SRSs through a plurality of SRS subbands within one CC.

Specifically, for the SRS subband configuration, NR supports SRS bandwidth configurations shown in Table 42 below.

TABLE 42

| $C_{SRS}$ | $B_{SRS} = 0$ | | $B_{SRS} = 1$ | | $B_{SRS} = 2$ | | $B_{SRS} = 3$ | |
| | $m_{SRS,0}$ | $N_0$ | $m_{SRS,1}$ | $N_1$ | $m_{SRS,2}$ | $N_2$ | $m_{SRS,3}$ | $N_3$ |
|---|---|---|---|---|---|---|---|---|
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |

TABLE 42-continued

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

Further, NR supports SRS frequency hopping based on values in Table 42 above, and a detailed procedure follows Table 43 below.

TABLE 43

When SRS is transmitted on a given SRS resource, the sequence $r^{(p_i)}(n, l')$ for each OFDM symbol $l'$ and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0,l')$ to resource elements (k,l) in a slot for each of the antenna ports $p_i$ according to $$a^{(p_i)}_{K_{TC}k'+k_0^{(p_i)},l'+l_0} = \begin{cases} \frac{1}{\sqrt{N_{ap}}} \beta_{SRS} r^{(p_i)}(k', l') & k' = 0, 1, \ldots, M_{sc,b}^{SRS} - 1 \quad l' = 0, 1, \ldots, N_{symb}^{SRS} - 1 \\ 0 & \text{otherwise} \end{cases}$$

The length of the sounding reference signal sequence is given by
$M_{SC,b}^{SRS} = m_{SRS,b} N_{SC}^{RB}/K_{TC}$
where $m_{SRS,b}$ is given by a selected row of Table 6.4.1.4.3-1 with $b = B_{SRS}$ where $B_{SRS} \in \{0,1,2,3\}$ is given by the field b-SRS contained in the higher-layer parameter freqHopping. The row of the table is selected according to the index $C_{SRS} \in \{0,1,\ldots, 63\}$ given by the field c-SRS contained in the higher-layer parameter freqHopping.
The frequency-domain starting position $k_0^{(p_i)}$ is defined by $$k_0^{(p_i)} = \bar{k}_0^{(p_i)} + \sum_{b=0}^{B_{SRS}} K_{TC} M_{sc,b}^{SRS} n_b$$

where $$\bar{k}_0^{(p_i)} = n_{shift} N_{sc}^{RB} + k_{TC}^{(p_i)}$$

$$k_{TC}^{(p)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases}$$

If $N_{BWP}^{START} \leq n_{shift}$ the reference point for $k_0^{(p_i)} = 0$ is subcarrier 0 in common resource block 0, otherwise the reference point is the lowest subcarrier of the BWP. The frequency domain shift value $n_{shift}$ adjusts the SRS allocation with respect to the reference point grid and is contained in the higher-layer parameter freqDomainShift in the SRS-Config IE. The transmission comb offset $\bar{k}_{TC} \in \{0, 1, \ldots, K_{TC} - 1\}$ is contained in the higher-layer parameter transmissionComb in the SRS-Config IE and $n_b$ is a frequency position index.
Frequency hopping of the sounding reference signal is configured by the parameter $b_{hop} \in \{0,1,2,3\}$, given by the field b-hop contained in the higher-layer parameter freqHopping.

TABLE 43-continued

If $b_{hop} \geq B_{SRS}$, frequency hopping is disabled and the frequency position index
$n_b$ remains constant (unless re-configured) and is defined by
$n_b = \lfloor 4n_{RRC}/m_{SRS, b} \rfloor \mod N_b$
for all $N_{symb}^{SRS}$ OFDM symbols of the SRS resource. The quantity $n_{RRC}$ is given
by the higher-layer parameter freqDomainPosition and the values of $m_{SRS, b}$ and $N_b$ for
$b = B_{SRS}$ are given by the selected row of Table 6.4.1.4.3-1 corresponding to the
configured value of $C_{SRS}$.
If $b_{hop} < B_{SRS}$, frequency hopping is enabled and the frequency position indices
$n_b$ are defined by $$n_b = \begin{cases} \lfloor 4n_{RRC}/m_{SRSb} \rfloor \mod N_b & b \leq b_{hop} \\ \{F_b(n_{SRS}) + \lfloor 4n_{RRC}/m_{SRSb} \rfloor\} \mod N_b & \text{otherwise} \end{cases}$$

where $N_b$ is given by Table 6.4.1.4.3-1, $$F_b(n_{SRS}) = \begin{cases} (N_b/2) \left\lfloor \frac{n_{SRS} \mod \prod_{b'=b_{hop}}^{b} N_{b'}}{\prod_{b'=b_{hop}}^{b-1} N_{b'}} \right\rfloor + \left\lfloor \frac{n_{SRS} \mod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

and where $N_{b_{hop}} = 1$ regardless of the value of $N_b$. The quantity $n_{SRS}$ counts
the number of SRS transmissions. For the case of an SRS resource configured as
aperiodic by the higher-layer parameter resourceType, it is given by $n_{SRS} = \lfloor l'/R \rfloor$ within
the slot in which the $N_{symb}^{SRS}$ symbol SRS resource is transmitted. The quantity $R \leq N_{sym}^{SRS}$
is the repetition factor given by the field repetitionFactorcontained in the higher-layer
parameter resourceMapping.

As described above, the 5G or NR UE supports a single user (SU)-MIMO scheme and has a maximum of 4 transmission antennas. Further, the NR UE may simultaneously transmit SRSs through a plurality of CCs or a plurality of SRS subbands within the CCs. Unlike the LTE system, in the 5G or NR system, various numerologies may be supported, a plurality of SRS transmission symbols may be variously configured, and repetitive SRS transmission through a repetition factor may be allowed. Accordingly, it is required to count SRS transmissions considering the same. Counting SRS transmissions may be variously used. For example, counting SRS transmissions may be used to support antenna switching according to SRS transmission. Specifically, a time point at which the SRS is transmitted, an antenna corresponding to the transmitted SRS, and a band in which the SRS is transmitted may be determined by the SRS transmission counting.

The BS may configure configuration information for transmitting an uplink reference signal to the UE. Specifically, the BS may indicate SRS configuration information for each uplink BWP to the UE in the form of higher-layer signaling srs-Config as shown in Table 44.

TABLE 44

BWP-UplinkDedicated::    SEQUENCE
    pucch-Config    SetupRelease {PUCCH-Config} OPTIONAL,--Need M
(PUCCH configuration for one bandwidth of supported cell)
    pusch-Config    SetupRelease {PUSCH-Config} OPTIONAL,--Need M
(PUSCH configuration for one bandwidth of supported cell)
        configuredGrantConfig SetupRelease {ConfiguredGrantConfig} OPTIONAL,--
Need M
(configuration for type 1 or type 1 of configured grant Configured-Grant)
    srs-Config    SetupRelease {SRS-Config} OPTIONAL,--Need M
(configure uplink SRS)
        beamFailureRecoveryConfig    SetupRelease {BeamFailureRecoveryConfig}
OPTIONAL,-- Cond SpCellOnly
(configuration for beam failure recovery)
}

According to an embodiment of the disclosure, a detailed structure of higher-layer signaling srs-Config may include at least some of the parameters listed in Table 45.

TABLE 45

```
SRS-Config ::=              SEQUENCE {
  srs-ResourceSetToReleaseList              SEQUENCE (SIZE(1..maxNrofSRS-
ResourceSets)) OF SRS-ResourceSetId   OPTIONAL, -- Need N
  srs-ResourceSetToAddModList               SEQUENCE (SIZE(1..maxNrofSRS-
ResourceSets)) OF SRS-ResourceSet     OPTIONAL, -- Need N
  srs-ResourceToReleaseList                 SEQUENCE (SIZE(1..maxNrofSRS-
Resources)) OF SRS-ResourceId         OPTIONAL, -- Need N
  srs-ResourceToAddModList                  SEQUENCE (SIZE(1..maxNrofSRS-
Resources)) OF SRS-Resource           OPTIONAL, -- Need N
  tpc-Accumulation                          ENUMERATED {disabled}
OPTIONAL, -- Need S
  ...
}
SRS-ResourceSet ::=         SEQUENCE {
  srs-ResourceSetId         SRS-ResourceSetId,
  srs-ResourceIdList                        SEQUENCE (SIZE(1..maxNrofSRS-
ResourcesPerSet)) OF SRS-ResourceId   OPTIONAL, -- Cond Setup
  resourceType              CHOICE {
    aperiodic               SEQUENCE {
      aperiodicSRS-ResourceTrigger            INTEGER (1..maxNrofSRS-
TriggerStates-1),
      csi-RS                                NZP-CSI-RS-ResourceId
OPTIONAL, -- Cond NonCodebook
      slotOffset            INTEGER (1..32)          OPTIONAL,
-- Need S
      ...,
      [[
      aperiodicSRS-ResourceTriggerList              SEQUENCE
(SIZE(1..maxNrofSRS-TriggerStates-2))
                            OF       INTEGER    (1..maxNrofSRS-
TriggerStates-1) OPTIONAL -- Need M
      ]]
    },
    semi-persistent         SEQUENCE {
      associatedCSI-RS                      NZP-CSI-RS-ResourceId
OPTIONAL, -- Cond NonCodebook
      ...
    },
    periodic                SEQUENCE {
      associatedCSI-RS                      NZP-CSI-RS-ResourceId
OPTIONAL, -- Cond NonCodebook
      ...
    }
  },
  usage                     ENUMERATED {beamManagement, codebook,
nonCodebook, antennaSwitching},
  alpha         Alpha                               OPTIONAL,
-- Need S
  p0      INTEGER (-202..24)                        OPTIONAL,
-- Cond Setup
  pathlossReferenceRS               CHOICE {
    ssb-Index               SSB-Index,
    csi-RS-Index            NZP-CSI-RS-ResourceId
  }                                                 OPTIONAL, --
Need M
  srs-PowerControlAdjustmentStates              ENUMERATED { sameAsFci2,
separateClosedLoop}           OPTIONAL, -- Need S
  ...
}
SRS-ResourceSetId ::=       INTEGER (0..maxNrofSRS-ResourceSets-1)
SRS-Resource ::=            SEQUENCE {
  srs-ResourceId            SRS-ResourceId,
  nrofSRS-Ports             ENUMERATED {port1, ports2, ports4},
  ptrs-PortIndex                        ENUMERATED {n0, n1 }
OPTIONAL, -- Need R
  transmissionComb                  CHOICE {
    n2              SEQUENCE {
      combOffset-n2                 INTEGER (0..1),
      cyclicShift-n2                INTEGER (0..7)
    },
    n4              SEQUENCE {
      combOffset-n4                 INTEGER (0..3),
      cyclicShift-n4                INTEGER (0..11)
    }
  },
```

TABLE 45-continued

```
resourceMapping               SEQUENCE {
  startPosition                 INTEGER (0..5),
  nrofSymbols                   ENUMERATED {n1, n2, n4},
  repetitionFactor              ENUMERATED {n1, n2, n4}
},
freqDomainPosition             INTEGER (0..67),
freqDomainShift                INTEGER (0..268),
freqHopping                    SEQUENCE {
  c-SRS                         INTEGER (0..63),
  b-SRS                         INTEGER (0..3),
  b-hop                         INTEGER (0..3)
},
groupOrSequenceHopping           ENUMERATED { neither, groupHopping,
sequenceHopping },
  resourceType           CHOICE {
    aperiodic            SEQUENCE {
      ...
    },
    semi-persistent      SEQUENCE {
      periodicityAndOffset-sp           SRS-PeriodicityAndOffset,
      ...
    },
    periodic             SEQUENCE {
      periodicityAndOffset-p            SRS-PeriodicityAndOffset,
      ...
    }
  },
  sequenceId            INTEGER (0..1023),
  spatialRelationInfo                   SRS-SpatialRelationInfo
OPTIONAL, -- Need R
  ...
}
SRS-PeriodicityAndOffset ::=   CHOICE {
  sl1            NULL,
  sl2            INTEGER(0..1),
  sl4            INTEGER(0..3),
  sl5            INTEGER(0..4),
  sl8            INTEGER(0..7),
  sl10           INTEGER(0..9),
  sl16           INTEGER(0..15),
  sl20           INTEGER(0..19),
  sl32           INTEGER(0..31),
  sl40           INTEGER(0..39),
  sl64           INTEGER(0..63),
  sl80           INTEGER(0..79),
  sl160          INTEGER(0..159),
  sl320          INTEGER(0..319),
  sl640          INTEGER(0..639),
  sl1280         INTEGER(0..1279),
  sl2560         INTEGER(0..2559)
}
``` srs-Config may include one or more SRS resource sets. One SRS resource set includes one or more SRS resources having the same time domain operation and place used. The time domain operation which can be configured in the SRS resource set may be one of "periodic", "semi-persistent", and "aperiodic". Meanwhile, the place used of the SRS resource set may be configured as a usage parameter within the SRS resource set, and may have one value among "beamManagement: beam management", "codebook: codebook-based uplink transmission", "nonCodebook: nonbodebook-based uplink transmission", and "downlink channel information acquisition using antennaSwitching: reciprocity".

Meanwhile, resource allocation information in the time-frequency axis of SRS resources and information on frequency hopping may be independently configured for each SRS resource. Further, the UE also can configure a spatial domain transmission filter to be used for SRS resource transmission independently for each SRS resource. The spatial domain transmission filter may be indicated by a parameter spatialRelationInfo, and the parameter may include an index of a downlink or uplink reference signal. When the parameter spatialRelationInfo indicates an index of a CSI-RS resource or SSB, the UE may understand that a spatial domain transmission filter which is the same as a spatial domain receive filter used when the referred CSI-RS resource or SSB is received is used. Alternatively, spatial relation info refers to another SRS resource index, the UE may understand that a spatial domain transmission filter used when the referred SRS resource is transmitted is used.

Subsequently, a rate matching operation and a puncturing operation are described in detail.

When a time at which a predetermined symbol sequence A is transmitted and frequency resources A overlap a predetermined time and frequency resources B, a rate matching or puncturing operation may be considered as a transmission/reception operation of a channel A considering of resources C in an area in which the resources A and the resources B overlap each other. A detailed operation may follow the content below.

Rate Matching Operation

The BS may map and transmit the channel A only for the remaining resource areas except for the resources C corresponding to the area in which the entire resources A for transmitting the symbol sequence A to the UE overlap the resources B. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may sequentially map the symbol sequence A to the remaining resources {resource #1, resource #2, resource #4} except for {resource #3} corresponding to the resources C among the resources A and transmit the same. As a result, the BS may map the symbol sequence {symbol #1, symbol #2, symbol #3} to {resource #1, resource #2, resource #4}, respectively, and transmit the same.

The UE may determine the resources A and the resources B based on scheduling information for the symbol sequence A from the BS and determine the resources C in the area in which the resources A and the resources B overlap each other. The UE may receive the symbol sequence A based on the assumption that the symbol sequence A is mapped to and transmitted in the remaining areas except for the resources C among the entire resources A. For example, when the symbol sequence A includes {symbol #1, symbol #2, symbol #3, symbol #4}, the resources Aare {resource #1, resource #2, resource #3, resource #4}, and the resources B are {resource #3, resource #5}, the UE may receive the symbol sequence A based on the assumption that the symbol sequence A is sequentially mapped to the remaining resources {resource #1, resource #2, resource #4} except for {resource #3} corresponding to the resources C among the resources A. As a result, the UE may perform a series of reception operation later based on the assumption that the symbol sequence {symbol #1, symbol #2, symbol #3} is mapped to and transmitted in {resource #1, resource #2, resource #4}, respectively.

Puncturing Operation

When there are resources C corresponding to an area in which the entire resources A for transmitting the symbol sequence A to the UE overlap the resources B, the BS may map the symbol sequence A to all the resources A, but may perform transmission only in the remaining resource areas except for the resources C among the resources A without transmission in a resource area corresponding to the resources C. For example, when the symbol sequence A includes {symbol #1, symbol #2, symbol #3, symbol #4}, the resources A are {resource #1, resource #2, resource #3, resource #4}, and the resources B are {resource #3, resource #5}, the BS may map the symbol sequence A includes {symbol #1, symbol #2, symbol #3, symbol #4} to the resources A {resource #1, resource #2, resource #3, resource #4}, respectively, and transmit only the symbol sequence {symbol #1, symbol #2, symbol #4} corresponding to the remaining resources {resource #1, resource #2, resource #4} except for {resource #3} corresponding to the resources C among the resources A without transmission of {symbol #3} mapped to {resource #3} corresponding to the resources C. As a result, the BS' may map the symbol sequence {symbol #1, symbol #2, symbol #4} to {resource #1, resource #2, resource #4}, respectively, and transmit the same.

The UE may determine the resources A and the resources B based on scheduling information for the symbol sequence A from the BS and determine the resources C in the area in which the resources A and the resources B overlap each other. The UE may receive the symbol sequence A based on the assumption that the symbol sequence A is mapped to the entire resources A but is transmitted only in the remaining areas except for the resources C among the resources A. For example, when the symbol sequence A includes {symbol #1, symbol #2, symbol #3, symbol #4}, the resources A are {resource #1, resource #2, resource #3, resource #4}, and the resources B are {resource #3, resource #5}, the UE may assume that the symbol sequence A {symbol #1, symbol #2, symbol #3, symbol #4} is mapped to the resources A {resource #1, resource #2, resource #3, resource #4}, respectively, but {symbol #3} mapped to {resource #3} corresponding to the resources C is not transmitted, and may perform reception on the basis the assumption that the symbol sequence {symbol #1, symbol #2, symbol #4} corresponding to the remaining resources {resource #1, resource #2, resource #4} except for {resource #3} corresponding to the resources C among the resources A is mapped and transmitted. As a result, the UE may perform a series of reception operation later based on the assumption that the symbol sequence {symbol #1, symbol #2, symbol #4} is mapped to and transmitted in {resource #1, resource #2, resource #4}, respectively.

Rate Matching Resource

Figure 18:
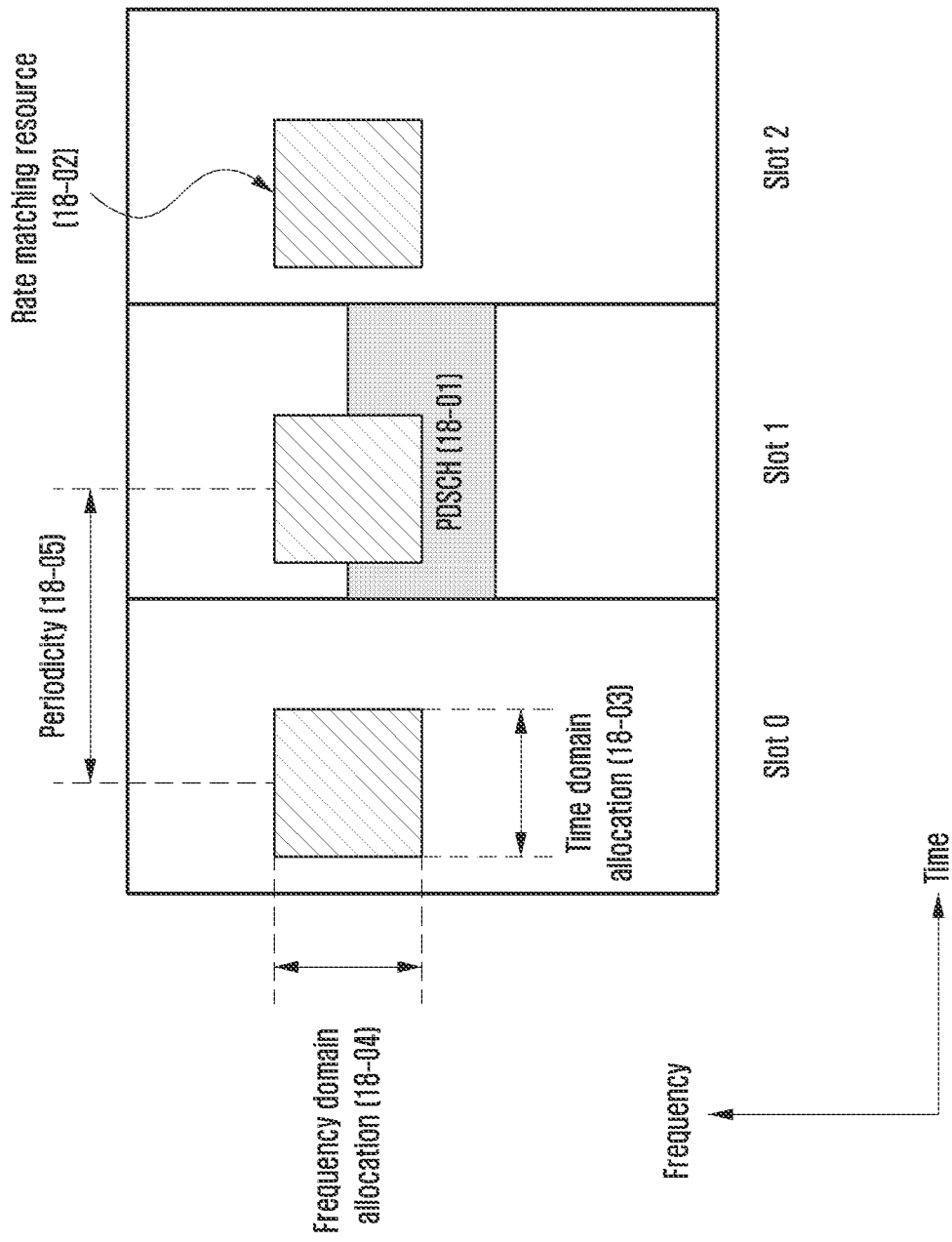
FIG. 18 illustrates a method by which a BS and a UE transmit and receive data based on a downlink data channel and rate matching resources according to an embodiment of the disclosure.

FIG. 18 illustrates a method by which a BS and a UE transmit and receive data based on a downlink data channel and a rate matching resource according to an embodiment of the disclosure.

Referring to FIG. 18, a downlink data channel (PDSCH) 18-01 and a rate matching resource 18-02 are illustrated. The BS may configure one or a plurality of rate matching resources 18-02 in the UE through higher-layer signaling (for example, RRC signaling). Configuration information of the rate matching resource 18-02 may include time-axis resource allocation information 18-03, frequency-axis resource allocation information 15-04, and period information 18-05. Hereinafter, a bitmap corresponding to the frequency-axis resource allocation information 18-04 is called a "first bitmap", a bitmap corresponding to the time-axis resource allocation information 18-03 is called a "second bitmap", and a bitmap corresponding to the period information 18-05 is called a "third bitmap". When all or some of the time and frequency resources of the scheduled data channel 18-01 overlap the configured rate matching resource 18-02, the BS may match and transmit the data channel 18-01 in the part of the rate matching resource 18-02, and the UE may perform reception and decoding based on the assumption that the data channel 18-01 is rate-matched in the part of the rate matching resource 18-02.

The BS may dynamically notify the UE of whether to rate match the data channel in the configured rate matching resource part through an additional configuration (corresponding to a "rate matching indicator" in the above-described DCI format). Specifically, the BS may select some of the configured rate matching resources, group the selected rate matching resources into a rate matching resource group, and inform the UE of whether to perform rate matching on the data channel for each rate matching resource group through DCI using a bitmap scheme. For example, when 4 rate matching resources, RMR #1, RMR #2, RMR #3, and RMR #4 are configured, the BS may configure rate matching groups RMG #1={RMR #1, RMR #2} and RMG #2={RMR #3, RMR #4}, and inform the UE of whether to perform rate matching in each of RMG #1 and RMG #2 by using 2 bits within a DCI field. For example, the BS may configure each bit as "1" when rate matching is needed, and configure each bit as "0" when rate matching is not needed.

In the 5G system, granularity at an "RB symbol level" and an "RE level" is supported as a method of configuring the rate matching resource in the UE. More specifically, the following configuration method may be used.

RB Symbol Level

The UE may receive a configuration of a maximum of 4 RateMatchPatterns through higher-layer signaling, and one RateMatchPattern may include the following content.

- As reserved resources within a BWP, resources in which time and frequency resource areas of the corresponding reserved resources are configured by a combination of a bitmap at an RB level and a bitmap at a symbol level in the frequency axis may be included. The reserved resources may span one or two slots. A time domain pattern (periodicityAndPattern) in which the time and frequency domains including a pair of bitmaps at the RB level and the symbol level are repeated may be additionally configured.
- Time and frequency domain resource areas configured as a control resource set within a BWP and a resource area corresponding to a time domain pattern configured by a search space configuration in which the corresponding resource areas are repeated may be included.

RE Level

The UE may receive a configuration of the following content through higher-layer signaling.

- As configuration information for REs corresponding to a LTE cell-specific reference signal or common reference signal (CRS) pattern, the number of LTE CSR ports (nrofCRS-Ports), values of LTE-CRS-vshift(s) (v-shift), information on a center subcarrier location (carrierFreqDL) of an LTE carrier from a frequency point that is a reference (for example, reference point A), information on a bandwidth size of an LTE carrier (carrierBandwidthDL), subframe configuration information (mbsfn-SubframConfigList) corresponding to a multicast-broadcast single-frequency network (MBSFN), and the like. The UE may determine the location of the CRS within the NR slot corresponding to the LTE subframe based on the above-described information.
- Configuration information for a resource set corresponding to one or a plurality of zero power (ZP) CSI-RSs within the BWP may be included.

Subsequently, an uplink and downlink configuration for each symbol/slot considered in an embodiment of the disclosure is described in detail.

Figure 19:
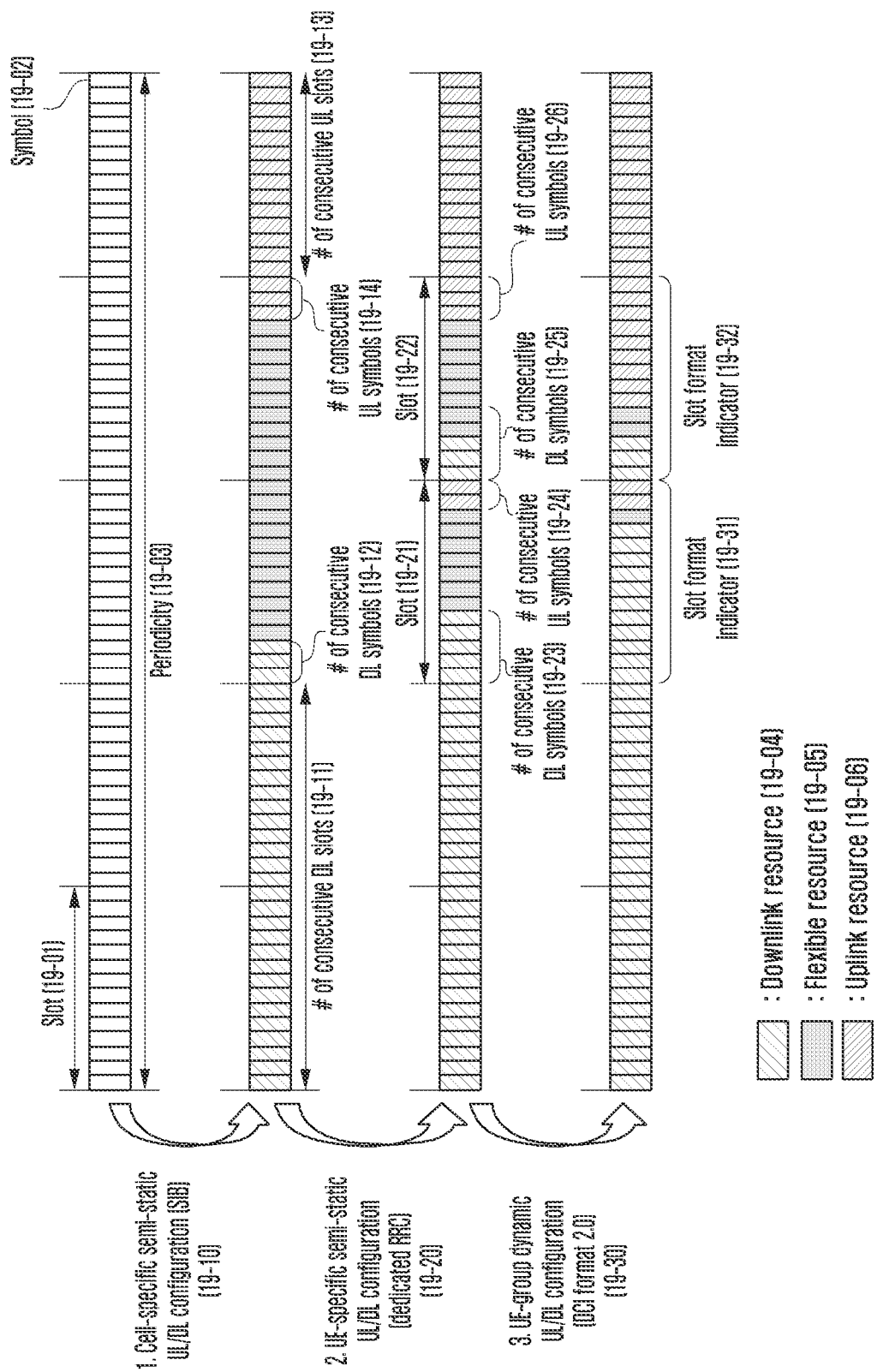
FIG. 19 illustrates an uplink-downlink configuration considered in a 5G communication system according to an embodiment of the disclosure.

FIG. 19 illustrates an uplink-downlink configuration considered in the 5G communication system according to an embodiment of the disclosure.

Referring to FIG. 19, in the 5G communication system, an uplink-downlink configuration of the symbol 19-02/slot 19-01 may have 3 steps.

First, through cell-specific configuration information 19-10 through system information, the uplink-downlink of the symbol/slot may be semi-statically configured in the unit of symbols. Specifically, cell-specific uplink-downlink configuration information may include uplink-downlink pattern information and subcarrier information that is the reference. Through the uplink-downlink pattern information, a pattern period 19-03, the number 19-11 of consecutive downlink slots from a start point of each pattern, the number 19-12 of symbols of the next slot, the number 19-13 of consecutive uplink slots from an end of the pattern, and the number 19-14 of symbols of the next slot may be indicated. At this time, the UE may determine that the slot and symbol which are not indicated as the uplink 19-06 or the downlink 19-04 are flexible slot 19-05 and symbol.

Second, through user-specific configuration information 19-20 through dedicated higher-layer signaling, slots 19-21 and 19-22 including a flexible slot or a flexible symbol may be indicated by the numbers 19-23 and 19-25 of consecutive downlink symbols from start symbols of the respective slots and the numbers 19-24 and 19-26 of consecutive uplink symbols from ends of the slots, or may be totally indicated as the downlink or the uplink.

Last, in order to dynamically change a downlink signal transmission section and an uplink signal transmission section 19-30, whether each of the symbols indicated as the flexible symbols (that is, symbols which are not indicated as the downlink or the uplink) in each slot is a downlink symbol, an uplink symbol, or a flexible symbol may be indicated through a slot format indicator (SFI) 19-31 or 19-32 included in the downlink control channel. As shown in Table 46 below, the slot format indicator may select one index for the uplink-downlink configuration of 14 symbols within one slot in a preset table.

TABLE 46

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |

TABLE 46-continued

| Format | \multicolumn{14}{c}{Symbol number in a slot} |
| --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | F | F | F | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on tdd-UL-DL-ConfigurationCommon, or tdd-UL-DL-ConfigurationDedicated and, if any, on detected DCI formats} |

Figure 20:
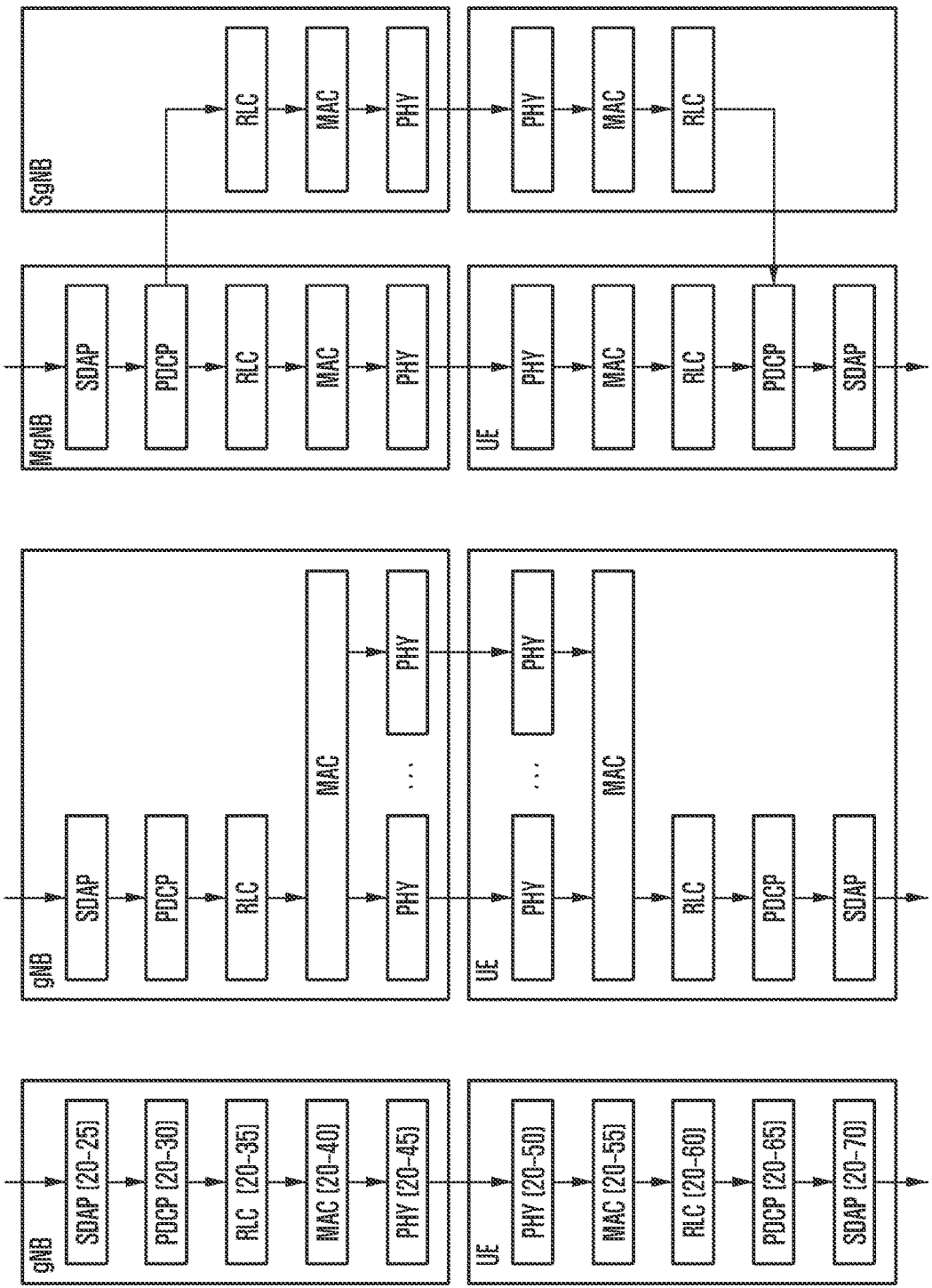
FIG. 20 illustrates a wireless protocol structure of a BS and a UE when single cell, carrier aggregation, and dual connectivity are performed according to an embodiment of the disclosure.

FIG. 20 illustrates a wireless protocol structure of a BS and a UE when single cell, carrier aggregation, and dual connectivity are performed according to an embodiment of the disclosure.

Referring to FIG. 20, in a wireless protocol of the next-generation mobile communication system, the UE and the NR BS include NR service data adaptation protocols (SDAPs) 20-25 and 20-70, NR packet data convergence protocols (PDCPs) 20-30 and 20-65, NR radio link controls (RLCs) 20-35 and 20-60, and NR medium access controls (MACs) 20-40 and 20-55, respectively.

Main functions of the NR SDAPs 20-25 and 20-70 may include some of the following functions.

User data transmission function (transfer of user-plane data)
Function of mapping QoS flow and a data bearer for uplink and downlink (mapping between a QoS flow and a DRB for both DL and UL)
Function of marking a QoS flow ID for uplink and downlink (marking QoS flow ID in both DL and UL packets)
Function of mapping reflective QoS flow to a data bearer for uplink SDAP PDUs (reflective QoS flow to DRB mapping for the UL SDAP PDUs)

For the SDAP layer device, the UE may receive a configuration indicating whether to use a header of the SDAP layer device for each PDCP layer device, each bearer, or each logical channel or whether to use a function of the SDAP.layer device through an RRC message. When the SDAP header is configured, the BS may instruct the UE to update or reconfigure mapping information for uplink and downlink QoS flow and the data bearer through a NAS QoS reflective configuration 1-bit indicator (NAS reflective QoS) and an AS QoS reflective configuration 1-bit indicator (AS reflective QoS) of the SDAP header. The SDAP header may include QoS flow ID information indicating the QoS. The QoS information may be used as data processing priority and scheduling information in order to support smooth service.

Main functions of the NR PDCPs 20-30 and 20-65 may include some of the following functions.

Header compression and decompression function (header compression and decompression: ROHC only)
User data transmission function (transfer of user data)
Sequential delivery function (in-sequence delivery of upper-layer PDUs)
Non-sequential delivery function (out-of-sequence delivery of upper-layer PDUs)
Reordering function (PDCP PDU reordering for reception)
Duplicate detection function (duplicate detection of lower-layer SDUs)
Retransmission function (retransmission of PDCP SDUs)
Ciphering and deciphering function (Ciphering and deciphering)
Timer-based SDU removal function (timer-based SDU discard in uplink)

The reordering function of the NR PDCP device is a function of sequentially reordering PDCP PDUs received by a lower layer based on a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs 20-35 and 20-60 may include some of the following functions.

Data transmission function (transfer of upper-layer PDUs)
Sequential delivery function (in-sequence delivery of upper-layer PDUs)
Non-sequential delivery function (out-of-sequence delivery of upper-layer PDUs)
ARQ function (error correction through ARQ)
Concatenation, segmentation, and reassembly function (concatenation, segmentation and reassembly of RLC SDUs)
Re-segmentation function (re-segmentation of RLC data PDUs)
Reordering function (reordering of RLC data PDUs)
Duplicate detection function (duplicate detection)
Error detection function (protocol error detection)
RLC SDU deletion function (RLC SDU discard)
RLC reestablishment function (RLC reestablishment)

The sequential delivery function (In-sequence delivery) of the NR RLC device is a function of sequentially transferring RLC SDUs received from a lower layer to a higher layer, and may include, when one original RLC SDU is divided into a plurality of RLC SDUs and then received, a function of reassembling and transmitting the RLC SDUs, a function of reordering the received RLC PDUs based on an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, a function of, if there is a lost RLC SDU, sequentially transferring only RLC SDUs preceding the lost RLC SDU to the higher layer, a function of, if a predetermined timer expires even though there is a lost RLC SDU, sequentially transferring all RLC SDUs received before the timer starts to the higher layer, or a function of, if a predetermined timer expires even though there is a lost RLC SDU, sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). When the received RLC PDUs are segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 20-40 and 20-55 may be connected to a plurality of NR RLC layer devices configured in one UE and main functions of the NR MAC may include some of the following functions.

Mapping function (Mapping between logical channels and transport channels)
Multiplexing and demultiplexing function (multiplexing/demultiplexing of MAC SDUs)
Scheduling information report function (scheduling information reporting)
HARQ function (error correction through HARQ)
Logical channel priority control function (priority handling between logical channels of one UE)
UE priority control function (priority handling between UEs by means of dynamic scheduling)
MBMS service identification function (MBMS service identification)
Transport format selection function (transport format selection)
Padding function (padding)

The NR PHY layers 20-45 and 20-50 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol structure may be variously changed according to a carrier (or cell) operation scheme. For example, when the BS transmits data to the UE based on a single carrier (or cell), the BS and the UE use a protocol structure having a single structure for each layer as indicated by reference numeral 20-00. On the other hand, when the BS transmits data to the UE based on carrier aggregation (CA) using multiple carriers in a single TRP, the BS and the UE use a protocol structure in which layers up to RLC have a single structure but the PHY layer is multiplexed through the MAC layer as indicated by reference numeral 20-10. In another example, when the BS transmits data to the UE based on dual connectivity (DC) using multiple carriers in multiple TRPs, the BS and the UE use a protocol structure in which layers up to RLC have a single structure but the PHY layer is multiplexed through the MAC layer as indicated by reference numeral 20-20.

Meanwhile, in LTE and NR, the UE may perform a procedure of reporting UE capability information supported by the UE to the corresponding BS in the state in which the UE is connected to a serving BS. Hereinafter, this is referred to as UE capability (report). The BS may transfer a message (for example, UE capability enquiry message) making a request for reporting UE capability to the UE in the connected state. The message may include a UE capability report request for each radio access technology (RAT) type of the BS. The UE capability report request for each RAT type may include frequency band information making a request for the UE capability of the UE.

At this time, the RAT type may include, for example, nr, eutra-nr, eutra, and the like. The BS may indicate at least one of nr, eutra-nr, and eutra, and make a request for reporting the UE capability of the UE therefor. The UE may indicate at least one of nr, eutra-nr, and eutra for the RAT type which can be supported by the UE, and report the UE capability therefor to the BS.

For example, when the RAT type included in the UE capability enquiry message indicates nr, the UE supporting NR-based wireless communication may insert the RAT type indicating nr into a message reporting the UE capability (for example, UE capability information message) and report the UE capability.

In another example, when the RAT type included in the UE capability enquiry message indicates eutra-nr, the UE supporting (NG) E-UTRANR dual connectivity (EN-DC) (covering E-UTRA connected to EPC or 5GC) or NR E-UTRA dual connectivity (NE-DC) may insert the RAT type indicating eutra-nr into a message reporting the UE capability (for example, UE capability information message) and report the UE capability.

Further, the UE capability enquiry message may make a request for reporting UE capability for a plurality of RAT types through one RRC message container. Alternatively, the BS may insert the UE capability enquiry message including the UE capability report request for each RAT type into one RRC message several times and transmit the RRC message to the UE. For example, the UE receiving the RRC message including a plurality of UE capability enquiry messages may configure a UE capability information message corresponding to each UE capability report request and report (transmit) the UE capability information message to the BS several times.

In the next-generation mobile communication system, a UE capability request for multi-radio dual connectivity (MR-DC) including NR, LTE, E-UTRA-NR dual connectivity (EN-DC) may be made. In general, the UE capability enquiry message is initially transmitted after the UE establishes the connection, but may be requested by the BS when needed based on a predetermined condition.

The UE receiving a UE capability report request (or receiving the UE capability enquiry message) from the BS may configure the UE capability according to the RAT type and band information requested by the BS. Hereinafter, a method by which the UE configures the UE capability in the NR system is described.

Step 1. When the UE receives a list of at least one band of LTE and NR through the UE capability report request from the BS, the UE may configure a band combination (BC) of EN-DC and NR stand alone (SA). For example, the UE may configure a candidate list of BCs of EN-DC and NR SA based on bands making a request for the UE capability report through list information (for example, FreqBandList) included in the UE capability enquiry message received from the BS. Further, priorities of the bands may be sequentially assigned as stated in FreqBandList.

Step 2. When the BS sets an "eutra-nr-only" flag or an "eutra" flag in the message making a request for the UE capability report and makes a request for the UE capability report, the UE may remove the BC for NR SA BCs from the BC candidate list configured in step 1. Alternatively, the operation may occur only when the LTE BS (eNB) makes a request for "eutra" capability.

Step 3. The UE may remove fallback BCs from the BC candidate list configured in the above step. The fallback BC may be a BC obtained by removing a band corresponding to at least one secondary cell (SCell) from any super set BC. Since the super set BC can cover the fallback BC, the fallback BC can be omitted. Step 3 may also be applied to multi-RAT dual connectivity (MR-DC). For example, LTE bands may also be applied. BCs left after step 3 may be referred to as a "final candidate BC list".

Step 4. The UE may select BCs suitable for a requested RAT type in the "final candidate BC list" to select BCs to be reported. In step 4, the UE may configure a list (for example, supportedBandCombinationList) sequentially including the BCs selected by the UE. For example, the UE may configure BCs and UE capability to be reported according to the order of the preconfigured RAT-Type (for example, in the order of nr->eutra-nr->eutra).

In step 1 to step 4, the UE may configure a featureSet-Combination for each BS included in the configured supportedBandCombinationList, and configure a list (for example, featureSetCombinations) including each feature-SetCombination. At this time, featureSetCombination may be a set of feature sets for each band within the selected BCs, and the feature set may be a set of capabilities supported by the UE in carriers within a specific band.

Further, for the supportedBandCombinationList, the UE may compare each BC and the feature set combination for each BC. At this time, when a specific BC, for example, BC #X includes all bands of a BC, for example, BC #Y to be compared, and the feature set combination of BC #X includes the capability equal to or higher than the feature set combination of BC #Y, BC #Y may be defined as a fallback BC of BC #X. After all fallback BCs are found in the band combination list according to the comparison process, a new BC list from which the fallback BCs are all removed may be configured, and a list of a "candidate feature set combination" for each of the BCs may be configured. The "candidate feature set combination" may include all feature set combinations for NR and EUTRA-NR BCs, and may be configured based on a feature set combination of UE-NR-Capabilities and UE-MRDC-Capabilities containers.

Step 5. When the RAT Type requested by the BS is eutra-nr, featureSetCombinations may be included in two containers of UE-MRDC-Capabilities and UE-NR-Capabilities. However, the NR feature set may include only UE-NR-Capabilities.

The above-described steps are only examples, the disclosure is not limited thereto. Accordingly, according to an embodiment of the disclosure, some steps may be omitted and other steps may be added.

After the UE capability is configured, the UE may transmit a UE capability information message including the UE capability to the BS. The BS may perform scheduling and transmission/reception management in the UE based on the UE capability information received from the UE.

Figure 21:
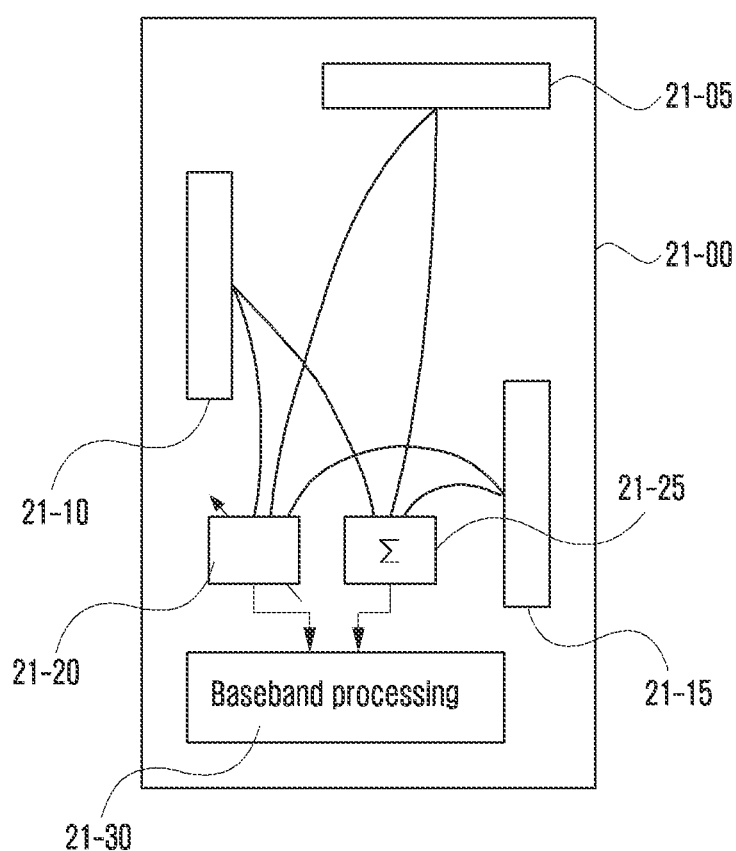
FIG. 21 illustrates a structure of a signal processing device including an antenna port/antenna panel/baseband processor of a UE according to an embodiment of the disclosure.

FIG. 21 illustrates a structure of a signal processing device including an antenna port/antenna panel/baseband processor of a UE according to an embodiment of the disclosure.

Referring to FIG. 21, a UE 21-00 may include a plurality of antenna ports or panels 21-05, 21-10, and 21-15. Although FIG. 21 illustrates that the UE has 3 antenna ports or panel structures, it is only an example, and all UEs do not have to be limited thereto when it is actually applied, and a larger number or a fewer number of antenna ports or panel structures may be used. The plurality of antenna ports or panels may be connected to an antenna port/panel selector (antenna selection module) 21-20 according to various environment and conditions, such as UE manufacturing costs, target performance, and an operation frequency band, such as FR1 or FR2 or connected to a signal processor (baseband processing module) 21-30 through an antenna port/panel gain combiner (antenna combining module/MIMO module) 21-25. For convenience of description, the modules, such as the antenna port/panel selector (antenna selection module) 21-20 and the antenna port/panel gain combiner (antenna combining module/MIMO module) 21-25 are commonly called an "antenna signal processor". The signal processor (baseband processing module) 21-30 may receive an RF signal or a digital signal passing through the antenna signal processor, measure a reference signal according to the procedure, perform a TCI/QCL procedure or measure a data symbol, and demodulate data. Most existing UEs select and use one of the antenna port/panel selector (antenna selection module) 21-20 or the antenna port/panel gain combiner (antenna combining module/MIMO module) 21-25 by using the antenna port/panel selector (antenna selection module) 21-20 to reduce power consumption or reduce complexity/costs or using the antenna port/panel gain combiner (antenna combining module/MIMO module) 21-25 to expand wireless communication coverage or increase capacity.

Meanwhile, future UEs may simultaneously implement a plurality of antenna signal processors to properly acquire various gains according to situations due to antenna selection/connection/combination or introduce a complex antenna signal processor capable of performing various functions. Such a trend may be gradually accelerated since the number of antenna ports/panels of one UE gradually increases as the module size of an antenna port/panel and a required minimum interval between respective modules are shortened in inverse proportion to a frequency (in proportion to a wavelength) according to an increase in a frequency operation band in wireless communication (for example, an FR2 band higher than or equal to 6 GHz or an FR4 band higher than or equal to 52.6 GHz).

Current NR is optimized for one CSI measurement and report to which single precoding and MCS are applied for single transmission point/panel/beam transmission or coherent transmission between a plurality of transmission points/panels/beams. Meanwhile, in NR release 16, non-coherent transmission, that is, non-coherent joint transmission (NC-JT) is supported for each transmission point/panel/beam, in which case it may be suitable for selecting different PMIs and CQIs for links between the transmission point/panel/beam (hereinafter, referred to as transmission reception point (TRP), transmission point) and the UE. Further, since mutual interference is generated between TRPs participating in NC-JT transmission, it is required to consider interference influencing a signal at a different TRP when the optimal PMI and CQI for each TRP for CSI measurement are selected. Accordingly, since independent channel measurement reference signal (channel measurement resource (CMR)) and interference measurement reference signal (interference measurement resource (IMR)) transmission for each TRP is required for the NC-JT CSI report, reference signal overhead is increased. The disclosure proposes a method of measuring and reporting an NC-JT channel based on a beamformed CMR and IMR to reduce the reference signal overhead. Hereinafter, respective embodiments of the disclosure may be implemented independently or through a combination of one or more thereof.

First Embodiment: PDSCH NC-JT Transmission Method

Hereinafter, embodiments of the disclosure will be described with reference to the accompanying drawings. The content in the disclosure can be applied to FDD and TDD systems. Hereinafter, in the disclosure, higher signaling (or higher-layer signaling) may be a method of transmitting a signal from the BS to the UE through a downlink data channel of a physical layer or from the UE to the BS through an uplink data channel of a physical layer, and may also be referred to as RRC signaling, PDCP signaling, or a medium access control (MAC) control element (CE).

Hereinafter, in the disclosure, when determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied based on conditions similar to the above conditions is referred to as an NC-JT case.

Hereinafter, determining priorities of A and B in the disclosure may be variously expressed as selecting one having a higher priority according to a predetermined priority rule and performing an operation corresponding thereto or omitting (or dropping) an operation for one having a lower priority.

In the disclosure, the examples are described through a plurality of embodiments of the disclosure, but are not independent from each other and one or more embodiments may be simultaneously or complexly applied.

According to an embodiment of the disclosure, in order to receive a PDSCH from a plurality of TRPs, the UE may use non-coherent joint transmission (NC-JT).

Unlike the system of the related art, the 5G wireless communication system supports not only a service requiring a high transmission rate but also both a service having a very short transmission delay and a service requiring a high connection density. In a wireless communication network including a plurality of cells, transmission and reception points (TRPs), or beams, cooperative communication (coordinated transmission) between respective cells, TRPs, or/and beams may satisfy various service requirements by increasing the strength of a signal received by the UE or efficiently controlling interference between the cells, TRPs, or/and beams.

Joint transmission (JT) is a representative transmission technology for the cooperative communication and may increase the strength of a signal received by the UE or throughput by transmitting signals to one UE through different cells, TRPs, or/and beams. At this time, a channel between each cell, TRP, or/and beam and the UE may have different characteristics, and particularly, non-coherent joint transmission (NC-JT) supporting non-coherent precoding between respective cells, TRPs, or/and beams may need individual precoding, MCS, resource allocation, and TCI indication according to the channel characteristics for each link between each cell, TRP, or/and beam and the UE.

The NC-JT may be applied to at least one of a downlink data channel (physical downlink shared channel (PDSCH)), a downlink control channel (physical downlink control channel (PDCCH)), an uplink data channel (physical uplink shared channel (PUSCH)), and an uplink control channel (physical uplink control channel (PUCCH)). In PDSCH transmission, transmission information, such as precoding, MCS, resource allocation, and TCI may be indicated through DL DCI, and may be independently indicated for each cell, TRP, or/and beam for the NC-JT. This is a main factor that increases payload required for DL DCI transmission, which may have a bad influence on reception performance of a PDCCH for transmitting the DCI. Accordingly, in order to support JT of the PDSCH, it is required to carefully design tradeoff between an amount of DCI information and reception performance of control information.

Figure 22:
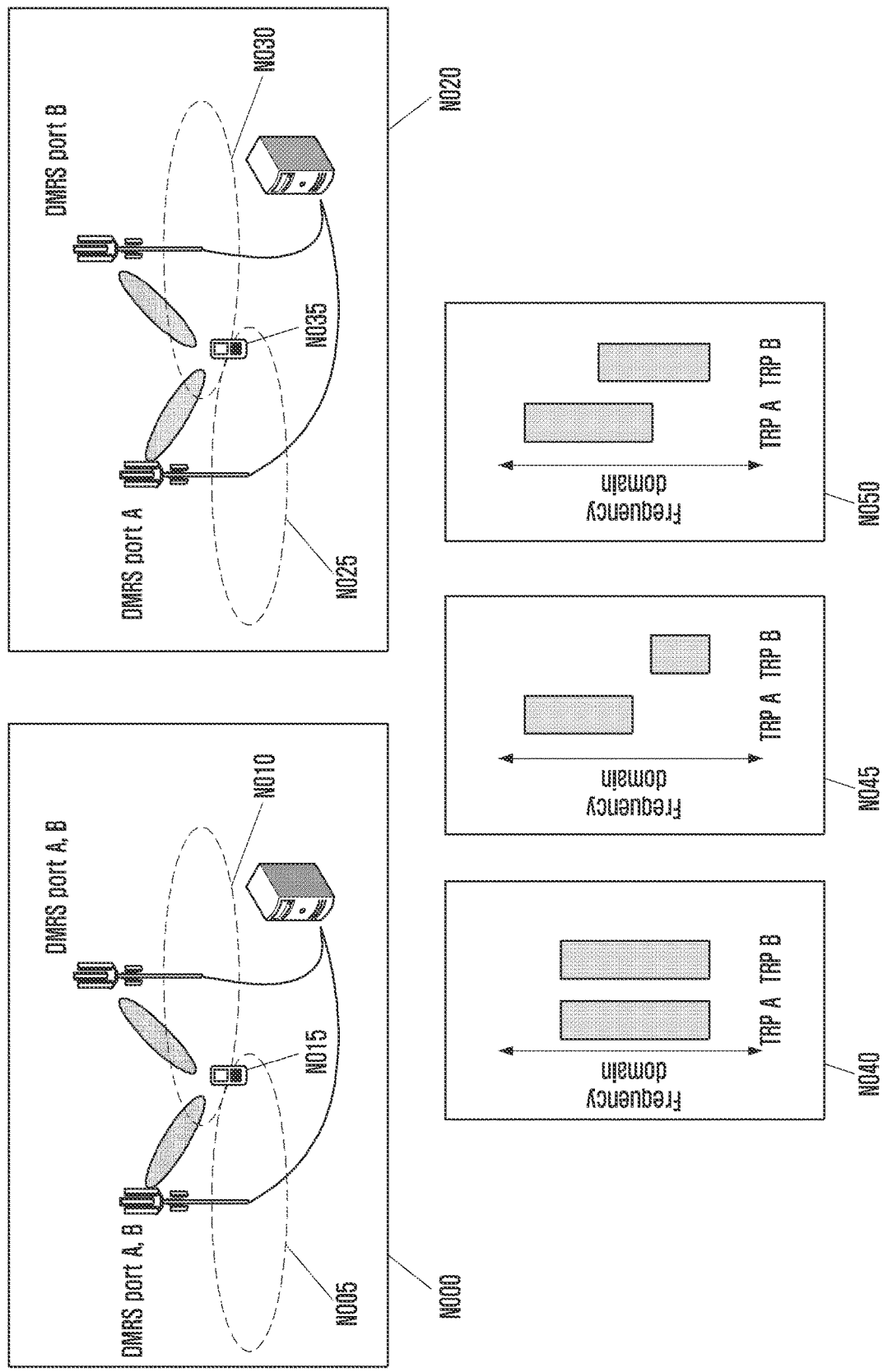
FIG. 22 illustrates a configuration of antenna ports and a resource allocation to transmit a physical downlink shared channel (PDSCH) through cooperative communication in a wireless communication system according to an embodiment of the disclosure.

FIG. 22 illustrates a configuration of antenna ports and a resource allocation to transmit a PDSCH through cooperative communication in a wireless communication system according to an embodiment of the disclosure.

Referring to FIG. 22, the example for transmitting the PDSCH through cooperative communication is described for each scheme of joint transmission (JT), and examples for allocating radio resources for each TRP are described.

Referring to FIG. 22, an example N000 of coherent joint transmission (C-JT) supporting coherent precoding between respective cells, TRPs, or/and beams is illustrated.

In the case of C-JT, a TRP A N005 and a TRP B N010 transmit single data (PDSCH) to a UE N015, and the plurality of TRPs may perform joint precoding. This may mean that the TRP A N005 and the TPR B N010 transmit DMRSs through the same DMRS ports in order to transmit the same PDSCH. For example, the TRP A N005 and the TPR B N010 may transmit DMRSs to the UE through a DMRS port A and a DMRS port B, respectively. In this case, the UE may receive one piece of DCI information for receiving one PDSCH demodulated based on the DMRSs transmitted through the DMRS port A and the DMRS port B.

Referring to FIG. 22, an example N020 of non-coherent joint transmission (NC-JT) supporting non-coherent precoding between respective cells, TRPs, or/and beams for PDSCH transmission is illustrated.

In the case of NC-JT, the PDSCH is transmitted to a UE N035 for each of a TRP A N025 and a TRP B N030, and individual precoding may be applied to each PDSCH. Respective cells, TRPs, or/and beams may transmit different PDSCHs or different PDSCH layers to the UE, thereby improving throughput compared to single cell, TRP, or/and beam transmission. Further, respective cells, TRPs, or/and beams may repeatedly transmit the same PDSCH to the UE, thereby improving reliability compared to single cell, TRP, or/and beam transmission. For convenience of description, the cell, TRP, or/and beam are commonly called a TRP.

At this time, various wireless resource allocations, such as the case N040 in which frequency and time resources used by a plurality of TRPs for PDSCH transmission are all the same, the case N045 in which frequency and time resources used by a plurality of TRPs do not overlap at all, and the case N050 in which some of the frequency and time resources used by a plurality of TRPs overlap each other may be considered.

In order to support NC-JT, DCIs in various forms, structures, and relations may be considered to simultaneously allocate a plurality of PDSCHs to one UE.

Figure 23:
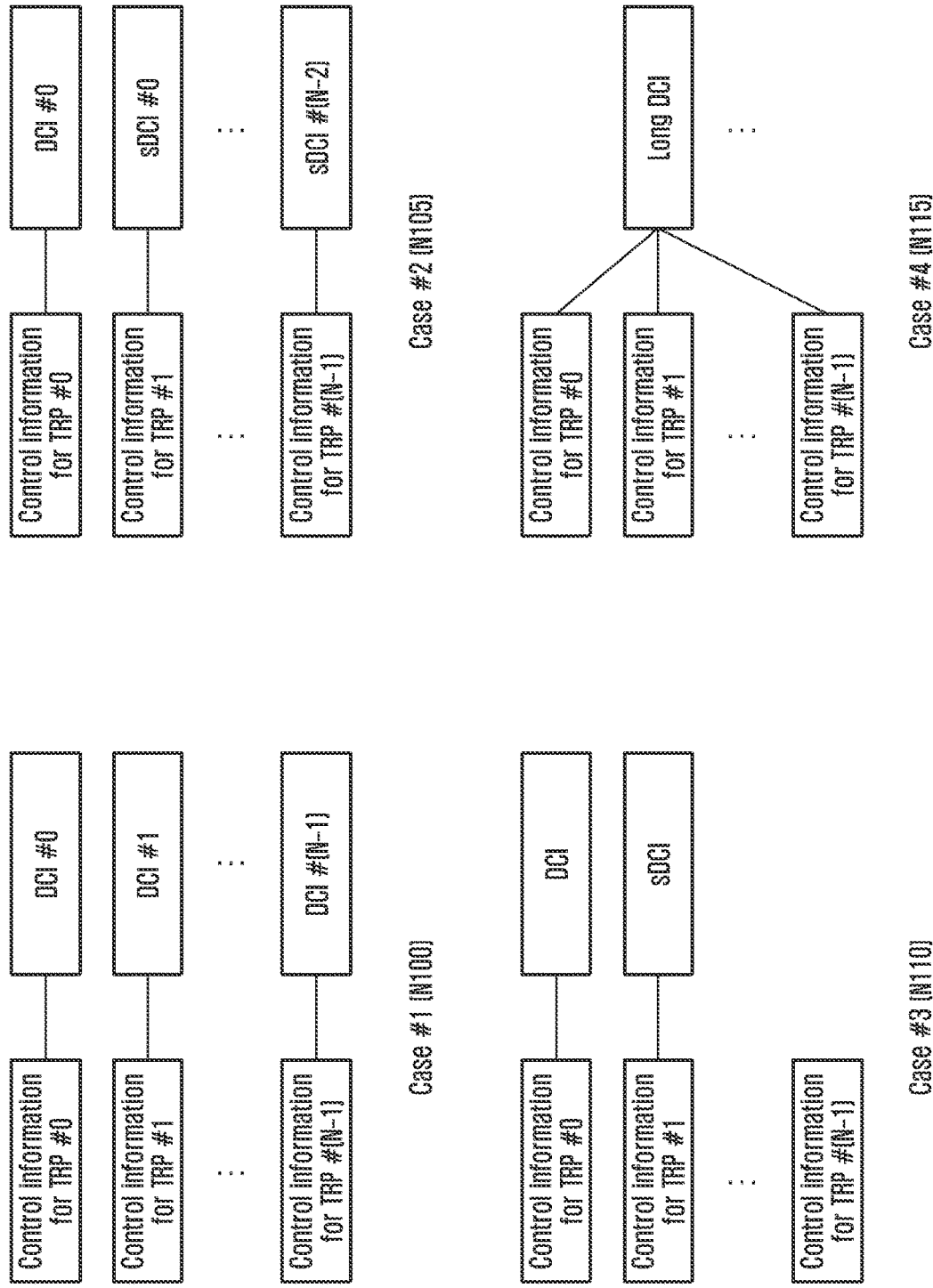
FIG. 23 illustrates a configuration of downlink control information (DCI) for NC-JT in which respective TRPs transmit different PDSCHs or different PDSCH layers to a UE in a wireless communication system according to an embodiment of the disclosure.

FIG. 23 illustrates a configuration of downlink control information (DCI) for NC-JT in which respective TRPs transmit different PDSCHs or different PDSCH layers to the UE in a wireless communication system according to an embodiment of the disclosure.

Referring to FIG. 23, case #1 N100 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission. For example, the UE may acquire control information for PDSCHs transmitted from different TRPs (TRP #0 to TRP #(N−1)) through independent DCIs (DCI #0 to DCI #(N−1)). Formats between the independent DCIs may be the same as or different from each other, and payload between the DCIs may also be the same as or different from each other. In case #1, a degree of freedom of PDSCH control or allocation can be completely guaranteed, but when respective pieces of DCI are transmitted by different TRPs, a difference between DCI coverages may be generated and reception performance may deteriorate.

Case #2 N105 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission. For example, DCI #0 that is control information for a PDSCH transmitted from the serving TRP (TRP #0) may include all information elements of DCI format 1_0, DCI format 1_1, and DCI format 1_2, but shortened DCIs (hereinafter, referred to as sDCIs) (sDCI #0 to sDCI #(N−2)) that are control information for PDSCHs transmitted from the cooperative TRPs (TRP #1 to TRP #(N−1)) may include only some of the information elements of DCI format 1_0, DCI format 1_1, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits compared to the nDCI. In case #2, a degree of freedom of each PDSCH control or allocation may be limited according to content of information elements included in the sDCI, but reception capability of the sDCI is better than the nDCI, and thus a probability of the generation of difference between DCI coverages may become lower.

Case #3 N110 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission. For example, in the case of DCI #0 that is control information for the PDSCH transmitted from the serving TRP (TRP #0), all information elements of DCI format 1_0, DCI format 1_1, and DCI format 1_2 may be included, and in the case of control information for PDSCHs transmitted from cooperative TRPs (TRP #1 to TRP #(N−1)), only some of the information elements of DCI format 1_0, DCI format 1_1, and DCI format 1_2 may be gathered in one "secondary" DCI (sDCI) and transmitted. For example, the sDCI may include at least one piece of HARQ-related information, such as frequency domain resource assignment and time domain resource assignment of the cooperative TRPs and the MCS. In addition, information that is not included in the sDCI, such as a BWP indicator and a carrier indicator may follow information included in DCI (DCI #0, normal DCI, or nDCI) of the serving TRP. In case #3 N110, a degree of freedom of PDSCH control or allocation may be limited according to content of the information elements included in the sDCI but reception performance of the sDCI can be controlled, and case #3 N110 may have smaller complexity of DCI blind decoding of the UE compared to case #1 N100 or case #2 N105.

Case #4 N115 is an example in which control information for PDSCHs transmitted from (N−1) additional TRPs is transmitted in DCI (long DCI) that is the same as that of control information for the PDSCH transmitted from the serving TRP in a situation in which different (N−1) PDSCHs are transmitted from the (N-1) additional TRPs (TRP #1 to TRP #(N-1)) other than the serving TRP (TRP #0) used for single PDSCH transmission. For example, the UE may acquire control information for PDSCHs transmitted from different TRPs (TRP #0 to TRP #(N-1)) through single DCI. In case #4 N115, complexity of DCI blind decoding of the UE may not be increased, but a degree of freedom of PDSCH control or allocation may be low since the number of cooperative TRPs is limited according to long DCI payload restriction.

In the following description and embodiments of the disclosure, the sDCI may refer to various pieces of supplementary DCI, such as shortened DCI, secondary DCI, or normal DCI (DCI formats 1_0, 1_1, and 1_2) including PDSCH control information transmitted in the cooperative TRP, and unless specific restriction is mentioned, the corresponding description may be similarly applied to the various pieces of supplementary DCI.

In the following description and embodiments of the disclosure, case #1 N100, case #2 N105, and case #3 N110 in which one or more pieces of DCI (or PDCCHs) are used to supportNC-JT may be classified as multiple PDCCH-based NC-JT and case #4 N115 in which single DCI (or PDCCH) is used to support NC-JT may be classified as single PDCCH-based NC-JT. In multiple PDCCH-based PDSCH transmission, a CORESET for scheduling DCI of the serving TRP (TRP #0) is separated from CORESETs for scheduling DCI of cooperative TRPs (TRP #1 to TRP #(N-1)). A method of separating the CORESET for DCI of the serving TRP and the CORESETs for DCI of the cooperative TRPs may include a separation method through a higher-layer indicator for each CORESET and a separation method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. At this time, association between a layer and a TRP transmitting the corresponding layer may be indicated through a transmission configuration indicator (TCI) indication for the layer.

In embodiments of the disclosure, the "cooperative TRP" may be replaced with various terms, such as a "cooperative panel" or a "cooperative beam" when actually applied.

In embodiments of the disclosure, "the case in which NC-JT is applied" may be variously interpreted as "the case in which the UE simultaneously receives one or more PDSCHs in one BWP", "the case in which the UE simultaneously receives PDSCHs based on two or more transmission configuration indicator (TCI) indications in one BWP, and "the case in which the PDSCHs received by the UE are associated with one or more DMRS port groups" according to circumstances, but is used by one expression for convenience of description.

In the disclosure, a wireless protocol structure for NC-JT may be variously used according to a TRP development scenario. For example, when there is no backhaul delay between cooperative TRPs or there is a small backhaul delay, a method (CA-like method) using a structure based on MAC layer multiplexing can be used similarly to reference numeral 20-10 of FIG. 20. On the other hand, when the backhaul delay between cooperative TRPs is too large to be ignored (for example, when a time of 2 ms or longer is needed to exchange information, such as CSI, scheduling, and HARQ-ACK between cooperative TRPs), a method (DC-like method) of securing a characteristic strong at a delay can be used through an independent structure for each TRP from an RLC layer similarly to reference numeral 20-20 of FIG. 20.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

Various embodiments of the disclosure describe how the UE activates/deactivates the TCI state through different MAC CE signaling of the BS. Particularly, when PDSCHs are allocated for a specific UE like in DCI format 1_1 or 1_2, a beamforming direction indication or a beamforming direction change command may be dynamically supported using the TCI field.

The beamforming direction indication or the beamforming direction change command is an operation applied when the UE identifying TCI state field information within DCI format 1_1 or 1_2 receives the PDSCH in the downlink after a predetermined time, in which case the beamforming direction is a beamforming configuration direction corresponding to a DL RS of the QCLed BS/TRP.

First, the BS or the UE may determine to use an Rel-15 MAC CE for an Rel-15 DCI format or an Rel-16 MAC CE for an Rel-16 DCI format. Different solution methods are proposed according to a MAC CE format of rel-15 and a MAC CE format of rel-16.

FIG. 24 illustrates a structure of a medium access control (MAC) control element (CE) for transmission configuration indicator (TCI) state activation of a UE-specific physical downlink control channel (PDCCH) according to an embodiment of the disclosure.

Referring to FIG. 24, it shows a MAC CE format 24-00 for TCI state activation of a UE-specific PDCCH based on Rel-15.

The meaning of each field within the MAC CE and a value configurable in each field are as shown in Table 47 below.

TABLE 47

Serving Cell ID: This field indicates the identity of the Serving Cell for which the MAC CE applies. The length of the field is 5 bits;
CORESET ID: This field indicates a Control Resource Set identified with ControlResourceSetId as specified in TS 38.331 [5], for which the TCI State TABLE 47-continued is being indicated. In case the value of the field is 0, the field refers to the
Control Resource Set configured by controlResourceSetZero as specified in
TS 38.331 [5]. The length of the field is 4 bits;
TCI State ID: This field indicates the TCI state identified by TCI-StateId as
specified in TS 38.331 [5] applicable to the Control Resource Set identified
by CORESET ID field. If the field of CORESET ID is set to 0, this field
indicates a TCI-StateId for a TCI state of the first 64 TCI-states configured
by tci-States-ToAddModList and tci-States-ToReleaseList in the PDSCH-
Config in the active BWP. If the field of CORESET ID is set to the other
value than 0, this field indicates a TCI-StateId configured by tci-
StatesPDCCH-ToAddList and tci-StatesPDCCH-ToReleaseList in the
controlResourceSet identified by the indicated CORESET ID. The length of
the field is 7 bits.

Further, FIG. 24 shows a MAC CE format 24-50 for TCI state activation/deactivation of aUE-specific PDSCH based on Rel-15.

The meaning of each field within the MAC CE and a value configurable in each field are as shown in Table 48 below

TABLE 48

Serving Cell ID: This field indicates the identity of the Serving Cell for which
the MAC CE applies. The length of the field is 5 bits;
BWP ID: This field indicates a DL BWP for which the MAC CE applies as
the codepoint of the DCI bandwidth part indicator field as specified in TS
38.212 [9], The length of the BWP ID field is 2 bits;
$T_i$: If there is a TCI state with TCI-StateId i as specified in TS 38.331 [5],
this field indicates the activation/deactivation status of the TCI state with
TCI-StateId i, otherwise MAC entity shall ignore the $T_i$ field. The $T_i$ field is
set to 1 to indicate that the TCI state with TCI-StateId i shall be activated and
mapped to the codepoint of the DCI Transmission Configuration Indication
field, as specified in TS 38.214 [7], The $T_i$ field is set to 0 to indicate that the
TCI state with TCI-StateId i shall be deactivated and is not mapped to the
codepoint of the DCI Transmission Configuration Indication field. The
codepoint to which the TCI State is mapped is determined by its ordinal
position among all the TCI States with $T_i$ field set to 1, i.e., the first TCI State
with $T_i$ field set to 1 shall be mapped to the codepoint value 0, second TCI
State with $T_i$ field set to 1 shall be mapped to the codepoint value 1 and so
on. The maximum number of activated TCI states is 8;
R: Reserved bit, set to 0.

A MAC CE of rel-16 may be configured in the form of expanding some of the MAC CE message of rel-15. In the embodiment of the disclosure, all TCI states activated by the rel-15 MAC CE may be proposed to be included in TC states activated by the rel-16 MAC CE.

Figure 25:
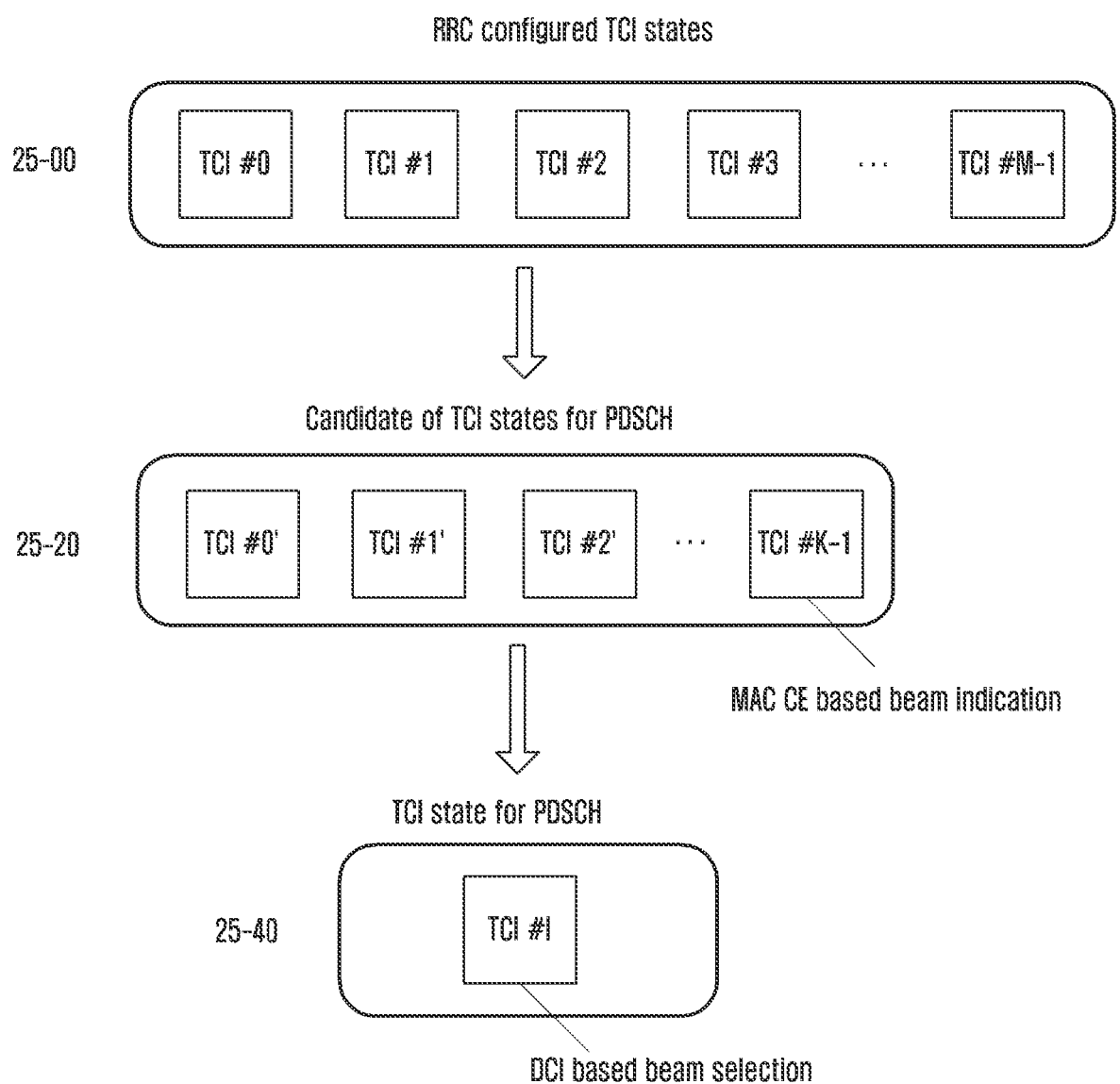
FIG. 25 illustrates a configuration of a TCI state according to an embodiment of the disclosure.

FIG. 25 illustrates a configuration of a TCI state according to an embodiment of the disclosure;

Referring to FIG. 25, the BS may determine all TCI states of RRC configured TCI states 25-00 of rel-15 as M TCI states (TCI #0, TCI #1, TCI #2, . . . , TCI #M−1) and select KTCI states (TCI #0', TCI #1', TCI #2', . . . , TCI #K−1) as candidates of TCI states 25-20 based on the rel-15 MAC CE. On the other hand, the BS and the UE supporting rel-16 may separately configure RRC configured TCI states supporting rel-16 or may use the same RRC configured TCI states configured in rel-15. At this time, the RRC configured TCI states supporting rel-16 may include some or all of the RRC configured TCI states configured in rel-15. If M=128, TCI states of rel-16 may be larger than or equal to 128. When the BS or the UE increases the number of TCI states supported by rel-15 in proportion to the number of BSs/TRPs operating for C-JT/NC-JT in rel-16, for example, when 2 TRPs operate, a maximum of 256 TCI states may be configured.

The rel-16 MAC CE may include some or all of the TCI states supported by the rel-15 MAC CE among the RRC configured TCI states for rel-16. Specifically, when the rel-16 MAC CE includes all of the TCI states supported by the rel-15 MAC CE and increases in proportion to the number of BSs/TRPs operating for C-JT/NC-JT in rel-16, for example, when 2 TRPs operate, a maximum of 2K TCI states may be configured.

Table 49 shows a detailed description of the parameter tci-StatePDSCH described in the embodiment. Specifically, an FR2 mandatory value of a parameter maxNumberConfiguredTClstatesPerCC may be changed from 64 to 128 or 256, or 64, 128, or 256 may be separately added for C-JT/NC-JT.

TABLE 49

| | | | |
|---|---|---|---|
| tci-StatePDSCH<br>Defines support of TCI-States for PDSCH. The<br>capability signaling comprises the following<br>parameters:<br>maxNumberConfiguredTClstatesPerCC indicates<br>the maximum number of configured TCI-states<br>per CC for PDSCH. For FR2, the UE is mandated | Band | Yes | N/A | N/A |

TABLE 49-continued to set the value to 64. or FR1, the UE is mandated
to set these values to the maximum number of
allowed SSBs in the supported band;
maxNumberActiveTCI-PerBWP indicates the
maximum number of activated TCI-states per
BWP per CC, including control and data. If a UE
reports X active TCI state(s), it is not expected that
more than X active QCL type D assumption(s) for
any PDSCH and any CORESETs for a given BWP
of a serving cell become active for the UE.
Note the UE is required to track only the active TCI
states.

For example, the BS or the UE supporting rel-15 and rel-16 may configure a maximum value of the number of TCI states for each of rel-15 and rel-16 for a TCI state configuration through the MAC CE and configure the number of TCI states to be equal to or smaller than the configured maximum value. For the method of configuring the number of TCI states to be equal to or smaller than the maximum value, the following various embodiments may be proposed.

The number of TCI states activated by the MAC CE messages of rel-15 and rel-16 may be configured according to a UE capability value reported by the UE. In another example, the number of TCI states activated by the MAC CE messages of rel-15 and rel-16 may be determined as a value pre-configured by the BS. In another example, the number of TCI states activated by the MAC CE messages of rel-15 and rel-16 may be determined as a value pre-appointed between the BS and the UE.

For example, as illustrated in FIG. 25, the BS and the UE may determine all TCI states 25-00 of RRC configured TCI states of rel-15 as M TCI states (TCI #0, TCI #1, TCI #2, . . . , TCI #M−1) and select and arrange K TCI states (TCI #0', TCI #1', TCI #2', . . . , TCI #K−1) as candidates of TCI states 25-20 based on the rel-15 MAC CE. For example, when TCI #0 is selected from among the M. TCI states, it may be arranged on TCI #0'. For example, a maximum value of K for the BS and the UE supporting rel-15 may be configured or determined as 8, and a maximum value of K for the BS and the UE supporting rel-16 may also be configured as 8. When the maximum value is configured as 8, the BS may indicate selection of a beam for the PDSCH to the UE through a DCI-based beam selection operation within one CORESET. The beam may be selected from among a maximum of 8 beams through identification of TCI field information 25-40 in DCI.

One of the values 0 to 7 may be selected as TCI field #1 25-40 of FIG. 25. For example, when the TCI field within DCI is indicated as 000, TCI #0' (TCI #I=TCI #0') may be indicated among TCI #0', TCI #1', TCI #2', TCI #3', TCI #4', TCI #5', TCI #6', and TCI #7'. TCI field #I may be named a TCI codepoint. The embodiment has described that each of the maximum values is configured as 8 (K=8), the maximum value may be configured as a value smaller than 8 or larger than 8. The embodiment has described the case in which the maximum value K of the number of TCI states selected by the MAC CE for rel-15 is the same as the maximum value K of the number of TCI states selected by the MAC CE for rel-16, the values may be configured to be different from each other.

In another example, when the value increases in proportion to the number of BSs/TRPs operating for C-JT/NC-JT, for example, 2 TRPs operate, the maximum value K for the BS and the UE supporting rel-16 may be configured as 16. When the maximum value is configured as 16, the BS may indicate selection of one or more beams for the PDSCH to the UE through a DCI-based beam selection operation within one CORESET. When K is 16, one of the values 0 to 15 may be selected as #I selected and indicated by the BS. The embodiment has described the case in which each of the maximum values is configured as 16 (K=16), but the maximum value may be configured as a value smaller than 16 or larger than 16.

According to an embodiment of the disclosure, a downlink control channel for NC-JT may be configured based on multiple PDCCHs.

In NC-JT based on multiple PDCCHs, there may be a CORESTE or a search space separated for each TRP when DCI for scheduling the PDSCH of each TRP is transmitted. The CORESET or the search space for each TRP can be configured like in at least one of the following cases.

* A configuration of a higher-layer index for each CORESET: CORESET configuration information configured by a higher layer may include an index value, and a TRP for transmitting a PDCCH in the corresponding CORESET may be identified by the configured index value for each CORESET. For example, in a set of CORESETs having the same higher-layer index value, it may be considered that the same TRP transmits the PDCCH or the PDCCH for scheduling the PDSCH of the same TRP is transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, it may be considered that a default value of CORESETPoolIndex is configured, and the default value may be 0.

* A configuration of multiple PDCCH-Config: a plurality of PDCCH-Config are configured in one BWP, and each PDCCH-Config may include a PDCCH configuration for each TRP. For example, a list of CORESETs for each TRP and/or a list of search spaces for each TRP may be included in one PDCCH-Config, and one or more CORESETs and one or more search spaces included in one PDCCH-Config may be considered to correspond to a specific TRP.

* A configuration of a CORESET beam/beam group: a TRP corresponding to the corresponding CORESET may be identified through a beam or a beam group configured for each CORESET. For example, when the same TCI state is configured in a plurality of CORESETs, it may be considered that the corresponding CORESETs are transmitted through the same TRP or a PDCCH for scheduling a PDSCH of the same TRP is transmitted in the corresponding CORESET.

* A configuration of a search space beam/beam group: a beam or a beam group is configured for each search space, and a TRP for each search space may be identified therethrough. For example, when the same beam/beam group or TCI state is configured in a plurality of search spaces, it may be considered that the same TRP transmits the PDCCH in the corresponding search space or a PDCCH for scheduling a PDSCH of the same TRP is transmitted in the corresponding search space.

As described above, by separating the CORESETs or search spaces for each TRP, it is possible to divide PDSCHs and HARQ-ACK for each TRP and accordingly to generate an independent HARQ-ACK codebook for each TRP and use an independent PUCCH resource.

The configuration may be independent for each cell or BWP. For example, while two different CORESETPoolIndex values may be configured in the PCell, no CORESETPoolIndex value may be configured in a specific SCell. In this case, it may be considered that NC-JT is configured in the PCell, but NC-JT is not configured in the SCell in which no CORESETPoolIndex value is configured.

According to another embodiment of the disclosure, a downlink beam for NC-JT may be configured based on a single PDCCH.

In single PDCCH-based NC-JT, PDSCH transmitted by a plurality of TRPs may be scheduled by one piece of DCI. At this time, as a method of indicating the number of TRPs transmitting the corresponding PDSCHs, the number of TCI states may be used. For example, single PDCCH-based NC-JT may be considered when the number of TCI states indicated by DCI for scheduling the PDSCHs is 2, and single-TRP transmission may be considered when the number of TCI states is 1. The TCI states indicated by the DCI may correspond to one or two TCI states among TCI states activated by the MAC CE. When the TCI codepoint indicated by the DCI is associated with TCI states activated by the MAC CE and the TCI states indicated by the DCI correspond to two TCI states activated by the MAC CE, the number of TCI states activated by the MAC CE, corresponding to the TCI codepoint may be 2.

The configuration may be independent for each cell or BWP. For example, while a maximum number of activated TCI states corresponding to one TCI codepoint is 2 in the PCell, a maximum number of activated TCI states corresponding to one TCI codepoint may be 1 in a specific SCell. In this case, it may be considered that NC-JT is configured in the PCell but NC-JT is not configured in the SCell.

A method of repeatedly transmitting an NC-JT PDSCH according to an embodiment of the disclosure is described below.

In the embodiment of the disclosure, a detailed configuration and indication method by which two or more TRPs repeatedly transmit the same PDSCH through the same transmission band, for example, a component carrier, a BWP, or the like is provided.

Figure 26A:
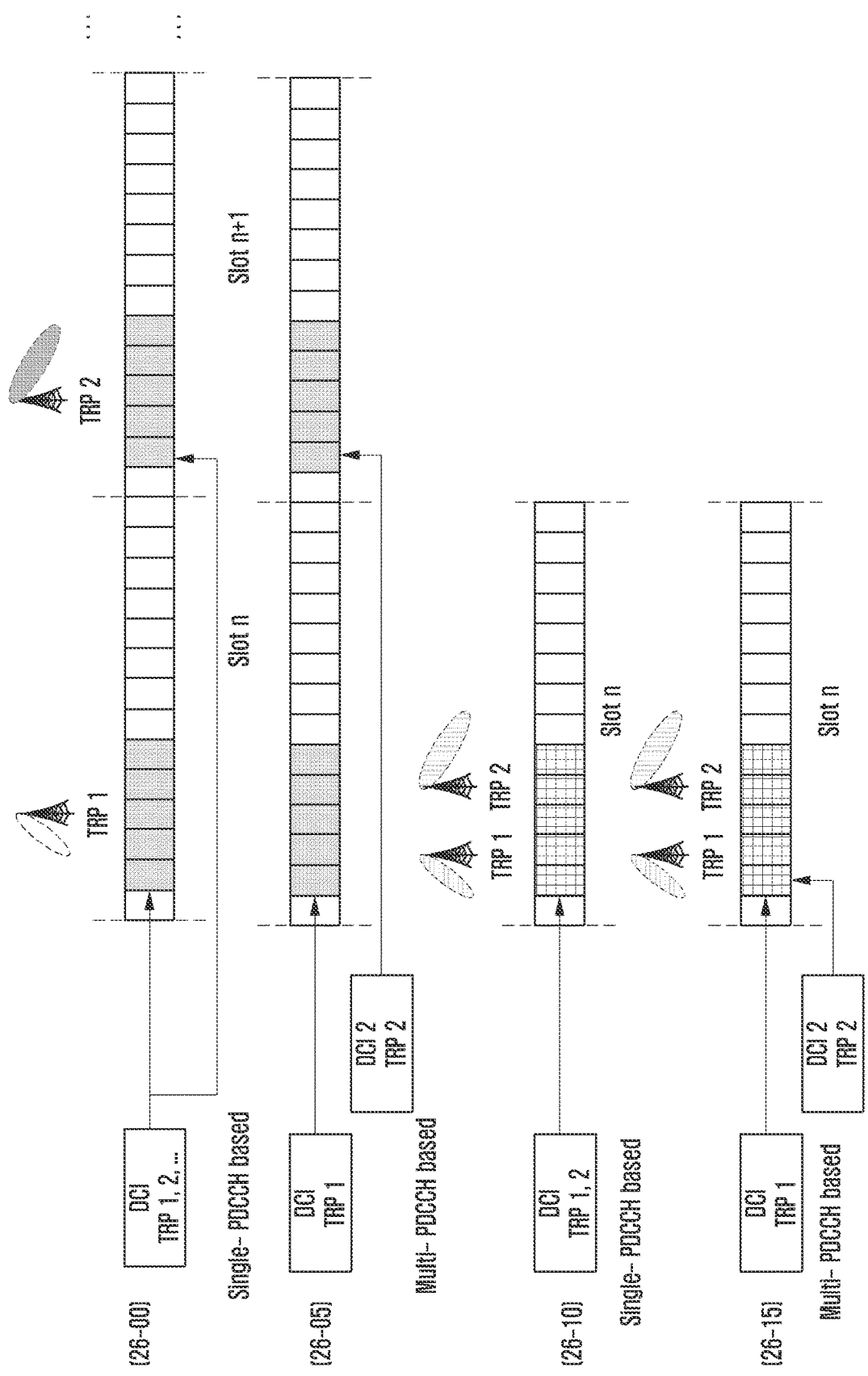
FIG. 26A illustrates repetitive transmission of a plurality of TRPs to which various resource allocation methods are applied in a wireless communication system according to an embodiment of the disclosure.
Figure 26B:
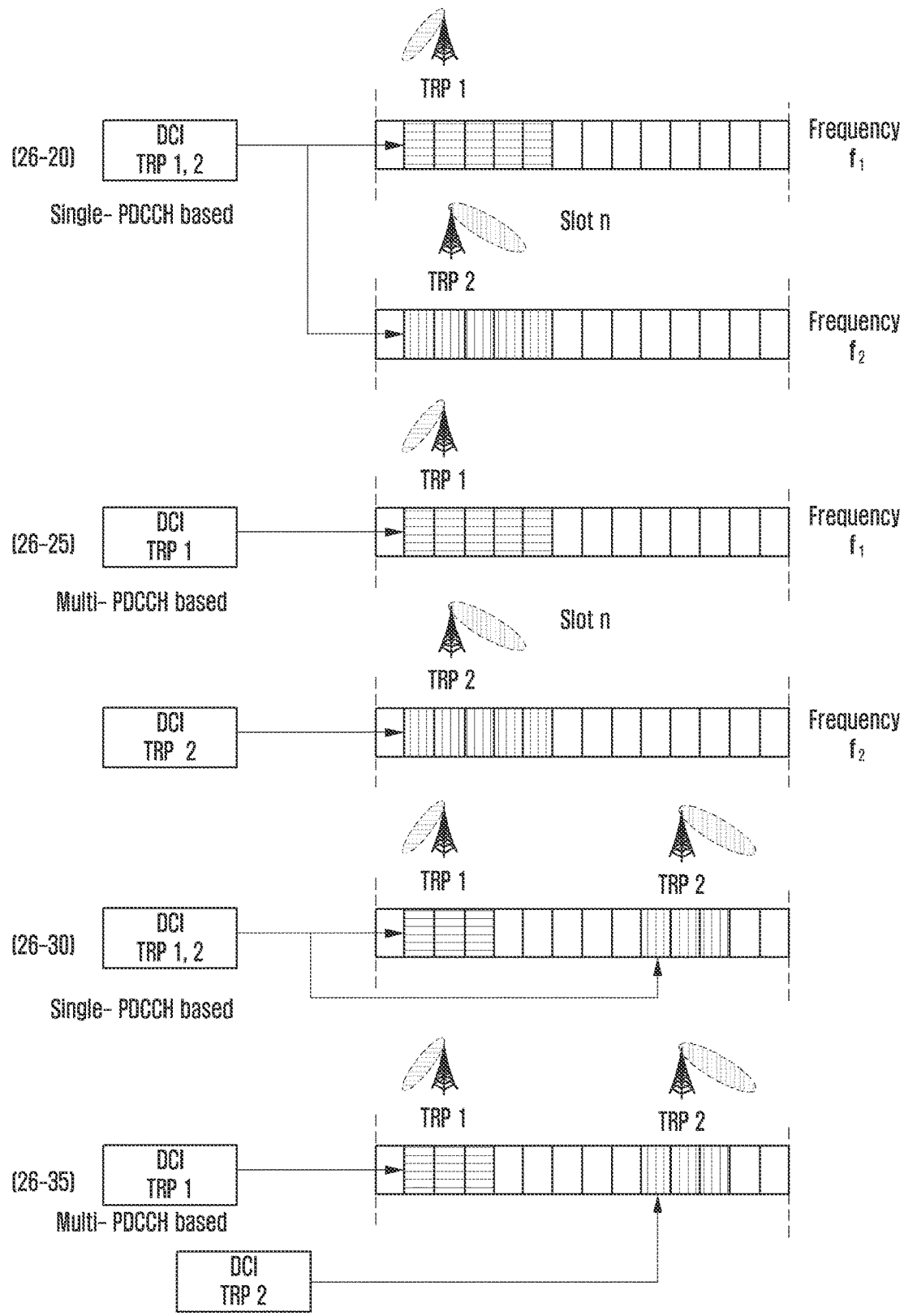
FIG. 26B illustrates repetitive transmission of a plurality of TRPs to which various resource allocation methods are applied in a wireless communication system according to an embodiment of the disclosure.

FIG. 26A illustrates repetitive transmission of a plurality of TRPs to which various resource allocation methods are applied in a wireless communication system according to an embodiment of the disclosure, and FIG. 26B illustrates repetitive transmission of a plurality of TRPs to which various resource allocation methods are applied in a wireless communication system according to an embodiment of the disclosure.

FIGS. 26A and 26B describe the case in which two or more TRPs repeatedly transmit the same PDSCH according to an embodiment of the disclosure.

Referring to FIGS. 26A and 26B, in the current NR system, the number of slots which is the same as the number of repetitive transmissions is needed when the same PDSCH is repeatedly transmitted as described above, and the same cell, TRP, and/or beam is used in each repetitive transmission. On the other hand, through an embodiment of the disclosure, it is possible to achieve higher reliability through the use of different TRPs in respective repetitive transmissions in slots as indicated by reference numerals 26-00 and 26-05. Meanwhile, different repetitive transmission methods may be used according to UE capability, a delay time requirement, and an available resource state between TRPs. For example, when the UE has capability to perform reception in NC-JT, each TRP may use a method of transmitting the same PDSCH through the same time and frequency resources (SDM), thereby increasing a use rate of frequency resources and reducing a delay time required for PDSCH decoding as indicated by reference numerals 26-10 and 26-15. The corresponding method is efficient when there is small interference between beams since beams between TRPs to be simultaneously transmitted are almost orthogonal.

In another embodiment of the disclosure, a method by which respective TRPs transmit the same PDSCH through the same time resources and frequency resources that do not overlap each other (FDM) may be used as indicated by reference numerals 26-20 and 26-25. The corresponding method is efficient when there is large interference between beams of TRPs to be simultaneously transmitted and there are large available frequency resources of each TRP. In another embodiment of the disclosure, a method by which respective TRPs transmit the same PDSCH through different OFDM symbols within the same slot (TDM) may be used as indicated by reference numerals 26-30 and 26-35. The corresponding method is efficient when large available frequency resources of each TRP are not available and the size of data to be transmitted is small. In addition to the above-described methods, modifications based on the methods may be made. A method to be used among the above-described repetitive transmission methods may be explicitly indicated to the UE by the BS. The explicit indication method may vary depending on a repetitive transmission scheme. For example, whether the PDSCH is repeatedly transmitted by a TDM scheme or a FDM scheme may be indicated through a higher-layer configuration. Meanwhile, whether to perform repetitive transmission through an SDM scheme or whether to perform repetitive transmission or single transmission of the PDSCH may be indicated through L1 signaling.

The PDSCH repetitive transmission may be scheduled according to single-PDCCH-based NC-JT. For example, one piece of control information (DCI) may be used to schedule the repetitive transmission PDSCH as indicated by reference numerals 26-00, 26-10, 26-20, and 26-30, and the corresponding DCI may indicate a list of all TRPs to participate in repetitive transmission. The list of TRPs to be repeatedly transmitted may be indicted in the form of a TCI state list, and the length of the TCI state list may be dynamically changed. The corresponding DCI may be repeatedly transmitted to improve reliability, and different beams may be applied to respective DCIs in repetitive transmission. Alternatively, the PDSCH repetitive transmission may be scheduled according to multi-PDCCH-based NC-JT. For example, a plurality of pieces of control information (DCI) may be used to schedule the repetitive transmission PDSCH as indicated by reference numerals 26-05, 26-15, 26-25, and 26-35, and each piece of the DCI may correspond to the PDSCH of different TRPs to participate in repetitive transmission. Alternatively, shortened DCI may be used to schedule repetitive transmission, and normal DCI and secondary DCI may correspond to the PDSCH of different TRPs to participate in repetitive transmission. The described indication method may be commonly applied to all of repetitive transmission through a plurality of TRPs and different data transmissions through a plurality of TRPs.

When the UE does not know whether the PDSCH transmitted by each TRP corresponds to repetitive transmission or transmission of different pieces of data in single-PDCCH or multi-PDCCH-based NC-JT transmission, each PDSCH may be independently decoded, and even though the repetitive transmission PDSCH is transmitted, combining between the PDSCHs cannot be performed, so that a performance gain cannot be obtained. A method of determining whether repetitive transmission is performed may consider the following examples.

A. Method 1: When a specific MCS table is configured in a higher layer, for example, when gam64LowSE having low spectral efficiency is configured, the UE assumes that respective PDSCHs transmitted by NC-JT contain the same data, and otherwise, assumes that respective PDSCHs transmitted by NC-Jr contain different pieces of data.

B. Method 2: When one or all of pieces of DCI for NC-JT are scrambled by a specific RNTI, for example, an MCS-C-RNTI, the UE assumes that respective PDSCHs transmitted by NC-JT contain the same data, and otherwise, assumes that respective PDSCHs transmitted by NC-JT contain different pieces of data.

C. Method 3: When an MCS level indicated by one or all of pieces of DCI for NC-JT is smaller than a specific threshold, the UE assumes that respective PDSCH transmitted by NC-JT contain the same data, and otherwise, assumes that respective PDSCH transmitted by NC-JT contain different pieces of data.

D. Method 4: When the number of DMRS ports, CDM groups, or layers indicated by one DCI for NC-JT is one, the UE assumes that respective PDSCHs transmitted by NC-JT contain the same data, and otherwise, assumes that respective PDSCHs transmitted by NC-JT contain different pieces of data.

E. Method 5: When HARQ process numbers and NDI values indicated by all pieces of DCI for NC-JT are the same as each other, the UE assumes that respective PDSCHs transmitted by NC-JT contain the same data, and otherwise, assumes that respective PDSCHs transmitted by NC-JT contain different pieces of data. The currentNR has restriction indicating that the UE does not expect reception of PDSCHs designated as the same HARQ process ID before ACK for a PDSCH designated as a specific HARQ process ID is transmitted except for retransmission. The corresponding restriction may be changed to restriction indicating that the UE does not expect reception of a PDSCH designated as the same HARQ process ID and TCI state before ACK for a PDSCH designated as a specific TCI state in addition to a specific HARQ process ID is transmitted. Therefore, it is possible to maintain the restriction that is the same as the restriction of the related art within one TRP while repetitive data transmission between different TRPs is allowed.

Two or more of the above-described examples may be combined and implemented, and a similar method for determining whether to perform repetitive transmission of the PDSCH transmitted by NC-JT may be used as well as the above-described examples.

Meanwhile, in current NR, the number of repetitive transmissions is semi-statically configured through RRC. However, required reliability may be satisfied without any repetitive transmission or by repetitive transmissions smaller than the configured number according to a change in a channel state. Accordingly, in order to increase transmission efficiency, the number of repetitive transmissions may be dynamically configured. For example, when repetitive transmission is scheduled by single DCI, the number of repetitive transmissions may be the same as the number of TCI states indicated by the DCI or a predetermined value x proportional thereto. The value x may be dynamically or semi-statically configured, and when the value x is semi-statically configured, the value may be the same as a value designated to the number of repetitive transmissions in NR.

When the number of repetitive transmissions is larger than the number of TCI states, a specific pattern may be used when the TCI states are applied to respective repetitive slots.

In a first method, the TCI state may be changed in every slot in which the PDSCH is repeatedly transmitted. For example, N TCI states (TCI state #1, TCI state #2, . . . , TCI state #N) may be indicated for repetitive transmissions of the PDSCH in M slots, and in the case of M>N, the TCI states may be applied to respective repetitive transmission slots by applying TCI states #1 to TCI state #N to repetitive transmission slot #1 to repetitive transmission slot #N.

In a second method, the TCI state may be changed in every L slots in which the PDSCH is repeatedly transmitted. For example, N TCI states (TCI state #1, TCI state #2, . . . , TCI state #N) may be indicated for repetitive transmissions of the PDSCH in M slots, and in the case of M>N, the TCI state #1 may be applied to repetitive transmission slot #1 to repetitive transmission slot #L and TCI state #2 may be applied to repetitive transmission slot #L+1 to repetitive transmission slot #2L. At this time, the value L=2.

In the above-described methods, when the number of repetitive transmissions is 4 and TCI state indexes are indicated as 1 and 2, TCI states may be sequentially applied to repetitive transmission slots according to a pattern of 1, 2, 1, 2 in the first method, and TCI states may be sequentially applied to repetitive transmission slots according to a pattern of 1, 1, 2, 2 in the second method. The BS may indicate a method among the first method and the second method to repeatedly transmit the PDSCH to the UE, and the indication method may be a higher-layer configuration or L1 signaling. For example, the BS may indicate one of the two methods through a higher-layer parameter ReqTCIMapping. The first method may be indicated when a value of the parameter is "'CycMapping", and the second method may be indicated when the value of the parameter is "SeqMapping".

Alternatively, the number of semi-statically configured repetitive transmissions may be a maximum number of repetitive transmissions, and the number of actual repetitive transmissions may be dynamically indicated through DCI/MAC-CE. When the number of repetitive transmissions is indicated through DCI, the corresponding number may be indicated through a new field or redefinition of the field of the related art. For example, when only a single-transmission layer is used in repetitive transmission, a codepoint indicating a plurality of DMRS ports in an antenna port field of DCI is not used, and thus the corresponding codepoint may be re-defined to indicate the number of actual repetitive transmissions. Alternatively, the number of repetitive transmissions may be the same as the number of TCI states indicated by DCI/MAC-CE or may be configured as a value proportional thereto. Alternatively, the number of repetitive transmissions may be indicated through a time domain resource allocation field indicated by DCI. For example, in addition to values indicated in the current NR system through the time domain resource allocation field of DCI, for example, the values of K S, and L described with reference to FIG. 8, the number of repetitive transmissions may also be indicated. Meanwhile, when repetitive transmission is scheduled by multiple DCI, the number of repetitive transmissions may be the same as the number of scheduled DCI or may be a predetermined number x proportional thereto. When the number of repetitive transmissions is indicated through both the semi-static and dynamic schemes, there may be priorities therebetween. For example, the number of repetitive transmissions that is dynamically indicated may have precedence over the number of repetitive transmission that is semi-statically indicated.

Second Embodiment: CSI Measurement and Report Method for NC-JT

The embodiment discloses a CSI measurement and report method for NC-JT.

FIG. 27 illustrates a configuration of resources for NC-JT CSI measurement according to an embodiment of the disclosure.

Referring to FIG. 27, in NC-JT transmission of two TRPs, for example, TRP 1 and TRP 2, a channel measurement resource (CMR), a zero-power-based interference measurement resource (ZP-IMR), and a non-zero-power-based interference measurement resource (NZP-IMR) may be configured for each TRP for CSI measurement. Based on the resource configuration, the UE may perform CSI measurement and report based on the assumption that CMR C1 is transmitted from TRP 1, NZP-IMR C2' for NC-JT interference measurement is transmitted from TRP 2, and ZP-IMR Il for other interference power measurement, such as inter-cell interference is transmitted in NC-JT CSI measurement for TRP 1 as indicated by reference numeral 27-00. Similarly, the UE may perform CSI measurement and report based on the assumption that CMR C2 is transmitted from TRP 2, NZP-IMR C1' for NC-JT interference measurement is transmitted from TRP 1, and ZP-IMR Il for other interference power measurement, such as inter-cell interference is transmitted in NC-JT CSI measurement for TRP 2 as indicated by reference numeral 27-50.

At this time, since NZP-IMRs C1' and C2' are assumed as precoded CSI-RSs, if the CMRs C1 and C2 are also precoded CSI-RSs, one CSI-RS can be used for both the CMR and the NZP-IMR. For example, when the CSI-RS precoded for the CMR is used in TRP 1 and TRP 2, the BS may configure C1=C1' and C2=C2', thereby reducing overhead of the CSI-RS.

Meanwhile, when the CMR is reused as the NZP-IMR, the size of interference measured by the UE is larger than the size of interference that the UE actually experiences in NC-JT transmission, and thus a channel state may be under-reported.

Figure 28:
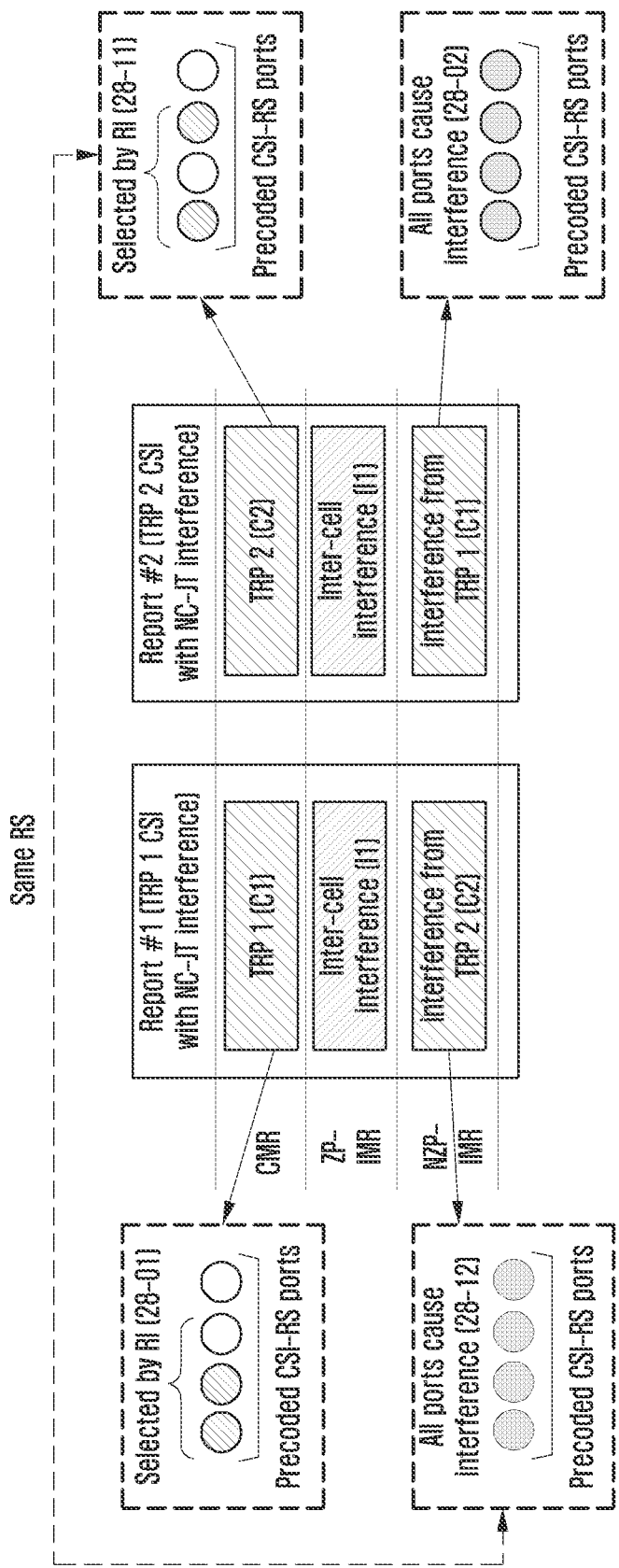
FIG. 28 illustrates a case in which a channel state is under-reported according to an embodiment of the disclosure.

The problem is illustrated in FIG. 28.

FIG. 28 illustrates a case in which a channel state is under-reported according to an embodiment of the disclosure.

Referring to FIG. 28, when the resources C1 are used as both the CMR and the NZP-IMR, if the corresponding resources are measured as the CMR, the UE selects some ports achieving an optimal rank from among all ports included in the CMR and generates a CSI report based on the assumption that the corresponding ports are used for NC-JT Meanwhile, when the UE measures the corresponding resources as the NZP-IMR, the UE generates a CSI report based on the assumption that interference is received in all ports included in the NZP-IMR. Accordingly, the UE may perform the CSI report based on the assumption that RI=2 is selected and 2 CSI-RS ports corresponding thereto are selected in channel measurement of TRP 1 as indicated by reference numeral 28-01, but NC-JT interference is received in all of 4 CSI-RS ports, that is, all of 4 interference layers in measurement of interference from TRP 1 as indicated by reference numeral 28-02. This means that the CSI report is performed based on the assumption of larger interference than the interference really is or a worse channel state than the channel state really is when the UE reports the NC-JT CSI. The example may be equally applied to channel measurement of TRP 2 and measurement of interference from TRP 2, that is, reference numerals 28-11 and 28-12. Accordingly, in order to perform an accurate NC-JT CSI report, a method of indicating or assuming that only specific ports of the NZP-IMR ports are used for interference measurement is needed, which may include one of the following examples.

Method 1. The BS explicitly indicates ports to be used for interference measurement.

When configuring the NZP-IMR, the BS may indicate which port is used for NC-JT interference measurement among the corresponding NZP-IMR ports. In the indication, a port used for interference measurement or a port excluded from interference measurement is explicitly indicated through a bitmap. Alternatively, similar to rank restriction configured for the CSI report, restriction on the maximum number of interference layers assumed for the NZP-IMR for the channel report may be configured. In addition to the restriction on the maximum number of interference layers, NZP-IMR port mapping corresponding to the corresponding number of interference layers may also be configured. The restriction on the number of interference layers and/or the NZP-IMR port mapping may be configured to one CSI report, or the restriction on the number of interference layers and/or the NZP-IMR port mapping corresponding to each RI value within one CSI report may be configured. Alternatively, when the NZP-IMR is used as the CMR, rank restriction and port mapping for each rank (non-PMI-PorIndication) configured for the CMR or the CSI report associated with the CMR can be applied to the restriction on the number of interference layers of the NZP-IMR and/or the NZP-IMR port mapping.

Method 2. The BS implicitly indicates ports to be used for interference measurement.

When the NZP-IMR is configured, if the NZP-IMR is reused as the CMR, the BS may indicate a link between the reused NZP-IMR and the CMR to the UE. The link may be established between CSI-RS resources/resource sets/resources settings, or between CSI report settings associated with the NZP-IMR and/or the CMR. When the link is indicated, the UE may equally apply the RI measured for the CMR and CSI-RS port mapping corresponding to the corresponding RI if possible to measurement of the NZP-IMR linked to the corresponding CMR. For example, when the corresponding NZP-IMR is measured, it may be assumed that the number of ports to measure interference among the ports within the NZP-IMR is the same as the RI and that port mapping for the number of ports is the same as the CSI-RS port mapping corresponding to the RI.

Meanwhile, when NC-JT CSI measurement resources are configured, the report on the measured NC-JT CSI may be performed along with an integrated CSI report transmitted through one PUCCH or PUSCH, or may be performed as individual CSI reports through two PUCCHs or PUSCHs transmitted by different TRPs. Which one is suitable among the integrated or individual CSI report may vary depending on an operation environment between TRPs receiving the CSI report, for example, the assumption of a backhaul or a scheduler between TRPs. If there is no backhaul delay time between the mutual TRPs or the backhaul delay time is ignorable, each TRP may detect a channel state between the TRP itself and the UE right after the CSI report even though the integrated CSI report is performed. On the other hand, if the backhaul delay time between the mutual TRPs cannot be ignored, the individual CSI report to each TRP may be more suitable for rapid detection of the channel state between each TRP and the UE rather than the integrated CSI report. Accordingly, determining the integrated CSI report or the individual CSI report may be made by the BS based on the operation environment, and may be notified to the UE through a higher-layer configuration for the CSI report. Alternatively, the determination of the CSI report may be implicitly made according to an NC-JT mode. For example, when single-PDCCH-based NC-JT is configured in the UE, it is more suitable for an environment in which the backhaul delay time can be ignored, and thus the UE may assume that the CSI reports are integrated and transmitted. Alternatively, when multi-PDCCH-based NC-JT is configured in the UE, it is more suitable for an environment in which the backhaul delay time cannot be ignored, and thus the UE may follow the indication of the integrated CSI report or the individual CSI report for each TRP according to a configuration of the BS only in multi-PDCCH-based NC-JT based on the assumption that the CSI report is individually transmitted for each TRP or based on various operation environments. Meanwhile, in the single-PDCCH-based NC-JT, the BS may always transmit the integrated CSI report indication to the UE.

Meanwhile, the UE may receive a configuration of a NC-JT transmission scheme of a CSI reference signal for the CSI report among, for example, SDM/FDM/intra-slot, TDM/inter-slot, TDM/SFN, and the like. The configuration may be indicated for each CSI report or each CSI resource/resource setting/resource set. At this time, the UE may receive a configuration of each of CSI report #1 according to a SDM NC-JT transmission scheme and CSI report #2 according to an intra-slot NC-JT transmission scheme, and the BS may determine which NC-JT transmission scheme is more suitable based on the two CSI reports and notify the UE of the determined NC JT transmission scheme. When transmitting a PDSCH, the notification may be performed through DCI for scheduling the corresponding PDSCH. Alternatively, the UE may receive a configuration of various CSI-RS resources corresponding to different NC-JT transmission schemes, and the NC-JT transmission scheme may be associated with one CSI report. At this time, after comparing channel qualities of CSI-RS resources, that is, NC-JT transmission schemes, the UE may report a transmission scheme having the best channel quality and an RI/PMI/CQI according thereto to the BS through the CSI report. At this time, a report on the transmission scheme may be performed through a field belonging to the CSI report of the related art, for example, a CRI field.

Meanwhile, the NC-JT transmission schemes for the CSI report may be limited to transmission schemes that can be supported by the UE or transmission schemes configured through a higher-layer. For example, when the UE transmits a report indicating that only SDM and inter-slot TDM NC-JT transmission is supported through a capability report, the UE may not expect an indication of the CSI report for the transmission scheme that the UE does not support, reported when the NC-JT CSI is reported, or may omit CSI calculations for the corresponding transmission scheme. Alternatively, when a specific NC-JT transmission scheme is configured in the UE through a higher layer and thus only the specific NC-JT transmission scheme is indicated from the BS before an RRC reconfiguration, for example, when only SMD and inter-slot TDM NC-JT transmission schemes are indicated from the BS, the UE may not expect an indication of the CSI report for NC-JT transmission schemes other than the schemes configured through the higher layer or may omit CSI calculations for the corresponding transmission schemes.

Figure 29:
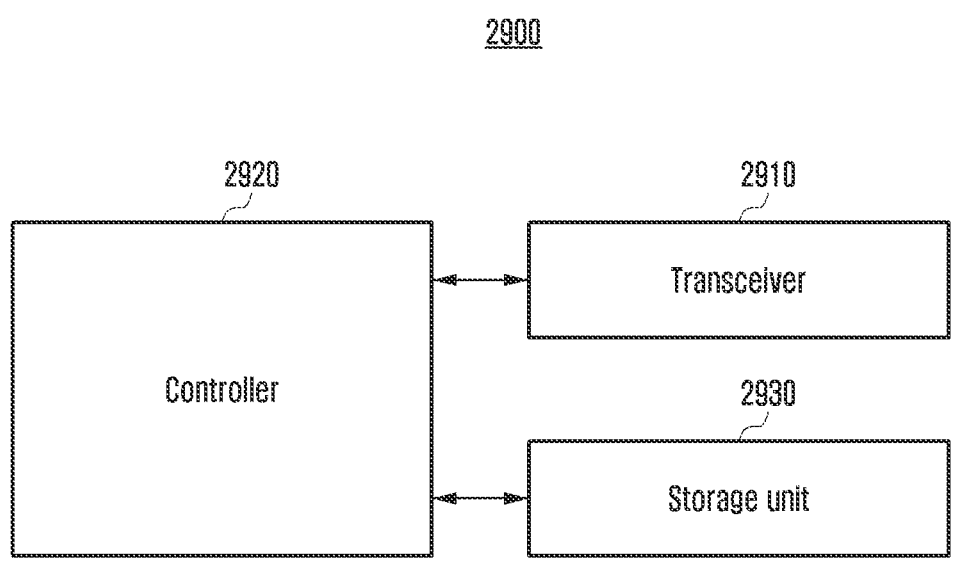
FIG. 29 is a block diagram illustrating a configuration of a UE according to an embodiment of the disclosure.

FIG. 29 is a block diagram illustrating a configuration of a UE according to an embodiment of the disclosure.

Referring to FIG. 29, a UE 2900 may include a transceiver 2910, a controller 2920, and a storage unit 2930. The transceiver 2910, the controller 2920, and the storage unit 2930 of the UE 2900 may operate according to an efficient channel and signal transmission/reception method in the 5G communication system corresponding to the above-described embodiment. However, elements of the UE 2900 according to an embodiment are not limited to the above-described example. According to another embodiment of the disclosure, the UE 2900 may include more or fewer element than the above-described elements. Further, the transceiver 2900, the controller 2920, and the storage unit 2930 may be implemented in a single-chip form in specific case.

The transceiver 2910 may be implemented as a transmitter and a receiver according to another embodiment. The transceiver 2910 may transmit and receive a signal to and from the BS. The signal may include control information and data. To this end, the transceiver 2910 may include an RF transmitter for up-converting and amplifying a frequency of a transmitted signal and an RF receiver for low-noise amplifying a received signal and down-converting the frequency. Further, the transceiver 2910 may receive a signal through a radio channel, output the signal to the controller 2920, and transmit the signal output from the controller 2920 through the radio channel.

The controller 2920 may control a series of processes which can be performed by the UE 2900 according to the embodiment of the disclosure. For example, the controller 2920 may perform at least one of TCP emulation methods according to an embodiment of the disclosure. The storage unit 2930 may store control information or data, such as TCI or QCL configuration information included in the signal acquired by the UE 2900, and may have an area to store data required for the control of the controller 2920 and data generated when the controller 2920 performs control.

Figure 30:
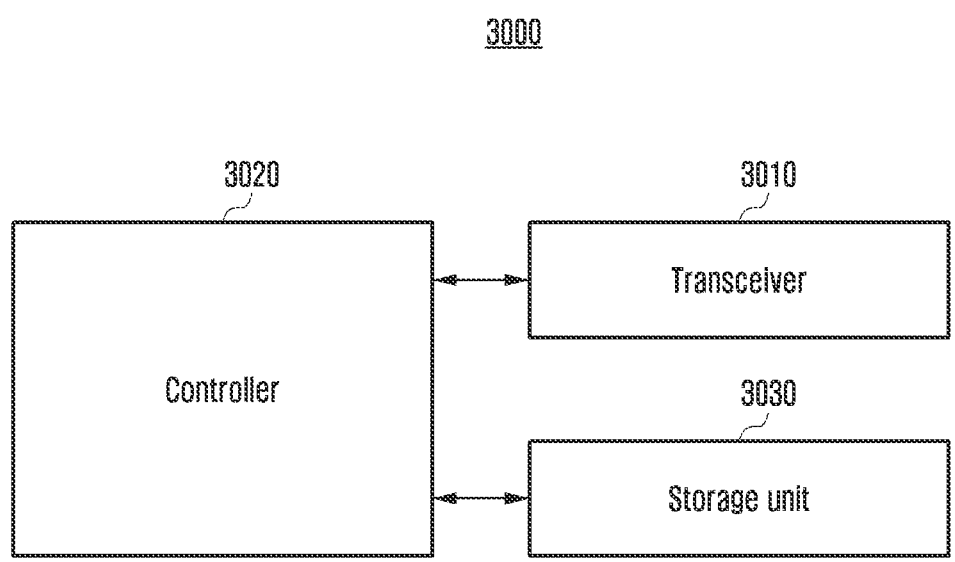
FIG. 30 is a block diagram illustrating a configuration of a BS according to an embodiment of the disclosure.

FIG. 30 is a block diagram illustrating a configuration of a BS according to an embodiment of the disclosure.

Referring to FIG. 30, a BS 3000 may include a transceiver 3010, a controller 3020, and a storage unit 3030. The transceiver 3010, the controller 3020, and the storage unit 3030 of the BS 3000 may operate according to an efficient channel and signal transmission/reception method in the 5G communication system corresponding to the above-described embodiment. However, elements of the BS 3000 according to an embodiment are not limited to the above-described example. According to another embodiment of the disclosure, the BS 3000 may include more or fewer elements than the above-described elements. Further, the transceiver 3010, the controller 3020, and the storage unit 3030 may be implemented in a single-chip form in specific case. The transceiver 3010 may be implemented as a transmitter and a receiver according to another embodiment. The transceiver 3010 may transmit and receive a signal to and from the UE. The signal may include control information and data. To this end, the transceiver 3010 may include an RF transmitter for up-converting and amplifying a frequency of a transmitted signal and an RF receiver for low-noise amplifying a received signal and down-converting the frequency. Further, the transceiver 3010 may receive a signal through a radio channel, output the signal to the controller 3020, and transmit the signal output from the controller 3020 through the radio channel.

The controller 3020 may control a series of processes to operate the BS 3000 according to the embodiment of the disclosure. For example, the controller 3020 may perform at least one of the TCI emulation methods according to an embodiment of the disclosure.

The storage unit 3030 may store control information or data, such as TCI or QCL configuration information determined by the BS 3000, or control information or data received from the UE, and may have an area to store data required for the control of the controller 3020 and data generated when the controller 3020 performs control.

While the disclosure has been shown and described with reference to various embodiments thereof, it will be understood by those skilled in the art that various changes in form and details may be made therein based on without departing from the spirit and scope of the disclosure as defined by the appended claims and their equivalents.

What is claimed is:

1. A method performed by a terminal in a communication system, the method comprising:

receiving, from a base station, information including a channel measurement resource (CMR) configuration for first channel state information (CSI) and a non-zero power based interference measurement resource (NZP-IMR) configuration for the first CSI, wherein the CMR configuration for the first CSI indicates a first resource as CMR for the first CSI and the NZP-IMR configuration for the first CSI indicates a second resource as NZP-IMR for the first CSI;

identifying a first antenna port for a channel measurement for the first CSI;

identifying a second antenna port for an interference measurement for the first CSI;

acquiring the first CSI based on the channel measurement using the first resource of the first antenna port and the interference measurement using the second resource of the second antenna port; and transmitting the first CSI to the base station, wherein the first resource is used as NZP-IMR for second CSI based on a CMR configuration for the second CSI, and the second resource is used as CMR for the second CSI based on a NZP-IMR configuration for the second CSI, wherein the information indicates a link between the NZP-IMR configuration for the first CSI and the CMR configuration for the second CSI, and wherein the second antenna port for the interference measurement for the first CSI is identified based on a rank indicator (RI) associated with the CMR for the second CSI.

2. The method of claim 1, wherein the second antenna port is identified based on an indication using bitmap received from the base station.

3. The method of claim 1, wherein the second antenna port is identified based on a restriction on number of interference layer and corresponding antenna port for the number of interference layer.

4. The method of claim 1, wherein the second antenna port is identified based on a rank restriction and corresponding antenna port.

5. The method of claim 1, wherein the second antenna port is identified based on an antenna port corresponding to the RI.

6. A method performed by a base station in a communication system, the method comprising:

transmitting, to a terminal, information including a channel measurement resource (CMR) configuration for first channel state information (CSI) and a non-zero power based interference measurement resource (NZP-IMR) configuration for the first CSL wherein the CMR configuration for the first CSI indicates a first resource as CMR for the first CSI and the NZP-IMR configuration for the first CSI indicates a second resource as NZP-IMR for the first CSI;

identifying a first antenna port for a channel measurement for the first CSI;

identifying a second antenna port for an interference measurement for the first CSI; and receiving, from the terminal, the first CSI depending on the channel measurement using the first resource of the first antenna port and the interference measurement using the second resource of the second antenna port, wherein the first resource is used as NZP-IMR for second CSI based on a CMR configuration for the second CSI, and the second resource is used as CMR for the second CSI based on a NZP-IMR configuration for the second CSI, wherein the information indicates a link between the NZP-IMR configuration for the first CSI and the CMR configuration for the second CSI, and wherein the second antenna port for the interference measurement for the first CSI is identified based on a rank indicator (RI) associated with the CMR for the second CSI.

7. The method of claim 6, wherein the second antenna port is identified based on an indication using bitmap received from the base station.

8. The method of claim 6, wherein the second antenna port is identified based on a restriction on number of interference layer and corresponding antenna port for the number of interference layer.

9. The method of claim 6, wherein the second antenna port is identified based on a rank restriction and corresponding antenna port.

10. The method of claim 6, wherein the second antenna port is identified based on an antenna port corresponding to the RI.

11. A terminal in a communication system, the terminal comprising:

a transceiver; and at least one processor configured to:

receive, from a base station, information including a channel measurement resource (CMR) configuration for first channel state information (CSI) and a non-zero power based interference measurement resource (NZP-IMR) configuration for the first CSI, wherein the CMR configuration for the first CSI indicates a first resource as CMR for the first CSI and the NZP-IMR configuration for the first CSI indicates a second resource as NZP-IMR for the first CSI, identify a first antenna port for a channel measurement for the first CSI, identify a second antenna port for an interference measurement for the first CSI, acquire the first CSI based on the channel measurement using the first resource of the first antenna port and the interference measurement using the second resource of the second antenna port, and transmit the first CSI to the base station, wherein the first resource is used as NZP-IMR for second CSI based on a CMR configuration for the second CSI, and the second resource is used as CMR for the second CSI based on a NZP-IMR configuration for the second CSI, wherein the information indicates a link between the NZP-IMR configuration for the first CSI and the CMR configuration for the second CSI, and wherein the second antenna port for the interference measurement for the first CSI is identified based on a rank indicator (RI) associated with the CMR for the second CSI.

12. The terminal of claim 11, wherein the second antenna port is identified based on an indication using bitmap received from the base station.

13. The terminal of claim 11, wherein the second antenna port is identified based on a restriction on number of interference layer and corresponding antenna port for the number of interference layer.

14. A base station in a communication system, the base station comprising:

a transceiver; and at least one processor configured to:

transmit, to a terminal, information including a channel measurement resource (CMR) configuration for first channel state information (CSI) and a non-zero power based interference measurement resource (NZP-IMR) configuration for the first CSI, wherein the CMR configuration for the first CSI indicates a first resource as CMR for the first CSI and the NZP-IMR configuration for the first CSI indicates a second resource as NZP-IMR for the first CSI, identify a first antenna port for a channel measurement for the first CSI, identify a second antenna port for an interference measurement for the first CSI, and receive, from the terminal, the first CSI depending on the channel measurement using the first resource of the first antenna port and the interference measurement using the second resource of the second antenna port, wherein the first resource is used as NZP-IMR for second CSI based on a CMR configuration for the second CSI, and the second resource is used as CMR for the second CSI based on a NZP-IMR configuration for the second CSI, wherein the information indicates a link between the NZP-IMR configuration for the first CSI and the CMR configuration for the second CSI, and wherein the second antenna port for the interference measurement for the first CSI is identified based on a rank indicator (RI) associated with the CMR for the second CSI.

15. The base station of claim 14, wherein the second antenna port is identified based on an indication using bitmap received from the base station.

16. The base station of claim 14 wherein the second antenna port is identified based on a restriction on number of interference layer and corresponding antenna port for the number of interference layer.

* * * * *